(12) United States Patent
Ueda et al.

(10) Patent No.: US 7,627,387 B2
(45) Date of Patent: Dec. 1, 2009

(54) POSITION COMMAND GENERATING DEVICE

(75) Inventors: Koichiro Ueda, Tokyo (JP); Hidetoshi Ikeda, Tokyo (JP); Kiyoshi Maekawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 633 days.

(21) Appl. No.: 11/249,351

(22) Filed: Oct. 14, 2005

(65) Prior Publication Data

US 2006/0229745 A1    Oct. 12, 2006

(30) Foreign Application Priority Data

Apr. 8, 2005   (JP)   ............... 2005-112344

(51) Int. Cl.
  G05B 19/18    (2006.01)
  G05B 11/32    (2006.01)
(52) U.S. Cl. .......................... 700/63; 700/69
(58) Field of Classification Search ............ 700/63, 700/69
See application file for complete search history.

(56) References Cited

U.S. PATENT DOCUMENTS 6,294,891 B1 *   9/2001   McConnell et al. ......... 318/619
6,505,085 B1 *   1/2003   Tuttle et al. ................ 700/28

FOREIGN PATENT DOCUMENTS

| JP | 54-98477 | 8/1979 |
|---|---|---|
| JP | 2551868 | 8/1996 |
| JP | 11-309646 | 11/1999 |
| JP | 2000-148210 | 5/2000 |
| JP | 2002-91570 | 3/2002 |
| JP | 2003-65385 | 3/2003 |
| JP | 3477792 | 10/2003 |
| TW | 172120 | 11/1991 |
| TW | 462163 | 11/2001 |
| TW | 594581 | 6/2004 |

* cited by examiner

*Primary Examiner*—Ryan A Jarrett
(74) *Attorney, Agent, or Firm*—Oblon, Spivak, McClelland, Maier & Neustadt, P.C.

(57) ABSTRACT

A command generating device includes a command shape calculating unit for calculating an nth derivative command shape which is a fixed multiple of the nth derivative with respect to time of a position command for causing a machine to reach a target position at a positioning time so that a convolution of a velocity command which is the first derivative with respect to time of the position command and the impulse response of a transfer function determined from the frequency of a vibration which occurs in the machine becomes equal to zero, the convolution being calculated over the time period from the positioning time onward, and an associating processing unit for integrating the nth derivative command shape n times with respect to time, and for multiplying the integral result by a constant which associates the position command at the positioning time with the target position so as to determine the position command.

7 Claims, 26 Drawing Sheets

FIG.3
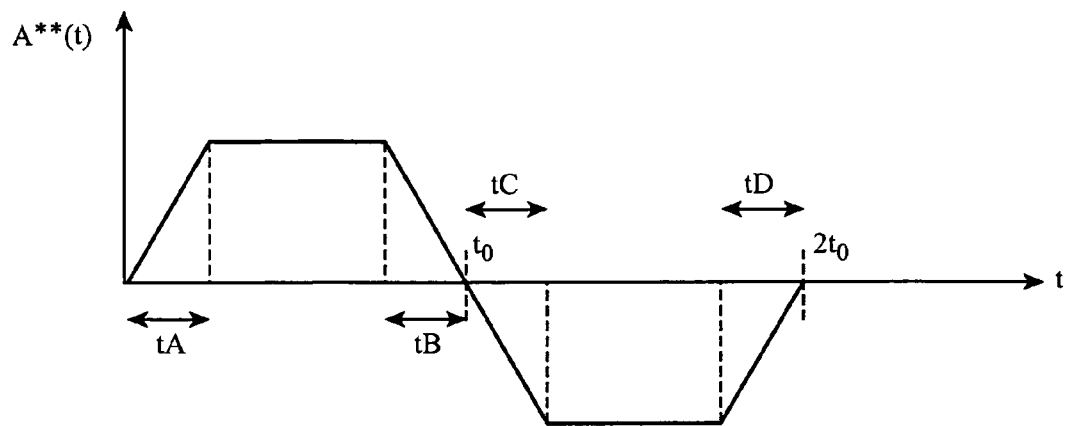
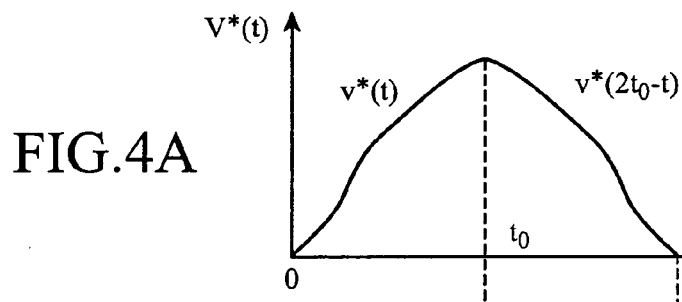
FIG.4A
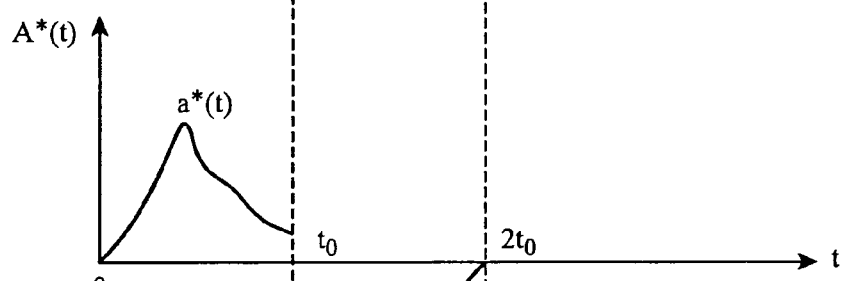
FIG.4B
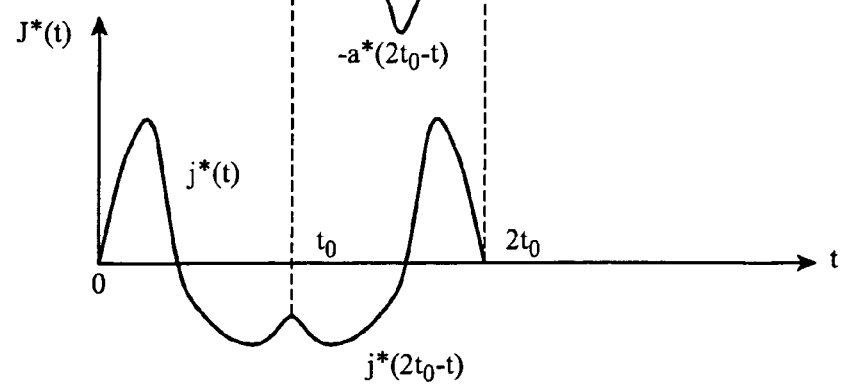
FIG.4C

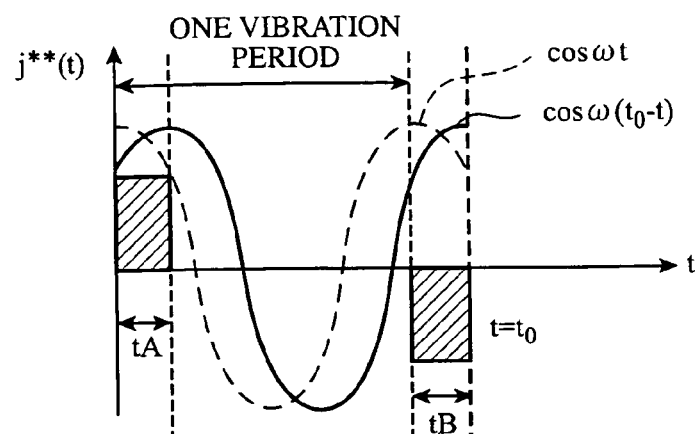
FIG.5A
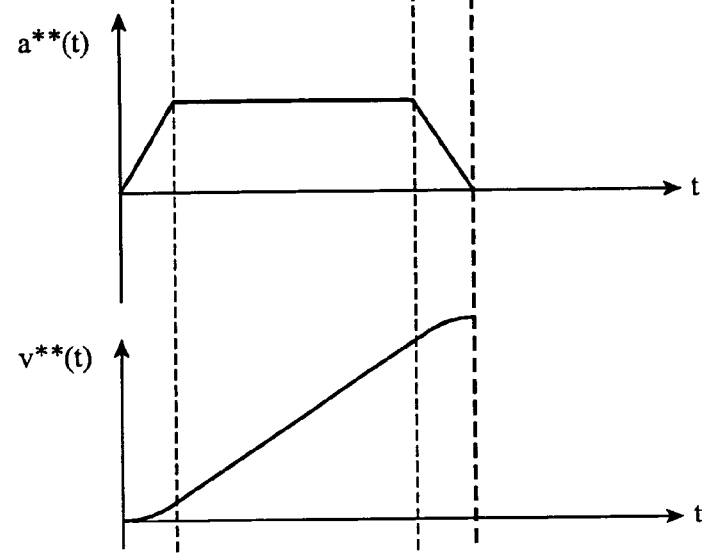
FIG.5B
FIG.5C
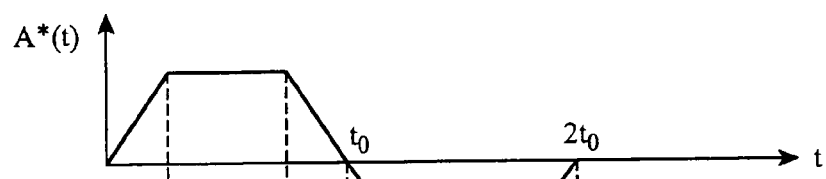
FIG.6A
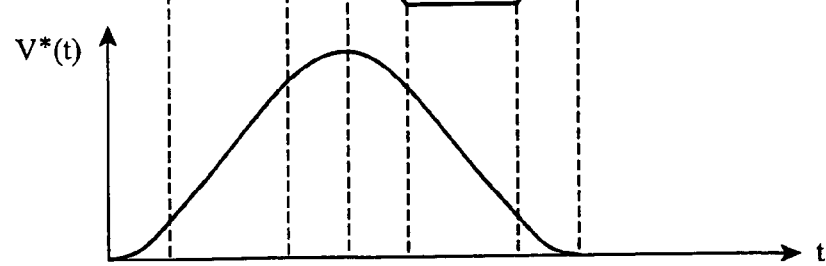
FIG.6B

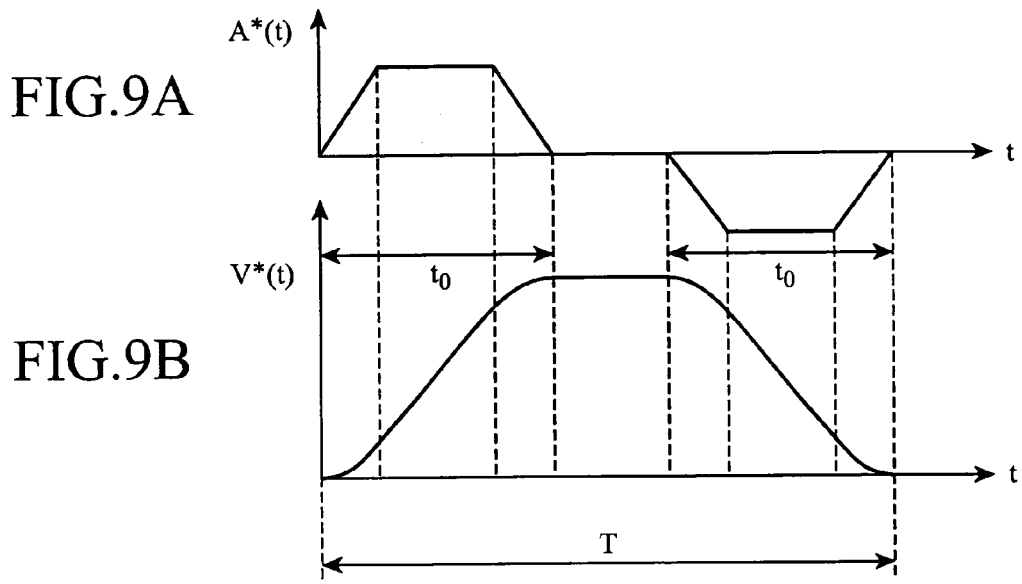
FIG.9A
FIG.9B
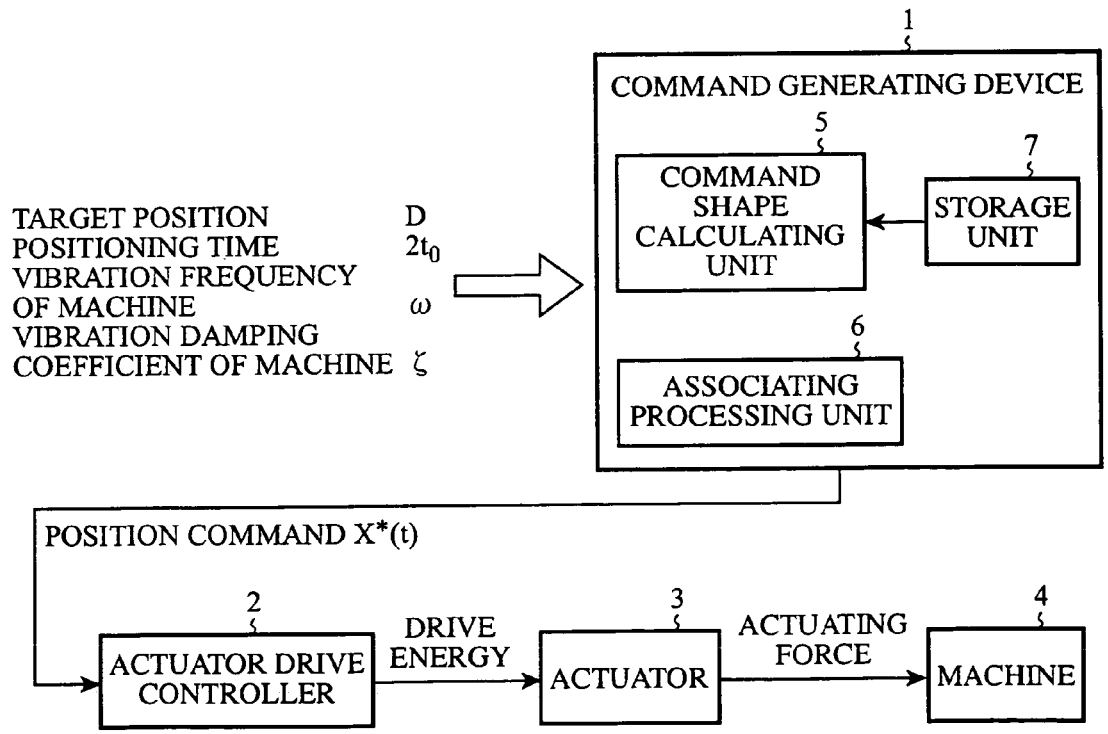
FIG.10

FIG.11

```
START
  ↓
INPUT POSITIONING TIME 2t₀ AND TARGET POSITION D      ~ST1
  ↓
INPUT VIBRATION FREQUENCY ω OF MACHINE                ~ST2
  ↓
DEFINE ACCELERATION COMMAND SHAPE
A**(t) ACCORDING TO EQUATION (26)                     ~ST3a
  ↓
CALCULATE r FROM ω AND t₀ ACCORDING TO TABLE 1        ~ST4a
  ↓
INTEGRATE ACCELERATION COMMAND SHAPE A**(t)           ~ST5
TWICE WITH RESPECT TO TIME TO CALCULATE POSITION
COMMAND SHAPE, AND PERFORM TARGET POSITION
ASSOCIATING PROCESSING BY MULTIPLYING POSITION
COMMAND SHAPE BY CONSTANT FOR MAKING X*(2t₀)
BE EQUAL TO D
  ↓
END
```

FIG.12

| $t_0$/VIBRATION PERIOD | r | $t_0$/VIBRATION PERIOD | r |
|---|---|---|---|
| ... | ... | ... | ... |
| 1 | 0 | 2 | 0 |
| 1.05 | 0.06 | 2.05 | 0.03 |
| 1.1 | 0.13 | 2.10 | 0.07 |
| 1.15 | 0.18 | 2.15 | 0.10 |
| 1.2 | 0.23 | 2.2 | 0.13 |
| 1.25 | 0.28 | 2.25 | 0.15 |
| 1.3 | 0.32 | 2.3 | 0.18 |
| 1.35 | 0.37 | 2.35 | 0.21 |
| ... | ... | ... | ... |

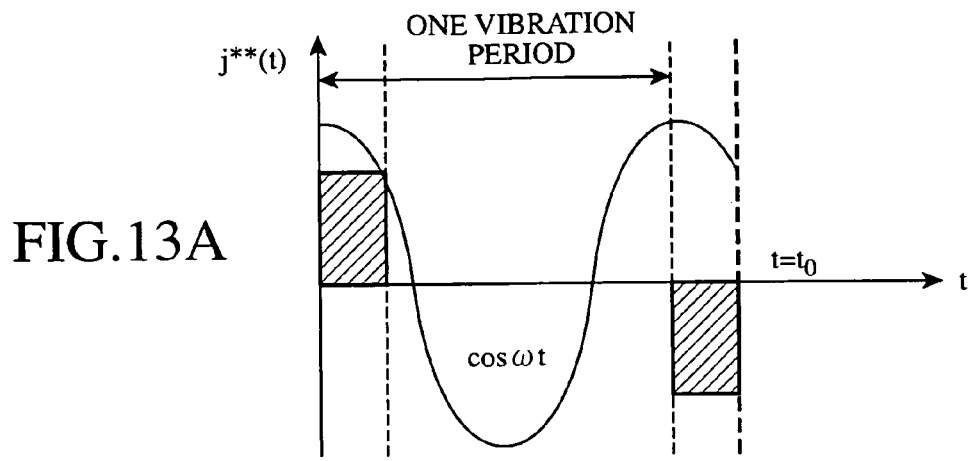
FIG.13A
FIG.13B
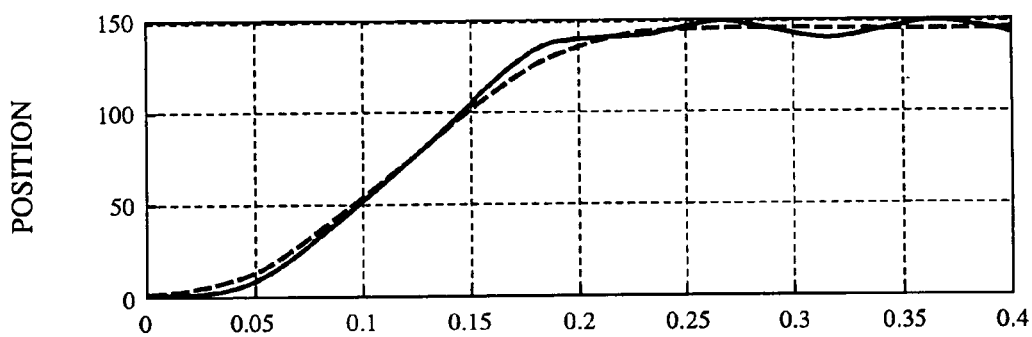
FIG.14A
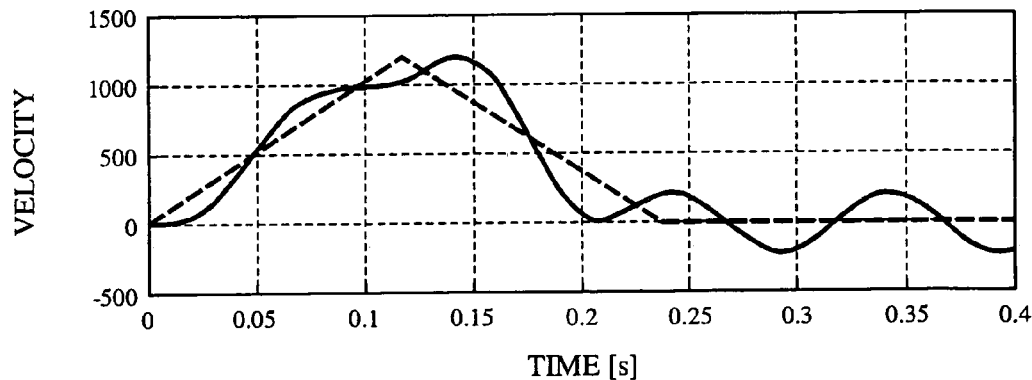
FIG.14B

| $t_0$/VIBRATION PERIOD | r | $t_0$/VIBRATION PERIOD | r |
|---|---|---|---|
| ... | ... | ... | ... |
| 0.7 | 1.2 | 1.7 | 0.2 |
| 0.75 | 1.0 | 1.75 | 1.0 |
| 0.80 | 0.8 | 1.80 | 0.8 |
| 0.85 | 0.6 | 1.85 | 0.6 |
| 0.90 | 0.4 | 1.90 | 0.4 |
| 0.95 | 0.2 | 1.95 | 0.2 |
| 1.00 | 0 | 2.00 | 0 |
| 1.05 | 0.2 | 2.05 | 0.2 |
| 1.10 | 0.4 | 2.10 | 0.4 |
| ... | ... | ... | ... |

TARGET POSITION $V_2$
VELOCITY TRANSITION
COMPLETION TIME $2t_0$
VIBRATION FREQUENCY
OF MACHINE $\omega$
VIBRATION DAMPING
COEFFICIENT OF MACHINE $\zeta$
CURRENT VELOCITY $V_1$

POSITION COMMAND GENERATING DEVICE

FIELD OF THE INVENTION

The present invention relates to a command generating device that provides a command to a control device for driving and controlling an actuator for actuating a machine, particularly a machine with low rigidity.

BACKGROUND OF THE INVENTION

There have been provided related art command generating devices which can suppress vibrations at the time of actuation of a machine by inserting a filter, such as a notch filter, into a path via which a command for positioning and actuating the machine is delivered to the machine, so as to eliminate signal components having frequencies equal to the resonance frequencies of vibrations which can occur in the machine from the command (refer to, for example, patent reference 1).

An apparatus disclosed by patent reference 2 forms a command based on a phase plane which is based on a dynamic behavior of a target machine to be driven when changing an acceleration command stepwise according to the period of a vibration which occurs in the machine. The apparatus disclosed by patent reference 2 thus suppresses deformation in the machine to static deformation or less to enable the machine to move at a high velocity.

As disclosed by patent reference 3, there has been provided a command generating method of defining a vibration model for a target machine to be driven, and determining coefficient parameters about a polynomial shape command by performing calculations, such as calculations of simultaneous linear equations with more than one unknown, under conditions that the machine stops at a positioning start time and a positioning time, based on this model, thereby making the machine, such as a flexible structure with low rigidity, follow the command.

A method disclosed by patent reference 4 can suppress vibrations which occur in a target machine to be driven when the machine moves by providing a command having an acceleration time period and a deceleration time period which are integral multiples of the mechanical vibration period, respectively.

[Patent reference 1] JP,2003-65385,A
[Patent reference 2] Japanese patent No. 2551868
[Patent reference 3] JP,2002-91570,A
[Patent reference 4] JP,54-98477,A

DISCLOSURE OF THE INVENTION

A problem with the related art command generating device disclosed by patent reference 1 is that the filter which is inserted into the path for delivery of the positioning command increases the command outgoing time as compared with the command outgoing time which is provided to the command before the insertion of the filter, and this results in a delay in the positioning operation with respect to a desired positioning time. Another problem is that when a notch filter is used as the filter, since the command signal is shaped so as to have a shape which changes steeply, vibrations of higher mode can be easily excited, and therefore the related art command generating device cannot cause the actuator to operate according to the command which has such a steep change because the equipment to be driven does not have sufficiently-high tracking characteristics.

A problem with the apparatus disclosed by patent reference 2 is that since the acceleration command shape changes stepwise, the command signal contains many high-frequency components and hence easily excite vibrations of higher mode, and therefore the related art apparatus cannot cause the actuator to operate according to the command as long as the equipment to be driven does not have sufficiently-high tracking characteristics.

A problem with the method disclosed by patent reference 3 is that it is impossible to predict what kind of shape the calculated shape command has before the calculation of the coefficient parameters, and therefore it cannot be denied that there is a possibility that the calculated shape command has a shape unsuitable for the positioning command signal, such as a shape which causes the target machine to pass the target position once, and to move backward and reach the target position.

Another problem is that when the number of conditions for the coefficient matrix of the simultaneous linear equations with more than one unknown is large on calculating solutions of the simultaneous linear equations, the formation of the command value with the coefficients including the error causes residual vibrations because it cannot satisfy end conditions strictly, and the target machine may be positioned to a position different from the target position at the worst.

A problem with the method disclosed by patent reference 4 is that it is impossible to determine the acceleration and deceleration time periods arbitrarily, and therefore, especially in a case where a velocity command shape is a triangular one, the application of the related art method makes it impossible to position the target machine at a desired positioning time.

The present invention is made in order to solve the above-mentioned problems, and it is therefore an object of the present invention to provide a command generating device that provides a command which can position even a machine with low rigidity at a desired positioning time without exciting any vibration in the machine.

In accordance with the present invention, there is provided a command generating device including: a command shape calculating unit for calculating an nth derivative command shape signal having a value which is equal to a fixed multiple of an nth derivative with respect to time of a position command for causing a target to be driven and controlled to reach a target position at a positioning time so that a convolution of a velocity command which is a first derivative with respect to time of the position command and an impulse response of a transfer function which is determined from a frequency of a vibration which occurs in the target to be driven and controlled becomes equal to zero, the convolution being calculated over the time period from the positioning time onward; and an associating processing unit for integrating the nth derivative command shape signal which is calculated from the position command by the command shape calculating unit n times with respect to time, and for multiplying the integral result by a constant which associates the position command at the positioning time with the target position so as to determine the position command.

As previously mentioned, the command generating device includes the command shape calculating unit for calculating the nth derivative command shape signal having a value which is equal to a fixed multiple of the nth derivative with respect to time of a position command for causing the target to be driven and controlled to reach the target position at the positioning time so that the convolution of the velocity command which is the first derivative with respect to time of the position command and the impulse response of the transfer function which is determined from the frequency of the vibration which occurs in the target to be driven and controlled becomes equal to zero, the convolution being calculated over the time period from the positioning time onward, and the associating processing unit for integrating the nth derivative command shape signal which is calculated from the position command by the command shape calculating unit n times with respect to time, and for multiplying the integral result by the constant which associates the position command at the positioning time with the target position so as to determine the position command. Therefore, the present invention offers an advantage of being able to provide a command which making it possible to perform a positioning operation without any delay to the desired positioning time and without exciting any vibration in the target to be driven and controlled even if the target is a machine with low rigidity.

Further objects and advantages of the present invention will be apparent from the following description of the preferred embodiments of the invention as illustrated in the accompanying drawings.

BRIEF DESCRIPTION OF THE FIGURES

FIG. 3 is a diagram showing an example of an acceleration command shape in accordance with embodiment 1;

FIGS. 4A to 4C are diagrams showing command shapes in accordance with embodiment 1;

FIGS. 5A to 5C are diagrams showing command shapes in accordance with embodiment 1;

FIGS. 6A and 6B are diagrams showing the shape of an S-curve acceleration-and-deceleration command;

FIGS. 9A and 9B are diagrams showing the shape of an acceleration command and that of a velocity command which is obtained by integrating the acceleration command once with respect to time;

FIG. 10 is a block diagram showing the structure of a command generating device in accordance with embodiment 3 of the present invention;

FIG. 11 is a flowchart showing an operation of generating a position command $X^*(t)$ in accordance with embodiment 3;

FIG. 12 is a diagram showing table 1 which is used when calculating command shapes;

FIGS. 13A and 13B are diagrams showing the shape of an S-curve acceleration-and-deceleration command in accordance with embodiment 1;

FIGS. 14A and 14B are graphs showing a numerical calculation example to which a triangle-shaped velocity command is applied;

PREFERRED EMBODIMENTS OF THE INVENTION

Embodiment 1.

Figure 1:
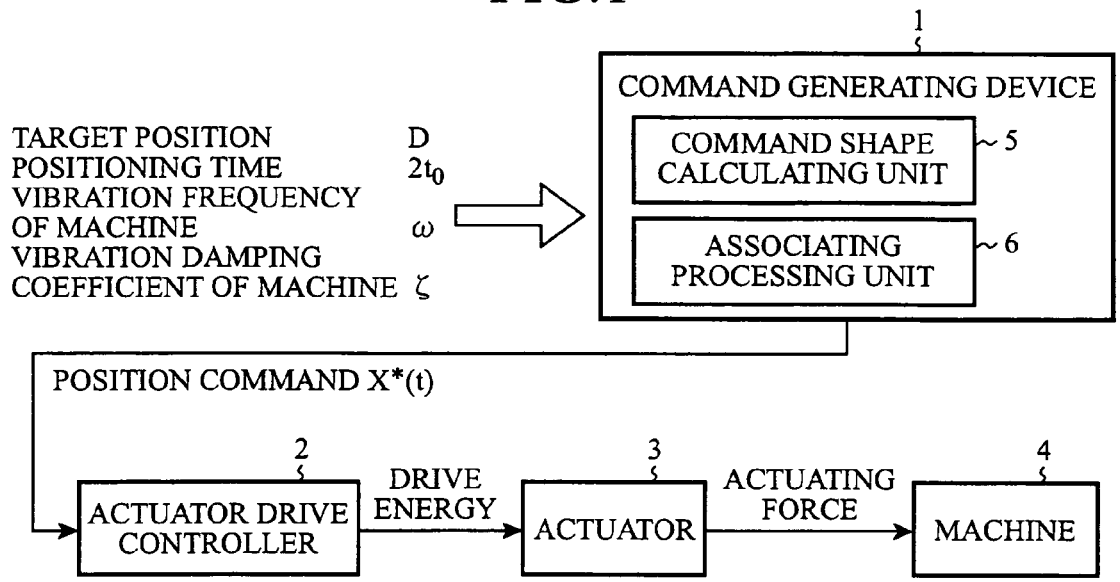
FIG. 1 is a block diagram showing the structure of an actuating control system for actuating a machine, to which a command generating device in accordance with embodiment 1 of the present invention is applied.

FIG. 1 is a block diagram showing the structure of a drive control system for actuating and controlling a machine, to which a command generating device in accordance with embodiment 1 of the present invention is applied. In the figure, the actuating control system is provided with the command generating device 1 in accordance with this embodiment, an actuator drive controller 2, an actuator 3, and the machine (i.e., a target to be driven and controlled) 4 which is driven and controlled by the actuator.

The actuator drive controller 2 supplies drive energy to the actuator 3 so as to control actuation of the machine 4 using the actuator 3. For example, when the actuator 3 is a servo motor, the actuator drive controller 2 is a servo amplifier which supplies a current to the servo motor. The actuator drive controller 2 can perform feedback control by using a control loop in which it compares a target command with a detected value, or can control the actuator by using an open loop which is not a control loop. As an alternative, the actuator drive controller 2 can perform two-degree-of-freedom control or the like.

The actuator 3 provides an actuating force directly to the machine 4 so as to drive the machine. The actuator 3 has only to drive the machine 4. For example, the actuator 3 can be a rotation servo motor, a linear motor, a stepping motor, a hydraulic motor, a piezo-electric element, or the like. The machine 4 is made to perform a desired positioning operation according to the actuating force generated by the actuator 3. Although the machine 4 can be a robot, a driving unit used for semiconductor manufacturing apparatus, or the like, for example, the machine 4 can be anything which requires point to point control. In general, since the machine 4 has parts with low rigidity, the positioning operation performed by the machine causes a vibration which originates from the parts with low rigidity at the time when the machine stops and this results in making the settling characteristics at the time of positioning worse.

The command generating device 1 provides a position command $X^*(t)$ to the actuator drive controller 2 at each time t based on a distance D (referred to as a target position D from here on) between a current position and a desired position to which the machine is to be positioned, a positioning time $2t_0$, the vibration frequency $\omega$ of the machine, and the vibration damping coefficient $\zeta$ of the machine. The command generating device 1 has a command shape calculating unit 5 and an associating processing unit 6. The position command $X^*(t)$ starts at the time t=0, and becomes $X^*(2t_0)=D$ at the time t= the positioning time $2t_0$.

When the command generating device 1 generates the position command $X^*(t)$, the command shape calculating unit 5 calculates an nth derivative command shape signal having a value which is equal to a fixed multiple of the nth derivative with respect to time of the position command $X^*(t)$ so that a convolution of the impulse response of a transfer function which is determined from both the vibration frequency $\omega$ and vibration damping coefficient $\zeta$ of the machine 4, and a velocity command $V^*(t)$ which is the first derivative with respect to time of the position command $X^*(t)$ becomes equal to zero, the convolution being calculated over the time period from the positioning time onward. The associating processing unit 6 integrates the nth derivative command shape signal which is calculated from the position command $X^*(t)$ n times with respect to time and multiplies the integral result by a constant so as to associate the position command at the positioning time with the target position D.

Figure 2:
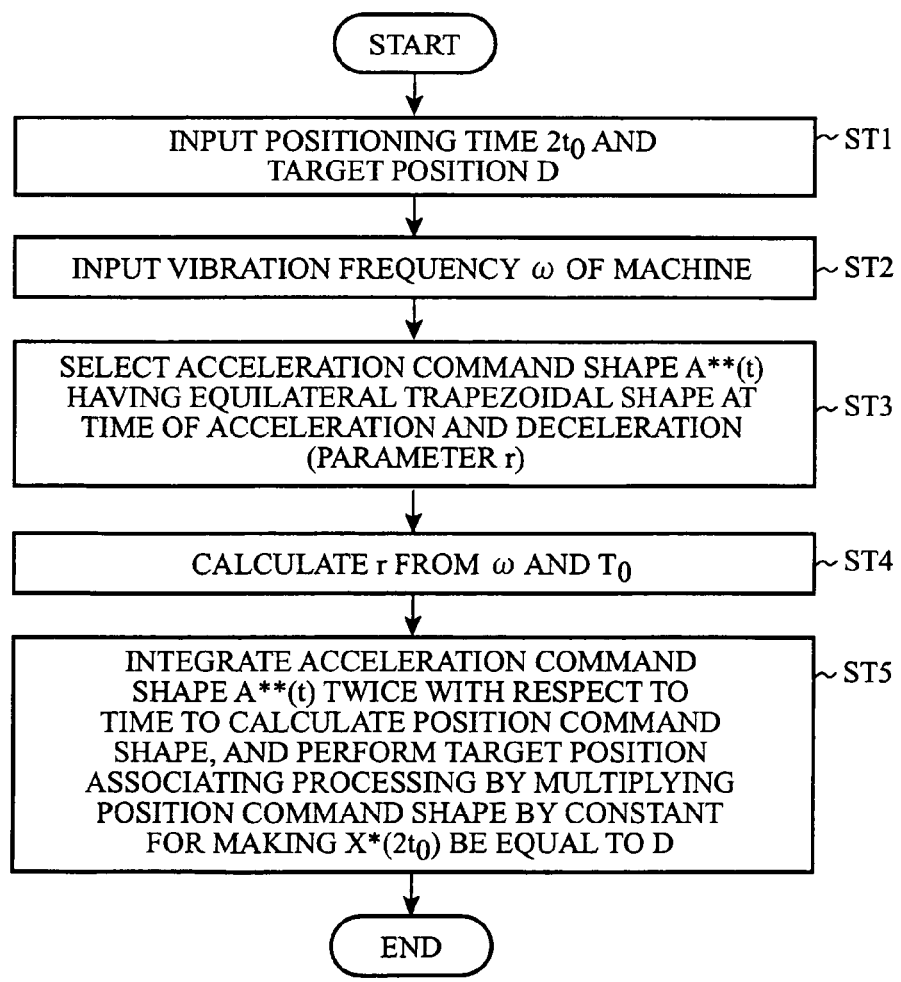
FIG. 2 is a flowchart showing an operation of generating a position command $X^*(t)$ in accordance with embodiment 1.

Next, the operation of the command generating device in accordance with this embodiment of the present invention will be explained. FIG. 2 is a flowchart showing an operation of generating the position command $X^*(t)$ of the command generating device in accordance with embodiment 1. The details of the generating operation will be explained with reference to this flow and FIG. 1. First, a desired positioning time $2t_0$ and a target position D for the positioning operation of the machine 4 are inputted into the command generating device 1 (in step ST1). Next, in step ST2, the vibration frequency $\omega$ of the machine 4 which is acquired beforehand for the machine 4 is inputted into the command generating device 1. For example, when the machine performs the positioning operation in advance, a vibration which occurs in the machine 4 is monitored and the frequency of the vibration is determined.

Next, the command shape calculating unit 5 in the command generating device 1 calculates a command shape (i.e., an nth derivative command shape signal) from the position command $X^*(t)$ in steps ST3 to ST4. First, in step ST3, the command shape calculating unit 5 determines an acceleration command shape $A^{**}(t)$ from the second derivative with respect to time of the position command $X^*(t)$. The acceleration command shape $A^{**}(t)$ is equal to a fixed multiple of an acceleration command $A^*(t)$ which is the second derivative with respect to time of the position command $X^*(t)$. That is, a certain constant k exists and the following relationship: $A^{**}(t)=kA^*(t)$ is established between $A^{**}(t)$ and $A^*(t)$.

FIG. 3 is a diagram showing an example of the acceleration command shape $A^{}(t)$ which is generated by the command generating device in accordance with embodiment 1. In the figure, the acceleration command shape $A^{}(t)$ is defined by the following equations (1) and (2). Next, a case where the command shape calculating unit 5 selects a shape as shown in FIG. 3 from among shapes which are pre-registered as the acceleration command shape $A^{}(t)$ for the positioning operation of the machine 4 will be explained as an example. Time periods tA, tB, tC, and tD have a time length $rxt_0$. The time periods tA and tC are rising ones which specify the trapezoidal shape of the acceleration command shape $A^{}(t)$, and the time periods tB and tD are falling ones which specify the trapezoidal shape of the acceleration command shape $A^{**}(t)$.

$$A^{}(t) = a^{}(t) - a^{**}(2t_0 - t) \tag{1}$$

$$a^{**}(t) = \begin{cases} ct & (0 \leq t \leq rt_0) \\ crt_0 & (rt_0 < t < (1-r)t_0) \\ -ct + ct_0 & ((1-r)t_0 \leq t \leq t_0) \\ 0 & (\text{otherwise}) \end{cases} \tag{2}$$

where c is a constant (it can be safely said that c=1), and r is a parameter and is defined as (the time required for the acceleration command shape to reach the highest acceleration from 0)/$t_0$.

Next, the command shape calculating unit 5 calculates the parameter r using the inputted vibration frequency $\omega$ of the machine 4 according to the following equation (3) (in step ST4).

$$r = 1 - [t_0\omega/(2\pi)](2\pi/\omega/t_0) \quad (3)$$

The command shape calculating unit 5 then defines the time required for the acceleration command shape signal to have the highest acceleration value from 0 using the following equation (4), and determines the acceleration command shape signal.

$$t_0 - [t_0\omega/(2\pi)](2\pi/\omega) \quad (4)$$

The notation [z] in the above-mentioned equation is Gauss' notation showing the largest integer value that does not exceed z.

When the command shape calculating unit 5 determines the acceleration command shape signal as mentioned above, the associating processing unit 6 carries out a process of associating the position command at the positioning time with the target position D based on the acceleration command shape signal (in step ST5). To be more specific, the associating processing unit 6 integrates the acceleration command shape $A^{**}(t)$ which is obtained in the above-mentioned step twice according to the following equation (5), and obtains the position command $X^*(t)$ by multiplying the integral result by the constant C which causes the machine to move to the target position D at the positioning time $2t_0$.

$$X^*(t) = C \times \int_0^t \int_0^{\tau_1} A^{**}(\tau) d\tau d\tau_1 \quad (5)$$

$$C = \frac{D}{\int_0^{2t_0} \int_0^{\tau_1} A^{**}(\tau) d\tau d\tau_1}$$

As will be explained below, when the machine 4 performs the positioning operation, the machine 4 can be made to operate in response to the position command $X^*(t)$ generated according to the above-mentioned procedure without any vibration being excited at the time when the machine is stopped.

First, an expression (6) of the machine's final position $X(t)$ with the position command $X^*(t)$, which is determined by the vibration frequency $\omega$ of the machine, is given as follows:

$$\hat{X}(s) = \frac{\omega^2}{s^2 + \omega^2} \hat{X}^*(s) \quad (6)$$

where s is the Laplacian operator, and $X(s)$ hat and $X^*(s)$ hat (hat phonetically means ^) are Laplace transforms of $X(t)$ and $X^*(t)$, respectively.

When a velocity command $V^*(t)$ which is the first derivative with respect to time of the position command $X^*(t)$, and the machine's final velocity $V(t)$ are used, the following equation (7) is established similarly.

$$\hat{V}(s) = \frac{\omega^2}{s^2 + \omega^2} \hat{V}^*(s) \quad (7)$$

where $V^*(s)$ hat is a Laplace transform of $V^*(t)$, and $V(s)$ hat is a Laplace transform of the machine's final velocity $V(t)$ (also in this case, hat phonetically means ^).

When the above-mentioned equation (7) is rewritten in the form of time domain using $\sin\omega t$ which is the impulse response of a transfer function $\omega^2/(s^2+\omega^2)$, the following equation (8) is obtained. For the positioning time $2t_0$, the velocity command $V^*(t)$ has a shape which is symmetric with respect to the time to as shown in the following equation (9). In this case, $v^*(t)$ has a relationship shown by the following equation (10).

$$V(t) = \int_0^t \sin\omega(t-\tau) V^*(\tau) d\tau \quad (8)$$

$$V^*(t) = v^*(t) + v^*(2t_0 - t) \quad (9)$$

$$v^*(t) \begin{cases} \neq 0 & (0 < t \leq t_0) \\ = 0 & \text{(otherwise)} \end{cases} \quad (10)$$

At this time, the acceleration command $A^*(t)$ which is the second derivative with respect to time of the position command $X^*(t)$, and a jerk command $J^*(t)$ which is the third derivative with respect to time of the position command $X^*(t)$ are given by the following equations, respectively:

$$A^*(t) = a^*(t) - a^*(2t_0 - t), a^*(t) = dv^*(t)/dt$$

$$J^*(t) = j^*(t) + j^*(2t_0 - t), j^*(t) = da^*(t)/dt$$

where $a^*(t) = 0$ and $j^*(t) = 0$ at times $t \leq 0$ and $t > t_0$, as can be seen from the above-mentioned equation (10).

FIGS. 4A to 4C are diagrams showing the shapes of the velocity command, acceleration command, and jerk command which are generated by the command generating device in accordance with embodiment 1. FIG. 4A shows the velocity command $V^*(t)$, FIG. 4B shows the acceleration command $A^*(t)$, and FIG. 4C shows the jerk command $J^*(t)$. Furthermore, FIGS. 4A to 4C show that when $V(t) = 0$ is established at any time after the positioning time $2t_0$, i.e., $t \geq 2t_0$, in the above-mentioned equation (8), the machine 4 continues to stop without any vibration being excited therein. Substitution of the above-mentioned equation (9) into the above-mentioned equation (8) and use of the fact that $V^*(t) = 0$ at $t \geq 2t_0$ and $v^*(t) = 0$ at $t > t0$ and at $t \leq 0$ yields the following equation (11) about $V(t)$. Transformation of variables of integration and $\sin\omega(t_0 - \tau) + \sin\omega(t - 2t_0 + \tau) = 2\sin\omega(t - t_0) \cos(t_0 - \tau)$ which is a formula of the trigonometric functions are used for the deformation of the above-mentioned equation (8) to the following equation (11).

$$V(t) = \int_0^{2t_0} \sin\omega(t-\tau)\{v^*(\tau) + v^*(2t_0 - \tau)\} d\tau \quad (11)$$

$$= \int_0^{t_0} \sin\omega(t-\tau) v^*(\tau) d\tau + \int_{t_0}^{2t_0} \sin\omega(t-\tau) v^*(2t_0 - \tau) d\tau$$

$$= \int_0^{t_0} \sin\omega(t-\tau) v^*(\tau) d\tau + \int_{t_0}^{t_0} \sin\omega(t - 2t_0 + \tau) v^*(\tau) d\tau$$

$$= 2\sin\omega(t - t_0) \int_0^{t_0} \cos\omega(t_0 - \tau) v^*(\tau) d\tau$$

The integral part of the above-mentioned equation (11) is shown by the following equation (12) by using the formula of integration by parts and the fact that $v^*(0) = 0$ at $t > t_0$ and at $t \leq 0$ in the above-mentioned equation (10). Therefore, in order to make $V(t)$ be equal to 0 at $t \geq 2t_0$ in the above-mentioned equation (8), what is necessary is just to look for $v^*(t)$, $a^*(t)$, or $j^*(t)$ which satisfies either of three conditions expressed by the following equations (13), (14), and (15). As a result, commands which prevent occurrence of vibrations can be generated.

$$\int_{t0}^{t_0} \cos\omega(t_0-\tau)v^*(\tau)d\tau = \left[-\frac{1}{\omega}\sin\omega(t_0-\tau)v^*(\tau)\right]_0^{t_0} - \quad (12)$$

$$\int_0^{t_0}\left\{-\frac{1}{\omega}\sin\omega(t_0-\tau)\right\}a^*(\tau)d\tau$$

$$= \frac{1}{\omega}\int_0^{t_0}\sin\omega(t_0-\tau)a^*(\tau)d\tau$$

$$= \frac{1}{\omega^2}(a^*(t_0)-\cos\omega t_0 a^*(0)) -$$

$$\frac{1}{\omega^2}\int_0^{t_0}\cos\omega(t_0-\tau)j^*(\tau)d\tau$$

$$\int_0^{t_0}\cos\omega(t-\tau)v^*(\tau)d\tau = 0 \quad (13)$$

$$\int_0^{t_0}\sin\omega(t_0-\tau)a^*(\tau)d\tau = 0 \quad (14)$$

$$\int_0^{t_0}\cos\omega(t_0-\tau)j^*(\tau)d\tau = 0 \quad a^*(t_0)-\cos\omega t_0 a^*(0) = 0 \quad (15)$$

The above-mentioned equations (13), (14), and (15) express not only the conditions on which the machine 4 stops without any vibration being excited at only the positioning time $2t_0$, but stronger conditions on which the machine continues to stop without any vibration being excited event after the positioning time, i.e., at $t>=2t_0$. The formation of the velocity, acceleration, or jerk command which satisfies either one of the conditional expressions can raise the effect of prevention of vibrations.

It is clear from the above-mentioned equations (13), (14), and (15) that the same relationship is established among the velocity command shape V(t), acceleration command shape A(t), and jerk command shape J**(t) which are equal to fixed multiples of V*(t), A*(t), and J*(t), respectively.

That is, when v**(t) is defined as kv*(t), a**(t) is defined as ka*(t), and j**(t) is defined as kj*(t), where k is a certain constant, and the velocity command shape V(t) is defined as v(t)+v($2t_0$−t), the acceleration command shape A(t) is defined as a(t)−a($2t_0$−t), and the jerk command shape J(t) is defined as j(t)+j**($2t_0$−t), the following equations (16), (17), and (18) are established.

$$\int_0^{t_0}\cos\omega(t-\tau)v^{**}(\tau)d\tau = 0 \quad (16)$$

$$\int_0^{t_0}\sin\omega(t_0-\tau)a^{**}(\tau)d\tau = 0 \quad (17)$$

$$\int_0^{t_0}\cos\omega(t_0-\tau)j^{}(\tau)d\tau = 0 \quad a^{}(t_0)-\cos\omega t_0 a^{**}(0) = 0 \quad (18)$$

The command generating device 1 can form commands which do not excite any vibration when the machine performs the positioning operation by using a command shape which satisfies either one of the above-mentioned equations (16), (17), and (18). Then, the command shape calculating unit 5 looks for a command shape which satisfies either one of the above-mentioned equations (16), (17), and (18) from among the velocity command shape V(t), acceleration command shape A(t), and jerk command shape J**(t). That is, the command shape calculating unit 5 calculates an nth derivative command shape signal (n=1, 2, or 3 in the above-mentioned case) from the position command X*(t) so that a convolution of the impulse response of a transfer function which is determined from the vibration frequency ω of the machine as given by the above-mentioned equation (8) and the velocity command becomes equal to zero, the convolution being calculated over the time period from the positioning time onward.

After that, the command shape calculating unit 5 calculates a position command shape X**(t) by integrating the nth derivative command shape signal which is obtained from the position command X*(t) n times with respect to time. Although the position command shape X(t) thus obtained can suppress vibrations, X($2t_0$) is not equal to D at the positioning time $2t_0$. Therefore, the associating processing unit 6 multiplies X**(t) by a constant which associates the position command at the positioning time with the target position D so as to obtain the position command X*(t). This processing corresponds to the above-mentioned equation (5). When t=$2t_0$ is substituted into the above-mentioned equation (5), X($2t_0$) becomes equal to D.

A jerk command shape J(t)=j(t)+j($2t_0$−t) in which j(t) is given by the following equation (19) can be obtained as an example which satisfies the above-mentioned equations (18).

$$j^{**}(t) = \begin{cases} c & (0 \leq t \leq t_0 - 2\pi/\omega) \\ 0 & (t_0 - 2\pi/\omega < t < 2\pi/\omega) \\ -c & (2\pi/\omega \leq t \leq t_0) \end{cases} \quad (19)$$

where c is an arbitrary positive constant in the above-mentioned equation (19), and it can be safely said that c=1.

FIGS. 5A to 5C are diagrams showing command shapes generated by the command generating device in accordance with embodiment 1. FIG. 5A shows a jerk command shape j(t) during a time period [0, $t_0$], FIG. 5B shows an acceleration command shape a(t) during the time period [0, $t_0$], and FIG. 5C shows a velocity command shape v(t) during the time period [0, $t_0$]. As shown in FIG. 5A, the jerk command shape j(t) has two pulses having constant values and having duration times tA and tB equal to r$xt_0$ during a start and an end of the time period [0, $t_0$], respectively. r$t_0$ is equal to the difference between $t_0$ and the period of a vibration cosωt. As can be seen from FIG. 4A, the value of cosω($t_0$−t) during a time period 0<=t<=tA becomes equal to that of cosω($t_0$−t) during a time period $t_0$−tB<=t<=$t_0$. Therefore, the convolution of j**(t) and cosωt during the time period from the time t=0 to the time t=$t_0$ becomes equal to zero, that is, the first one of the above-mentioned equations (18) is satisfied.

By integrating this j(t) once with respect to time, the acceleration command shape a(t) during the time period [0, $t_0$] as shown in FIG. 5B is obtained. The acceleration command shape having a trapezoidal shape therefore becomes equal to zero at the times t=0 and $t_0$, i.e., a(0)=0 and a($t_0$)=0, and the following relationship: a($t_0$)−cosω$t_0$a(t)=0 is satisfied. Therefore, it is understood that the second one of the above-mentioned equations (18) is satisfied. The velocity command shape v(t) during the time period [0, $t_0$] as shown in FIG. 5C is obtained by integrating a(t) once with respect to time.

In general, when to (>=2π/ω) is provided, the jerk command shape j(t) during the time period [0, $t_0$] is defined by a relationship given by the following equation (20). The acceleration shape which is determined by the above-mentioned equations (1), (2), and (3) is acquired by integrating the jerk command shape J(t)=j(t)+j($2t_0$−t) once with respect to time. This jerk command shape has two pulses having constant values and having a duration equal to the difference between $t_0$ and a product of the vibration period and $[(t_0\omega)/(2\pi)]$ during a start and an end of the time period $[0, t_0]$, respectively. The jerk command shape meets the first one of the above-mentioned equations (18), as well as the above-mentioned equation (19).

$$j^{**}(t) = \begin{cases} c & (0 \leq t \leq t_0 - t_A) \\ 0 & (t_0 - t_A < t < t_A) \\ -c & (t_A \leq t \leq t_0) \end{cases} \quad (20)$$

where $t_A = (2\pi/\omega)([t_0 \times \omega]/(2\pi))$

A command pattern which makes the shape of the acceleration command be a trapezoidal one as mentioned above is currently called an S-curve acceleration-and-deceleration command pattern. FIGS. 6A and 6B are diagrams showing command shapes of an S-curve acceleration-and-deceleration command pattern which is generated as mentioned above. FIG. 6A shows an acceleration command $A^{}(t)$, and FIG. 6B shows a velocity command $V^{}(t)$. In the S-curve acceleration-and-deceleration command pattern, since the acceleration command $A^{**}(t)$ has a continuous shape as shown in FIG. 6A, an advantage of softening shocks at the time of actuation of the machine is known.

The command generating device in accordance with this embodiment offers another advantage of suppressing vibrations at the time of positioning control in addition to this advantage. Conventionally, the parameter r in the above-mentioned equation (2) is determined by trial and error for the S-curve acceleration-and-deceleration command pattern. In contrast, in accordance with this embodiment, the parameter r of the S-curve acceleration-and-deceleration command pattern can be determined automatically using the vibration frequency $\omega$ of the machine 4 and the positioning operation time $2t_0$.

When the command shapes in accordance with this embodiment 1 are used, $V(t)=0$ is established at the time $t=2t_0$ in the above-mentioned equation (8). As a result, the positioning operation can be completed at the desired positioning time $2t_0$. In other words, the positioning operation can be performed without any delay to the desired positioning time $2t_0$. As shown in the flowchart of FIG. 2, complicated data processing for obtaining the position command, such as solving higher order equations, is not included in the positioning operation. Therefore, the command generating device 1 in accordance with this embodiment 1 can be implemented without having to use any expensive processor which can perform complicated data processing.

As shown in FIGS. 6A and 6B, the acceleration command during an acceleration time period ($0<=t<=t_0$) or a deceleration time period ($t_0<=t<=2t_0$) is continuous, and does not experience any rapid change which rises during the acceleration time period (or during the deceleration time period), after that, descends in a short time, and then rises again. In this case, many high-frequency components are not contained in the acceleration command signal. On the contrary, when the acceleration command signal is discontinuous or experiences a rapid change which rises during the acceleration time period (or during the deceleration time period), after that, descends in a short time, and then rises again, it is clear that many high-frequency components are contained in the acceleration command signal. When a command including many high-frequency components is provided to the actuator drive controller having a low degree of trackability (i.e., responsibility), the actuator drive controller and actuator cannot follow a steep motion, i.e., the high-frequency components of the command, and this results in vibrations in the machine. In contrast, the command generating device in accordance with the present invention can prevent vibrations resulting from the lack of the trackability of the actuator drive controller.

Two or more modes of vibration exist in the machine, and a dominant mode of vibration (usually, a low-frequency mode of vibration) affects the machine's operation in many cases. When the machine is made to operate according to a command including many high-frequency components, not only a dominant mode of vibration but a higher-frequency mode of vibration can be easily excited. The command generating device in accordance with the present invention makes it difficult for such a higher-frequency mode of vibration to be excited in the machine. As mentioned above, the command generating device in accordance with the present embodiment offers an advantage of making it difficult for vibrations resulting from high-frequency components contained in the command to be excited in the machine.

As mentioned above, the command generating device in accordance with this embodiment 1 is provided with the command shape calculating unit 5 for calculating an nth derivative command shape signal having a value, which is equal to a fixed multiple of the nth derivative with respect to time of a position command for moving the machine 4 to a target position D during the time period from the time t=0 to the time t=a positioning time $2t_0$, so that a convolution of a velocity command which is the first derivative with respect to time of the position command and the impulse response of a transfer function which is determined from the frequency $\omega$ of a vibration which occurs in the machine 4 when being moved becomes equal to zero, the convolution being calculated over the time period from the positioning time onward, and the associating processing unit 6 for integrating the nth derivative command shape signal which is calculated from the position command by the command shape calculating unit 5 n times with respect to time, and for multiplying the integral result by a constant which associates the position command at the positioning time $2t_0$ with the target position D so as to determine the position command. Therefore, even if the machine 4 has low rigidity, the command generating device can provide a command which can position the machine without any delay to the desired positioning time $2t_0$ to the machine without any vibration being excited in the machine.

In order to obtain the position command $X^*(t)$ as shown by the above-mentioned equation (5), the nth derivative command shape which is a fixed multiple of the nth derivative with respect to time of the position command is calculated, the nth derivative command shape is then integrated n times with respect to time, and the integral result is multiplied by the constant C which associates the position command at the positioning time $2t_0$ with the target position D. Therefore, the position command $X^*(t)$ satisfies the condition that the position command must make the machine reach the target position at the positioning time, i.e., the condition that $X^*(2t_0)=D$ at the time $t=2t_0$, which is the one which the position command should satisfy at worst.

Embodiment 2.

The position command explained in above-mentioned embodiment 1 is the one in which the positioning time is $2t_0$, and the acceleration and deceleration time periods are $t_0$, respectively. In contrast, a command generating device in accordance with this embodiment 2 can generate a position command in which a positioning time $T_0$, and acceleration and deceleration time periods $t_0$ are independently determined by using command values explained in embodiment 1. A procedure of this embodiment will be shown below.

Figure 7:
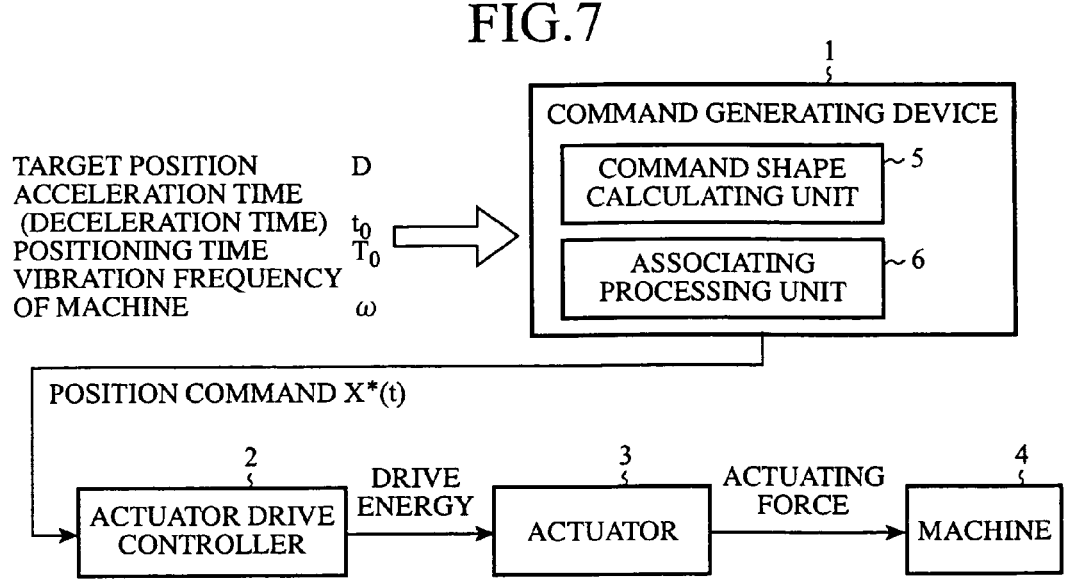
FIG. 7 is a block diagram showing the structure of an actuating control system for actuating a machine, to which a command generating device in accordance with embodiment 2 of the present invention is applied.

FIG. 7 is a block diagram showing the structure of an actuating control system for actuating and controlling a machine, to which the command generating device in accordance with embodiment 2 of the present invention is applied. The command generating device in accordance with this embodiment 2 differs from that of FIG. 1 in that the command generating device in accordance with this embodiment 2 generates a position command based on the positioning time $T_0$ and acceleration time period (or deceleration time period) $t_0$.

Figure 8:
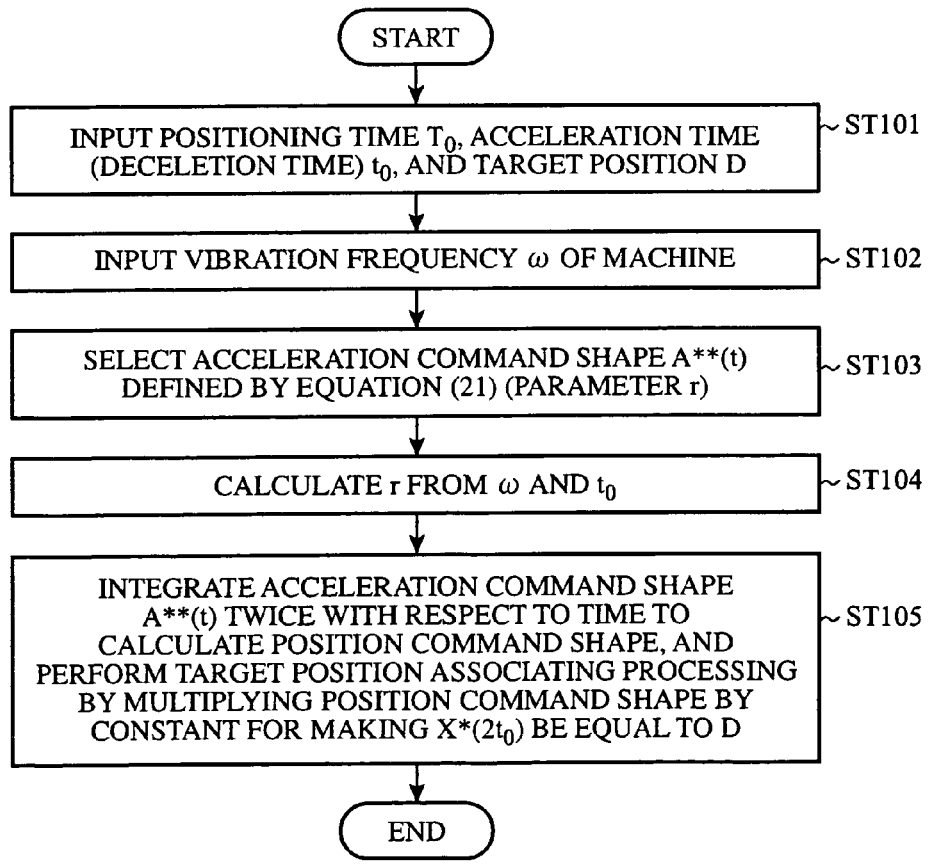
FIG. 8 is a flowchart showing an operation of generating a position command $X^*(t)$ in accordance with embodiment 2.

Next, the operation of the command generating device in accordance with this embodiment of the present invention will be explained. FIG. 8 is a flowchart showing an operation of generating the position command $X^*(t)$ which is performed by the command generating device in accordance with embodiment 2. This flowchart differs from that of FIG. 2 in that the positioning time $T_0$ and acceleration and deceleration time periods $t_0$ are inputted independently to the command generating device in step ST101, and an acceleration command shape is defined as $A^{}(t)=a^{}(t)+a^{}(T_0/2-t)$ in step ST103, where $a^{}(t)$ is given by the following equation (21):

$$a^{**}(t) = \begin{cases} ct & (0 \leq t \leq rt_0) \\ crt_0 & (t_0 < t < (1-r)t_0) \\ -crt + crt_0 & ((1-r)t_0 \leq t \leq t_0) \\ 0 & (t_0 < t \leq T_0/2) \\ 0 & (\text{otherwise}) \end{cases} \quad (21)$$

FIG. 9 shows the acceleration command shape $A^{}(t)$ and a velocity command shape $V^{}(t)$ which is an integral of the acceleration command shape once with respect to time. It is apparent from comparison with the case of generation of command values as shown in above-mentioned embodiment 1 that a time during of $(T_0-2t_0)$ during which the acceleration is kept at zero is placed between the acceleration and deceleration time periods of the acceleration command shape. After that, the command generating device calculates a parameter r from the vibration frequency ω and acceleration (or deceleration) time period $t_0$ by using the above-mentioned equation (3), as shown in FIG. 2. After that, the command generating device integrates the acceleration command shape twice with respect to time, and obtains the position command $X^*(t)$ by multiplying the integral result by a constant which associates the position command at the positioning time $2t_0$ with a target position.

As will be explained below, when the machine 4 performs the positioning operation, the machine 4 can be made to operate in response to the position command $X^*(t)$ generated according to the above-mentioned procedure without any vibration being excited at the time when the machine is stopped and without any delay to the desired positioning time. In order that the positioning operation can be completed without any vibration being excited at the time when the machine is stopped and without any delay to the desired positioning time, the above-mentioned equation (18) has only to be established between the acceleration command shape and a jerk command shape. Since the positioning time is $T_0$, the above-mentioned equation (18) can be expressed by the following equation (22):

$$\int_0^{\frac{T_0}{2}} \cos\omega\left(\frac{T_0}{2} - \tau\right) j^{**}(\tau) d\tau = 0 \quad (22)$$

$$a^{}(T_0/2) - \cos\omega\frac{T_0}{2} a^{}(0) = 0$$

Hereafter, it will be explained that the above-mentioned equation (21) meets the above-mentioned equations (22). The above-mentioned equations (22) show that the above-mentioned equation (21) meets the second one of the above-mentioned equations (22). Using the equation (21), $j^{**}(t)$ is given by the following equation (23). Using this equation, the left part of the first equation of the above-mentioned equations (22) can be given by the following equation (24):

$$j^{**}(t) = \begin{cases} c & (0 \leq t \leq t_0) \\ 0 & (t_0 < t < (1-r)t_0) \\ -c & ((1-r)t_0 \leq t \leq t_0) \\ 0 & (t_0 < t \leq T_0/2) \\ 0 & (\text{otherwise}) \end{cases} \quad (23)$$

$$\int_0^{\frac{T_0}{2}} \cos\omega\left(\frac{T_0}{2} - \tau\right) j^{**}(\tau) d\tau = \quad (24)$$

$$c\int_0^{rt_0} \cos\omega\left(\frac{T_0}{2} - \tau\right) d\tau - c\int_{(1-r)t_0}^{t_0} \cos\omega\left(\frac{T_0}{2} - \tau\right) d\tau$$

In the above-mentioned equation (3), if $n=[t_0\omega/(2\pi)]$ (the notation [x] is Gauss' notation showing the largest integer value that does not exceed x), n is an integer and $(1-r)t_0=n\times 2\pi/\omega$. When a variable transformation: $t=\tau-(1-r)t_0$ is performed, the second term of the right-hand side of the above-mentioned equation (24) is expressed by the following equation (25), and the right-hand side of the equation (24) becomes equal to zero. That is, it is understood that the first equation of the above-mentioned equations (22) is satisfied. Therefore, the positioning control by using the position command $X^*(t)$ obtained according to the flowchart of FIG. 8 can cause the machine to complete the positioning operation without any vibration being excited in the machine and without any delay to the desired positioning time.

$$c\int_{(1-r)t_0}^{rt_0} \cos\omega\left(\frac{T_0}{2} - \tau\right) d\tau = c\int_0^{rt_0} \cos\omega\left(\frac{T_0}{2} - t - (1-r)t_0\right) dt \quad (25)$$

$$= c\int_0^{rt_0} \cos\omega\left(\frac{T_0}{2} - t - n\frac{2\pi}{\omega}\right) dt$$

$$= c\int_0^{rt_0} \cos\left\{\omega\left(\frac{T_0}{2} - t\right) - 2\pi n\right\} dt$$

$$= c\int_0^{rt_0} \cos\omega\left(\frac{T_0}{2} - t\right) dt$$

As mentioned above, the command generating device in accordance with this embodiment 2 offers an advantage of being able to set the positioning time and acceleration and deceleration time periods independently, in addition to the advantages provided by that of above-mentioned embodiment 1.

Embodiment 3.

FIG. 10 is a block diagram showing the structure of a command generating device in accordance with embodiment 3 of the present invention. The command generating device 1 in accordance with this embodiment 3 is provided with a command shape calculating unit 5 and an associating processing unit 6 which are explained in above-mentioned embodiment 1, and is also provided with a storage unit 7.

The command generating device 1 in accordance with this embodiment 3 establishes an equation showing the frequency component of a command shape signal including a parameter for specifying an nth derivative command shape which is equal to a fixed multiple of the nth derivative with respect to time of a position command, the frequency component varying with a change in the parameter. The command generating device 1 calculates frequencies at which the equation becomes equal to zero dependently upon the change in the parameter in advance. The storage unit 7 stores tabular data (also referred to as table 1 from here on) indicating a one-to-one correspondence between this parameter and both the frequencies at which the frequency component of the command shape signal becomes equal to zero and a positioning time.

In accordance with this embodiment 3, the command shape calculating unit 5 selects a command shape, as will be shown below, in addition to command shapes given by the above-mentioned equation (1) and (2), with reference to the above-mentioned tabular data stored in the storage unit 7.

Next, the operation of the command generating device in accordance with this embodiment of the present invention will be explained. FIG. 11 is a flowchart showing an operation of generating a position command X*(t) which is performed by the command generating device in accordance with embodiment 3. The details of the generating operation will be explained with reference to this flow and FIG. 10. In this flowchart, step ST3 of FIG. 2 shown in above-mentioned embodiment 1 is replaced by step ST3a in which the command generating device selects an acceleration command shape which will be mentioned later, and step ST4 of FIG. 2 is replaced by step ST4a in which the command generating device calculates the parameter r based on the data shown in table 1 and stored in the storage unit 7.

First, a desired positioning time $2t_0$ and a target position D for the positioning operation of the machine 4 are inputted into the command generating device 1 (in step ST1). Next, in step ST2, the vibration frequency $\omega$ of the machine 4 which is acquired beforehand for the machine 4 is inputted into the command generating device 1.

The command shape calculating unit 5 then, in steps ST3a to ST4a, determines the command shape of the position command X*(t). First, the command shape calculating unit 5 in accordance with this embodiment 3, in step ST3a, uses, as an equation used for defining the acceleration command shape A**(t), the following equation (26):

$$A^{**}(t) = \begin{cases} \sin\left(\frac{\pi}{2rt_0}t\right) & (0 \leq t \leq rt_0) \\ 1 & (rt_0 < t < (1-r)t_0) \\ \cos\left(\frac{\pi}{2rt_0}(t-(1-r)t_0)\right) & ((1-r)t_0 \leq t \leq t_0) \\ -\sin\left(\frac{\pi}{2rt_0}(t-t_0)\right) & (t_0 < t \leq (1+r)t_0) \\ -1 & ((1+r)t_0 < t < (2-r)t_0) \\ \cos\left(\frac{\pi}{2rt_0}(t-(2-r)t_0)\right) & ((2-r)t_0 < t \leq 2t_0) \\ 0 & (\text{otherwise}) \end{cases} \quad (26)$$

where r is the ratio parameter, and has a range of 0<=r<=0.5.

The command shape calculating unit 5 then calculates the ratio r which is the parameter for specifying the acceleration command shape which is a fixed multiple of the second derivative with respect to time of the position command according to the tabular data prestored in the storage unit 7 by using the input vibration frequency $\omega$ of the machine 4 and $t_0$ (in step ST4a).

FIG. 12 is a diagram showing the tabular data stored in the storage unit 7. The command shape calculating unit 5, in step ST4a, calculates $t_0$/vibration period=$t_0\omega/(2\pi)$ so as to determine the parameter r according to table 1 shown in FIG. 12. The command shape calculating unit 5 then determines the acceleration command shape A**(t) from the determined ratio r according to the above-mentioned equation (26).

The associating processing unit 6 then, in step ST5, integrates the acceleration command shape A**(t) determined by the command shape calculating unit 5 twice with respect to time, multiplies the integral result by a constant C (i.e., a constant which makes X*($2t_0$) be equal to D) which associates the position command at the positioning time $2t_0$ with the target position D according to the above-mentioned equation (5) so as to determine the position command X*(t).

As will be explained below, when the machine 4 performs the positioning operation, the machine 4 can be made to operate in response to the position command X*(t) generated according to the above-mentioned procedure without any vibration being excited at the time when the machine is stopped and without any delay to the desired positioning time. In accordance with above-mentioned embodiment 1, what is necessary is just to find out a command shape which satisfies either of the above-mentioned equations (16), (17), and (18), as previously explained. It is however difficult for the command generating device to analytically find out a general command shape which satisfies either one of the above-mentioned equations (16), (17), and (18), like that of above-mentioned embodiment 1.

FIGS. 13A and 13B are diagrams showing the shape of the S-curve acceleration-and-deceleration command which the command generating device according to above-mentioned embodiment 1 uses. FIG. 13A shows a jerk command shape which varies during the time period from the time t=0 to the time t=$t_0$ in a case where the positioning time is $2t_0$, and FIG. 13B shows a jerk command shape which varies during the time period from the time t=0 to the time t=$t_0$' in a case where the positioning time is $2t_0$' for $t_0$' at which the S-curve acceleration-and-deceleration command has a value close to that at the time t=$t_0$. FIGS. 13A and 13B and the above-mentioned equation (3) show that when the time $t_0$ changes to $t_0$', the parameter r which does not cause any vibration also changes a little as compared with the parameter r in the case of the time $t_0$. This shows that the parameter r which can suppress vibrations changes according to the change in the positioning time $2t_0$.

Conversely, a change in the parameter r with respect to the positioning time $2t_0$ which is provided to the command generating device can form a command which can suppress vibrations. This fact is also true for not only the command explained by above-mentioned embodiment 1 but a command having a general shape. That is, a command having a command shape which continuously changes depending upon a certain parameter can be changed into a command which does not excite any vibration having a certain frequency for a certain positioning time by changing the parameter continuously.

Then, when it is difficult to analytically find out a command shape which satisfy either of the above-mentioned equations (16), (17), and (18), as mentioned above, for a certain command shape which changes continuously depending upon a parameter like the ratio r, the command generating device determines an equation showing the frequency component of the command shape in the form dependent upon the parameter. Then, by calculating the above-mentioned parameter which makes the equation showing the frequency component of the command shape become 0 for a certain frequency, the command generating device can determine the command shape.

For example, in order to determine an equation showing the frequency component of the above-mentioned equation (26), the command generating device obtains the following equation (27) by carrying out a Laplace transform of the above-mentioned equation (26).

$$\hat{A}^{}(s) = \int_0^\infty A^{}(t)\exp(-st)dt \quad (27)$$
$$= \frac{B}{s^2 + B^2} + \exp(-rt_0 s)\left(-\frac{s}{s^2 + B^2} + \frac{1}{s}\right) +$$
$$\exp(-(1-r)t_0 s)\left(-\frac{1}{s} - \frac{s}{s^2 + B^2}\right) +$$
$$\exp(-(1+r)t_0 s)\left(-\frac{1}{s} + \frac{s}{s^2 + B^2}\right) +$$
$$\exp(-(2-r)t_0 s)\left(\frac{1}{s} - \frac{s}{s^2 + B^2}\right) -$$
$$\exp(-2t_0 s)\frac{B}{s^2 + B^2}$$

$$\left(B = \frac{\pi}{2}\frac{2}{rt_0}\right)$$

Substitution of s=jω into the above-mentioned equation (27) (j is the imaginary unit) yields an equation showing the frequency component of the above-mentioned equation (26). Values of the parameter r which are numerically determined with respect to $t_0$ normalized with the vibration period 2π/ω and which make A**(jω) hat (hat phonetically means ^) become zero are table 1 which is shown in FIG. 12 and which is prestored in the storage unit 7.

The command shape calculating unit 5 can acquire an acceleration command shape which can suppress vibrations when selecting a value of the parameter r from this table 1. Table 1 shows only a part of the calculation results. There are also solutions for a case where $t_0$/vibration period is three or more, and these solutions can be finely stored in the storage unit 7. In the example of table 1 shown in FIG. 12, values of the parameter r are determined in units of 0.05 of $t_0$/vibration period and are stored. As an alternative, values of the parameter r can be finely determined in units of a smaller value and can be stored in table 1.

Next, advantages offered by the present embodiment will be explained with reference to numerical calculation examples. Assume that the command generating device generates a position command for a case where the vibration frequency of the machine 4 is 10 Hz (ω=2π·10=31.4[rad/s]), the target position D=144, and the positioning time $2t_0$=0.24 seconds. First, the description will be directed to a numerical calculation example to which the position command in accordance with the present invention is not applied, but to which a position command that offers a triangle-shaped velocity command which is the first derivative with respect to time of the position command is applied. In the numerical calculation examples which will be mentioned below, the position, velocity, and acceleration are expressed in the form of dimensionless quantity.

FIGS. 14A and 14B are graphs showing the numerical calculation example to which the position command of the present invention is not applied, but to which a triangle-shaped velocity command is applied. FIG. 14A shows the machine's position when a position command which offers the triangle-shaped velocity command is applied to the actuator drive control device 2, and FIG. 14B shows the machine's velocity when the triangle-shaped velocity command is applied to the actuator drive control device 2. A curve shown by a broken line of FIG. 14A indicates the position command, and a solid line of FIG. 14A indicates the machine's position. A curve shown by a broken line in FIG. 14B indicates the velocity command, and a solid line of FIG. 14B indicates the machine's velocity.

In the case of the position command to which the present invention is not applied, a large residual vibration occurs after the positioning time 0.24 seconds and the settling characteristics get worse, as can be seen from the waveform of the machine's velocity shown in FIG. 14B. In addition, the waveform of the machine's position in FIG. 14A shows that the vibration occurs after the positioning time 0.24 seconds.

Figure 15A:
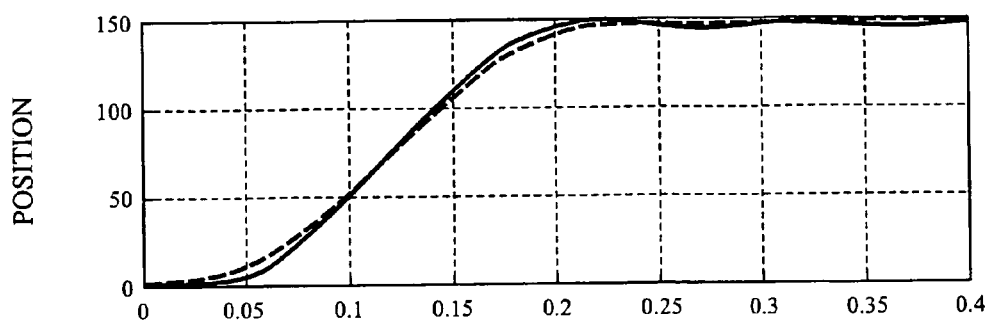
FIGS. 15A and 15B are a numerical calculation example in which a command shape is given by equation (26) and a ratio parameter r=0.4, the example being not pursuant to embodiment 3.
Figure 15B:
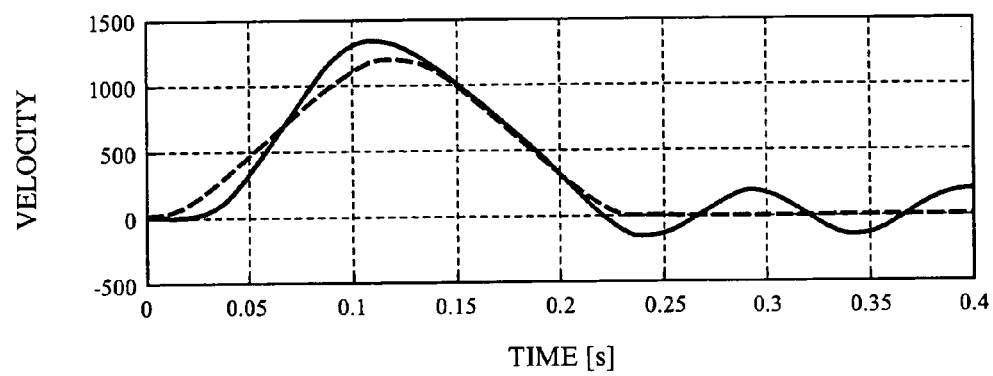

Next, a numerical calculation example will be explained for a case where an acceleration command shape defined by the above-mentioned equation (26) is used, while the ratio parameter r is determined (r=0.4) without using table 1 of FIG. 12. FIGS. 15A and 15B are graphs showing a numerical calculation example in a case where an acceleration command having a trapezoidal shape is applied according to the above-mentioned equation (26), and the ratio parameter r=0.4. FIG. 15A shows a relationship between the position command and the machine's position, and FIG. 15B shows a relationship between the velocity command and the machine's velocity. A curve shown by a broken line of FIG. 15A indicates the position command, and a solid line of FIG. 15A indicates the machine's position. A curve shown by a broken line of FIG. 15B indicates the velocity command, and a solid line of FIG. 15B indicates the machine's velocity.

It is apparent from FIG. 15B that although the use of the acceleration command shape defined by the above-mentioned equation (26) makes the velocity command be smoother than the velocity command of FIG. 14B, a residual vibration occurs after the positioning time 0.24 seconds even if the machine 4 performs the positioning operation according to the position command having this shape, and therefore the settling characteristics get worse. It can be therefore understood that only smoothing the acceleration command shape does not prevent vibrations sufficiently.

Figure 16A:
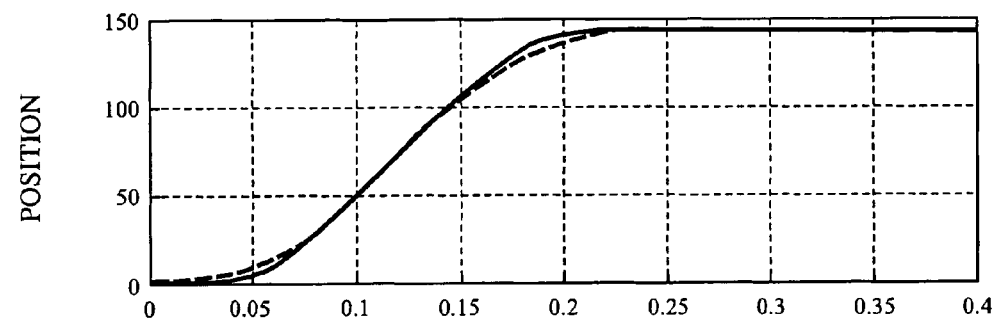
FIGS. 16A and 16B are graphs showing a numerical calculation example of command shapes in accordance with embodiment 3.
Figure 16B:
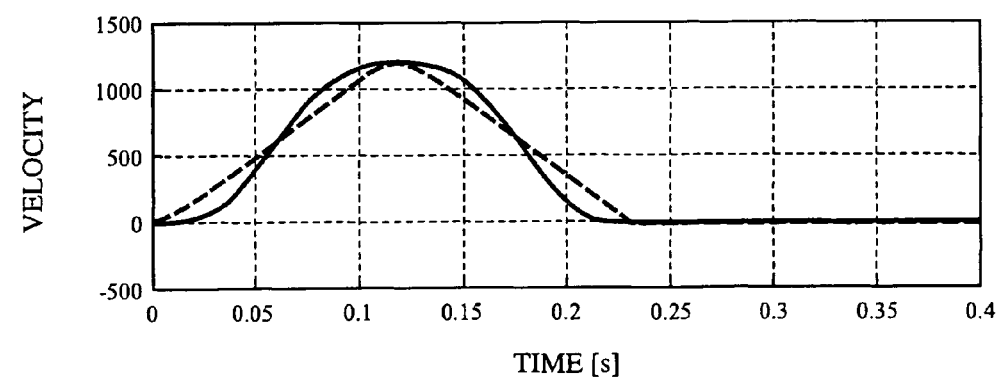

Next, a numerical calculation example in a case where the command shape is determined according to the above-mentioned procedure of the flowchart shown in FIG. 11 will be explained. FIGS. 16A and 16B are graphs showing a numerical calculation example in a case where the command shape is determined by the processing in accordance with embodiment 3. FIG. 16A shows a relationship between the position command and the machine's position, and FIG. 16B shows a relationship between the velocity command and the machine's velocity. A curve shown by a broken line of FIG. 16A indicates the position command, and a solid line of FIG. 16A indicates the machine's position. A curve shown by a broken line of FIG. 16B indicates the velocity command, and a solid line of FIG. 16B indicates the machine's velocity.

In the example of FIGS. 16A and 16B, the ratio r=0.23 is determined from table 1 shown in FIG. 12 according to the procedure shown in FIG. 11, and a position command having an acceleration command shape which is calculated using the parameter r according to the above-mentioned equation (26) is provided. It is apparent from the waveforms shown in FIGS. 16A and 16B that the machine reaches the target position at the positioning time 0.24 seconds, and no residual vibration occurs in the machine after the positioning time 0.24 seconds. The command shape generated in accordance with this embodiment makes it possible for the machine to complete the positioning operation without any delay to the desired positioning time.

Figure 17:
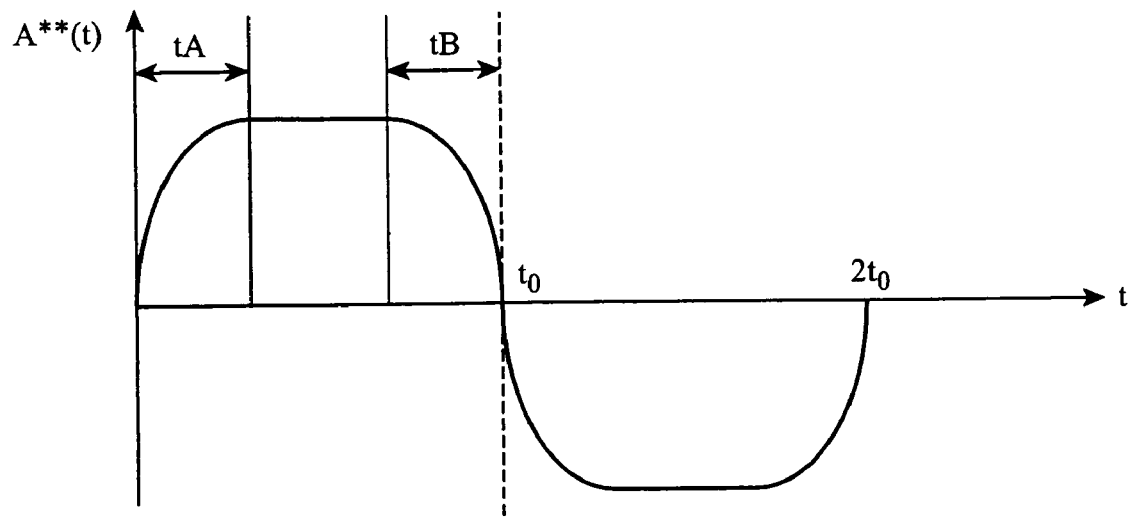
FIG. 17 is a diagram showing an acceleration command shape $A^{**}(t)$ in accordance with embodiment 3.

FIG. 17 is a diagram showing the acceleration command shape A(t) which is calculated by the processing in accordance with embodiment 3. The curve of the acceleration command shape as shown in FIG. 17** which is defined by the above-mentioned equation (26) is called a deformed trapezoidal curve. Since this acceleration command shape which is a deformed trapezoidal curve is continuous, the present embodiment offers an advantage of being able to soften shocks at the time of actuation of the machine. In addition to this advantage, this embodiment offers an advantage of being able to prevent vibrations from occurring in the machine.

As mentioned above, the command generating device in accordance with this embodiment 3 is provided with the storage unit 7 for establishing an equation showing the frequency component of a command shape signal including the parameter for specifying the shape of a position command, the frequency component being dependent upon a change in the parameter, for calculating a frequency at which the equation becomes equal to zero dependently upon the change in the parameter in advance, and for storing tabular data showing a correspondence between this parameter, and both the frequency at which the equation indicating the frequency component of the command shape signal becomes equal to zero and a positioning time, and the command shape calculating unit 5 determines the command shape using the tabular data stored in the storage unit 7. Therefore, the command generating device can obtain the position command which can suppress vibrations without performing complicated calculations using the command shape calculating unit 5.

The command generating device in accordance with this embodiment 3 uses an acceleration command shape signal having a value which is equal to a fixed multiple of the acceleration command which is the second derivative with respect to time of the position command as the command shape signal, as previously mentioned. As an alternative, the command generating device in accordance with this embodiment 3 can use an nth derivative command shape signal having a value which is equal to a fixed multiple of the nth derivative with respect to time of the position command, as the command shape signal. In this case, the same advantage is provided.

Since the shape of the acceleration command is continuous and vertical displacements of the acceleration command shape are not rapid, the command shape seldom includes high-frequency signals. For this reason, the command generating device in accordance with this embodiment can be applied to even actuators and actuator drive control devices having not-so-good responsibility. In addition, the present embodiment offers another advantage of making it possible for the machine to complete the positioning operation of positioning the machine's final position without any delay to the desired positioning time $2t_0$.

The command generating device 1 of this embodiment has only to calculate a relationship between a value which is obtained by normalizing the time variable $t_0$ with the vibration period, and the parameter r which suppresses vibrations, and to have the storage unit 7 for storing tabular data showing the relationship, as shown in FIG. 12. When generating the position command, the command generating device 1 of this embodiment has only to calculate the parameter r from $t_0$ and ω which are inputted thereto using the storage unit 7. Therefore, the command generating device 1 in accordance with this embodiment can generate the position command without carrying out any complicated calculations. Therefore, the command generating device in accordance with this embodiment 3 is especially suitable for a case where much time cannot be spent on the command generation processing, such as a case where another positioning time and another target position are provided immediately and positioning control is carried out using the other positioning time and other target position after one positioning control has been completed. As can be seen from the above description, the command generating device in accordance with this embodiment 3 can be implemented without having to use any expensive processor or the like.

Embodiment 4.

Although a command generating device in accordance with this embodiment 4 has the same structure as that according to above-mentioned embodiment 3 basically, the command generating device in accordance with this embodiment 4 differs from that according to above-mentioned embodiment 3 in that a command shape calculating unit calculates an acceleration command shape which can prevent vibrations with respect to a time $t_0$ which is shorter than the period T of a vibration which occurs in a target machine to be driven.

Figure 18:
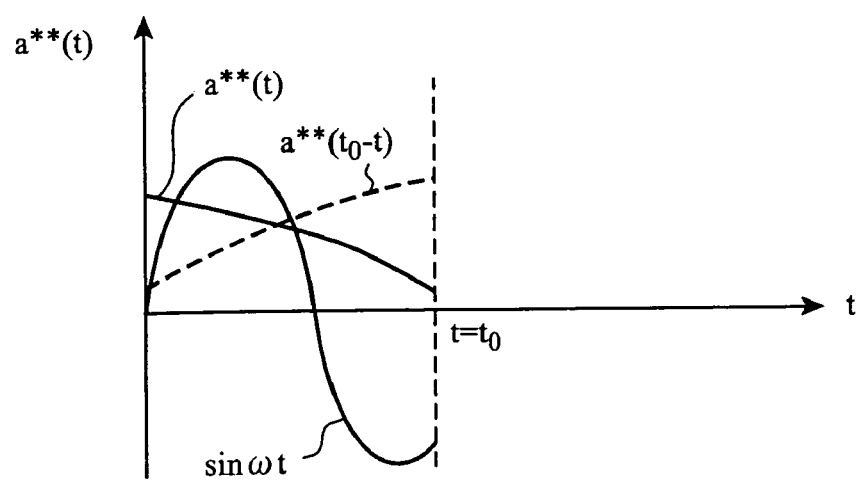
FIG. 18 is a diagram showing an acceleration command shape in accordance with embodiment 4.

FIG. 18 is a diagram showing the acceleration command shape a(t) which is generated by command shape calculating unit in accordance with embodiment 4 and which lasts from the time t=0 to the time t=$t_0$. The acceleration command shape a(t) which lasts throughout the time period from the time t=0 to the time t=$t_0$ during which vibrations can be prevented is shown for the case where $t_0$ is shorter than the vibration period of the machine. Since the left part of the above-mentioned equation (17) can be expressed like the following equation (28), setting the equation (17) to 0 is equivalent to setting the following equation (28) to 0. As shown in FIG. 18, it is determined that a**(t) should have a shape which globally decreases during the time period from the time t=0 to the time t=$t_0$ in order that the above-mentioned equation can be satisfied.

$$\int_0^{t_0} \sin\omega(t_0 - \tau) a^*(\tau) d\tau = \int_0^{t_0} \sin\omega(\tau) a^*(t_0 - \tau) d\tau \tag{28}$$

In accordance with this embodiment 4, the following equation (29) can be provided as a candidate for the acceleration command shape A**(t).

$$A^{**}(t) = \begin{cases} \cos\left(\frac{\pi}{2}\frac{r}{t_0}t\right) & (0 \leq t \leq t_0) \\ -\cos\left(\frac{\pi}{2}\frac{r}{t_0}(2t_0 - t)\right) & (t_0 \leq t \leq 2t_0) \\ 0 & (\text{oherwise}) \end{cases} \tag{29}$$

where r is a parameter and the command shape can be changed by changing the parameter r.

A Laplace transform of the acceleration command shape A(t) which is expressed by the above-mentioned equation (29) and which includes the parameter r yields the following equation (30). Here, ω which makes A(jω)) hat (hat phonetically means ^) become 0 is given by the following equation (31). Therefore, when the vibration frequency ω of the machine and a desired positioning time $2t_0$ are provided, the parameter r is given by the following equation (32), and the parameter r can be determined according to this equation.

$$\hat{A}^{**}(s) = \frac{s}{s^2+B^2}(1-2\cos Bt_0\exp(-t_0s)+\exp(-2t_0s)) \quad (30)$$
$$B = \frac{\pi r}{2t_0}$$

$$\omega = \left(\pm\frac{r}{2}+2m\right)\pi \times \frac{1}{t_0} \quad (31)$$
(m: integer equal to or larger than 1)

$$r = \pm 2\left(\frac{\omega t_0}{\pi}-2m\right) \quad (32)$$

Figures 19, 20:
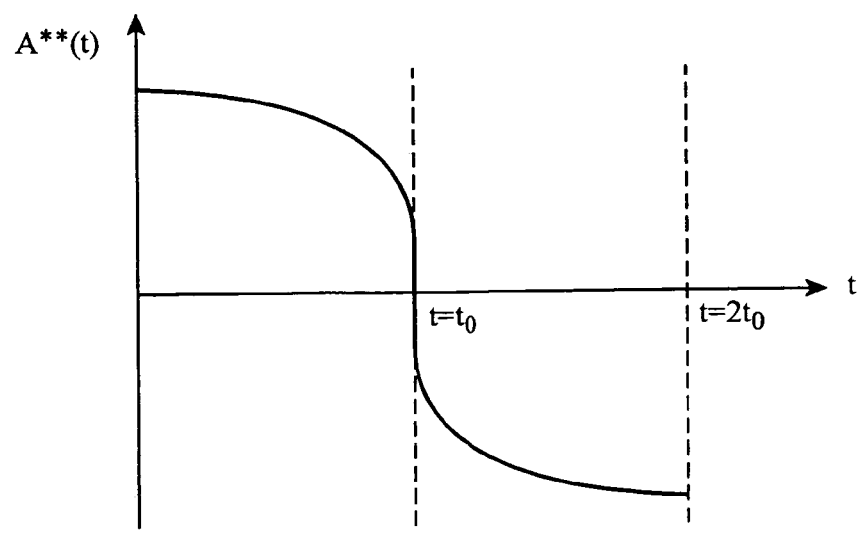
FIG. 19 is a diagram showing table 2 which used when calculating the acceleration command shape in accordance with embodiment 4.
FIG. 20 is a diagram showing the acceleration command shape in accordance with embodiment 4.

There is a degree of freedom in each of the variable m and selection of the positive and negative signs ± in the above-mentioned equation (32). FIG. 19 is a diagram showing tabular data (referred to as table 2 from here on) stored in a storage unit of the command generating device in accordance with embodiment 4. In the above-mentioned equation (32), the variable m is determined and the positive or negative sign is selected so that the parameter r becomes as small as possible. The parameter r is then calculated for a variable which is obtained by normalizing the time variable $t_0$ with the vibration period (i.e., a value which is calculated by dividing $t_0$ by the vibration period), and is stored in table 2.

When the vibration frequency ω of the machine 4 and positioning time $2t_0$ are input to the command generating device in accordance with this embodiment 4, the command shape calculating unit 5 calculates $t_0$/vibration period=$t_0\omega$)/($2\pi$) so as to determine the parameter r based on either the data of table 2 shown in FIG. 19 and stored in the storage unit 7 or the above-mentioned equation (32). The command shape calculating unit 5 then determines the acceleration command shape from this parameter r according to the above-mentioned equation (29). The command shape calculating unit 5 can thus calculate the acceleration command shape $A^{**}(t)$ according to the procedure so as to obtain a command which does not excite any vibration in the machine.

When using the acceleration command shape expressed by the above-mentioned equation (29), step ST3*a* of the flowchart of FIG. 11 which is explained in above-mentioned embodiment 3 is replaced by a process of "using the above-mentioned equation (29), as the equation which defines the acceleration command shape $A^{}(t)$", and step ST4***a* is replaced by a process of "calculating the parameter r from table 2 based on ω and $t_0$."

FIG. 20 is a diagram showing an example of the acceleration command shape generated by the processing in accordance with embodiment 4, and shows the acceleration command shape which is expressed by the above-mentioned equation (29). As shown in the figure, the acceleration command shape $A^{**}(t)$ which is expressed by the above-mentioned equation (29) changes smoothly, but does not change so sharply during an acceleration time period (i.e., a time period from the time t=0 to the time t =$t_0$).

As mentioned above, the command generating device in accordance with this embodiment 4 includes the storage unit 7 that defines an acceleration command shape signal, which has a value equal to a fixed multiple of the second derivative with respect to time of the position command and has an acceleration command value pattern which is specified by a parameter r and which changes continuously with time, as cos ($\pi rt/(2t_0)$) for the time period from the time t=0 to the time t=$t_0$, as $-\cos(\pi r(2t_0-t)/(2t_0))$ for the time period from the time t=$t_0$ to the time t=$2t_0$, and as 0 for other time periods, as expressed by the above-mentioned equation (29), also defines the above-mentioned equation (31) showing the frequency component of the acceleration command shape signal depending on said parameter r, calculates the frequencies at which the frequency component of the acceleration command shape signal becomes equal to zero dependently upon the parameter r, and stores the parameter r, frequencies at which the frequency component of the acceleration command shape signal becomes equal to zero, and positioning time therein while associating them with one another, and the command shape calculating unit 5 that reads a parameter r corresponding to a frequency at which the frequency component of the acceleration command shape signal becomes equal to zero for the frequency ω of a vibration which occurs in the machine 4 from the storage unit 7, and calculates a position command which can prevent vibrations for the positioning time $2t_0$, the time to being shorter than the vibration period of the machine 4, by using the parameter r. Since the acceleration command is smooth during the acceleration time period (0<=t<=$t_0$) and is not changed so sharply, many high-frequency components are not contained in the acceleration command. Therefore, vibrations resulting from high-frequency components are hard to excite, as explained in above-mentioned embodiment 1.

The use of the acceleration command shape expressed by the above-mentioned equation (29) makes it possible for the machine to complete the operation of positioning the machine's final position without any delay to the desired positioning time $2t_0$. The command generating device need not carry out complicated repetitive calculations etc. in order to obtain the position command. As can be seen from the above description, the command generating device in accordance with this embodiment 4 can be implemented without having to use any expensive processor or the like.

It is undoubted that various shape commands can be provided as a command having a command shape which continuously changes dependently upon a certain parameter, instead of the command shape shown in the above-mentioned embodiment. For example, either a cam curve or a spline curve having a shape which continuously changes dependently upon a certain parameter can be used as the command shape.

The command generating device in accordance with any of above-mentioned embodiment 3 and 4 generates the position command using the acceleration command shape which is equal to a fixed multiple of the second derivative with respect to time of the position command, as previously explained. As an alternative, the command generating device in accordance with any of above-mentioned embodiment 3 and 4 can apply the above-mentioned concept of this embodiment to an nth derivative command shape which is equal to a fixed multiple of the nth derivative with respect to time of the position command, the nth derivative command shape being different from the acceleration command shape (i.e., n>=3), and can calculate the nth derivative command shape so as to generate the position command.

In addition, since the command shape which is shown in any of above-mentioned embodiments 1 to 3, as the position command obtained in accordance with the present invention, is known, the position command does not has a shape unsuitable for the positioning operation, such as a shape which causes the target machine to pass the target position once and to move backward and reach the target position during the time period from the time t=0 to the time t=the positioning time.

Embodiment 5.

It is necessary to carry out positioning control of two or more target positions at corresponding positioning times, respectively, depending on the type of a target machine to be driven. For example, there is a case where a target position $D_1$ of a certain machine to be driven is positioned at a positioning time $t_{01}$, and another target position $D_2$ of the machine is then positioned at another positioning time $t_{02}$. It is preferable to position such a machine to be driven using a parameter which is suitable for prevention of vibrations at every positioning time. Furthermore, different command shapes are provided for a plurality of positioning times, respectively, and are combined and used.

For example, an acceleration command shape which is expressed by the above-mentioned equation (29) is used for a case of $t_0<(2\pi)/\omega$, while an acceleration command shape which is a trapezoid, that is, which is expressed by the above-mentioned equations (1) and (2) is used for a case of $t_0>=(2\pi)/\omega$.

That is, a command shape calculating unit 5 in accordance with this embodiment 5 stores, for example, information about command shapes explained in above-mentioned embodiments in a storage unit 7, and reads an appropriate command shape according to a selected positioning time so as to determine a command shape. In other words, the command shape calculating unit 5 uses difference command shapes for different positioning times. As a result, the command generating device in accordance with this embodiment 5 can acquire a command shape which does not excite any vibration for an arbitrarily-given positioning time. It should be understood that the command generating device in accordance with the present embodiment uses a combination of various command shapes, instead of the above-mentioned combination of the command shape expressed by the above-mentioned equation (29) and that expressed by the above-mentioned equations (1) and (2).

Embodiment 6.

Although a command generating device in accordance with this embodiment 6 has the same structure as that according to above-mentioned embodiment 1 or 3 basically, the command generating device in accordance with this embodiment 6 differs from those according to above-mentioned embodiments 1 and 3 in that the command generating device of this embodiment 6 calculates a position command in consideration of damping of a vibration which occurs in a target machine to be driven, as well as the frequency of the vibration, a positioning time, and a target position.

Figure 21:
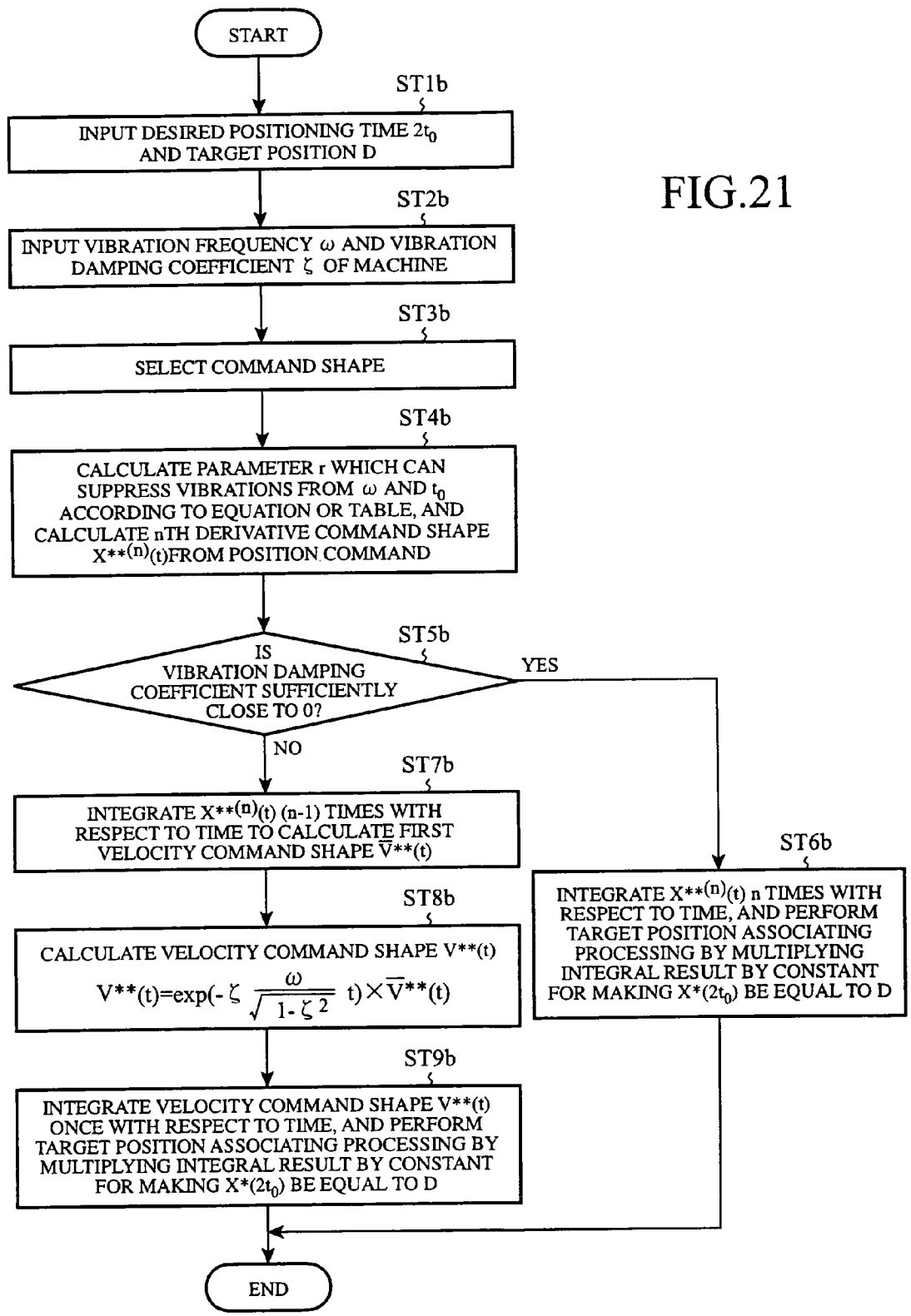
FIG. 21 is a flowchart showing a process of calculating a position command which is carried out by a command generating device in accordance with embodiment 6.

Next, the operation of the command generating device in accordance with this embodiment of the present invention will be explained. FIG. 21 is a flowchart showing a process of calculating a position command which is carried out by the command generating device in accordance with embodiment 6. This figure shows an example of a procedure for obtaining the position command $X^*(t)$ which can prevent vibrations for both a case where there is a large amount of vibration damping and a case where there is a sufficiently small amount of vibration damping.

First, a desired positioning time $2t_0$ and a target position D which are used for the positioning operation of the machine 4 are inputted into the command generating device 1 in accordance with embodiment 6 (in step ST1b). Next, the frequency $\omega$ of a vibration which can occur in the machine 4 and the vibration damping coefficient $\zeta$ for this vibration which are calculated in advance for the machine 4 are inputted to the command generating device 1 (in step ST2b). The vibration damping coefficient $\zeta$ can be calculated from two or more maximum values of the amplitude of the residual vibration.

A command shape calculating unit 5 of the command generating device 1 in accordance with embodiment 6 then selects a command shape from a plurality of command shape candidates (in step ST3b). For example, by using the process of determining a command shape which is shown in either of above-mentioned embodiments 1 to 3, the command shape calculating unit 5 selects either one of the above-mentioned equations (1), (26), and (29) so as to determine a command shape. As an example of a rule for the selection of a command shape, there can be provided a process of applying an acceleration command shape which is expressed by the above-mentioned equation (29) in a case of $t_0<2\pi/\omega$, and applying a jerk command shape which is expressed by the above-mentioned equation (1) in a case of $t_0>=2\pi/\omega$, with respect to the vibration period $2\pi/\omega$ of the machine, as explained in above-mentioned embodiment 5.

The command shape calculating unit 5 then, in step ST4b, calculates $t_0\omega/(2\pi)$ from $\omega$ and $t_0$, and determines a parameter r from the value $t_0\omega/(2\pi)$ according to an equation, such as the above-mentioned equation (3) or the above-mentioned equation (32), or using a table, such as above-mentioned table 1 or 2, stored in a storage unit 7. After that, the command shape calculating unit 5 calculates an nth derivative command shape $X^{**(n)}(t)$ which is equal to a fixed multiple of the nth derivative with respect to time of the position command from the parameter r.

When the processing including up to the above-mentioned step is completed, the command shape calculating unit 5 determines whether or not the vibration damping coefficient $\zeta$ of the machine is sufficiently small (in step ST5b). For example, the command shape calculating unit 5 determines whether or not the vibration damping coefficient $\zeta$ is about 0. When determining that the vibration damping coefficient $\zeta$ of the machine is sufficiently small, the command generating device shifts to a process of step ST6b in which an associating processing unit 6 integrates the nth derivative command shape $X^{**(n)}(t)$ which is obtained from the position command and which is expressed by, for example, the above-mentioned equation (5), n times with respect to time, and multiplies the integral result by a constant which associates the position command at the positioning time $2t_0$ with the target position so as to determine the position command $X^*(t)$.

On the other hand, when determining that the vibration damping coefficient $\zeta$ of the machine is not sufficiently small, the command generating device shifts to a process of step ST7b in which the command shape calculating unit 5 integrates the nth derivative command shape $X^{(n)}(t)$ which is obtained from the position command (n−1) times with respect to time so as to determine a first velocity command shape $\overline{V^{}(t)}$ bar (bar phonetically means ⁻). The command shape calculating unit 5 then calculates a second velocity command shape $V^{}(t)$ by multiplying the first velocity command shape $\overline{V^{}(t)}$ bar (bar phonetically means ⁻) by the following equation (33) (in step ST8b). The associating processing unit 6 then, in step ST9b, integrates a velocity command shape $V^{**}(t)$ which is equal to a fixed multiple of the velocity command which is the first derivative with respect to time of the position command once with respect to time, and multiplies the integral result by a constant which associates the position command at the positioning time $2t_0$ with the target position. That is, the associating processing unit obtains the position command $X^*(t)$ according to the following equation (34):

$$\exp\left(-\zeta \frac{\omega}{\sqrt{1-\zeta^2}} t\right) \quad (33)$$

$$X^*(t) = \frac{D}{\int_0^{2t0} V^{}(\tau) d\tau} \times \int_0^t V^{}(\tau) d\tau \quad (34)$$

The command generating device can prevent vibrations having damping using the position command X*(t) which is generated according to the above-mentioned procedure, as will be mentioned below. An expression for obtaining the machine's final position X(t) from the position command X*(t) which is thus determined from the vibration frequency ω and vibration damping coefficient ζ of the machine is given by the following equation (35). Similarly, an expression for obtaining the machine's final velocity V(t) from the velocity command V*(t) is given by the following equation (36). When this relationship is rewritten into one in the form of time domain using the following equation (37) showing the impulse response of a transfer function: $\omega_0^2/(s^2+2\zeta\omega_0 s+\omega_0^2)$, and a response after the positioning time, i.e., a response at a time t>=2t₀, is described, the following equation (38) is obtained. Here, when V*(t) bar (bar phonetically means ⁻) is defined by the following equation (39), the machine's final velocity V(t) is expressed by the following equation (40):

$$\hat{X}(s) = \frac{\omega_0^2}{s^2 + 2\zeta\omega_0 s + \omega_0^2} \hat{X}^*(s) \quad (35)$$

$$\omega_0 = \frac{\omega}{\sqrt{1-\zeta^2}}$$

$$\hat{V}(s) = \frac{\omega_0^2}{s^2 + 2\zeta\omega_0 s + \omega_0^2} \hat{V}^*(s) \quad (36)$$

$$\frac{\omega_0^2}{\sqrt{1-\zeta^2}} \exp(-\zeta\omega_0 t)\sin(\omega t) \quad (37)$$

$$V(t) = \frac{\omega_0^2}{\sqrt{1-\zeta^2}} \int_0^{2t0} \exp(-\zeta\omega_0(t-\tau))\sin\omega(t-\tau)V^*(\tau)d\tau \quad (38)$$

$$= \frac{\omega_0^2}{\sqrt{1-\zeta^2}} \exp(-\zeta\omega_0 t) \int_0^{2t0} \sin\omega(t-\tau) V^*(\tau)\exp(\zeta\omega_0\tau)d\tau$$

$$\overline{V}^*(t) = V^*(t) \times \exp(\zeta\omega_0 t) \quad (39)$$

$$V(t) = \frac{\omega_0^2}{\sqrt{1-\zeta^2}} \exp(-\zeta\omega_0 t) \int_0^{2t0} \sin\omega(t-\tau)\overline{V}^*(\tau)d\tau \quad (40)$$

As explained in above-mentioned embodiment 1, the same relationship is established not only for the velocity command V*(t) but for a velocity command shape V**(t) which is equal to a fixed multiple of the velocity command V*(t). In order to make the response V(t) be equal to 0 at any time t (>=2t₀) after the positioning time 2t₀ in the above-mentioned equation (40), the command generating device calculates the nth derivative command shape X⁽ⁿ⁾(t) which can prevent the vibration having the frequency ω, such as a velocity command shape, an acceleration command shape, or a jerk command shape, from the position command, for a case where it is assumed that there is no vibration damping at the vibration frequency ω, and calculates the first velocity command shape V(t) bar by integrating the nth derivative command shape X**⁽ⁿ⁾(t) (n−1) times with respect to time.

The command shape calculating unit 5 calculates the velocity command shape V(t) from the velocity command shape V(t) bar (bar phonetically means ⁻), which is thus acquired, according to the following equation (41). Then, in order to associate the position command at the positioning time 2t₀ with the target position D, the command shape calculating unit 5 further integrates the velocity command shape V**(t) with respect to time, and multiplies the integral result by the constant which associates the position command at the positioning time 2t₀ with the target position D so as to obtain the position command X*(t). That is, the command shape calculating unit 5 obtains the position command X*(t) according to the following equation (42):

$$V^{}(t) = \exp(-\zeta\omega_0 t) \times \overline{V}^{}(t) \quad (41)$$

$$X^*(t) = \frac{D}{\int_0^{2t0} V^{}(\tau)d\tau} \times \int_0^t V^{}(\tau)d\tau \quad (42)$$

In addition, the first velocity command V(t) bar (bar phonetically means ⁻) can be multiplied by a function which can approximate f(t)=exp(−ζω₀t) during the time period [0, 2t₀], so as to determine the velocity command shape V(t). As an alternative, the first velocity command V(t) bar can be multiplied by f(t)=exp(−gt) (a positive constant g has a value close to ζω₀), so as to determine the velocity command shape V(t).

Figure 22A:
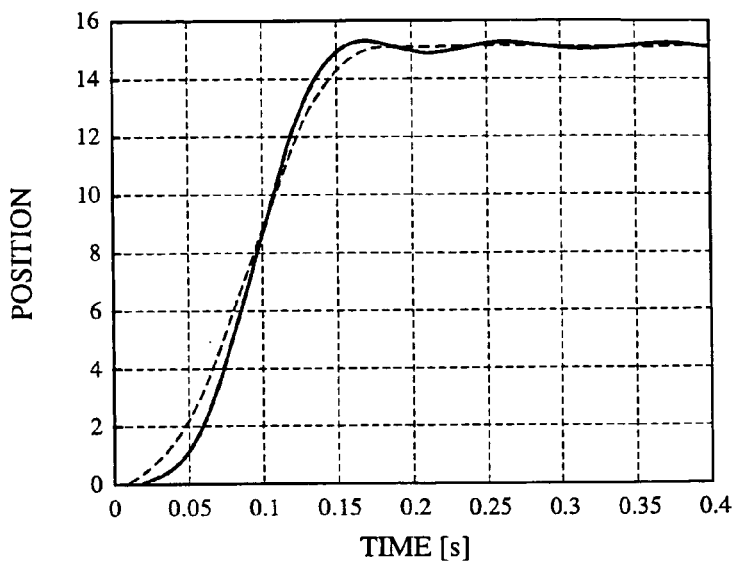
FIGS. 22A to 22C are graphs showing a numerical calculation example to which the position command in accordance with embodiment 6 is not applied, but to which a position command which offers a triangle-shaped velocity command is applied.
Figure 22B:
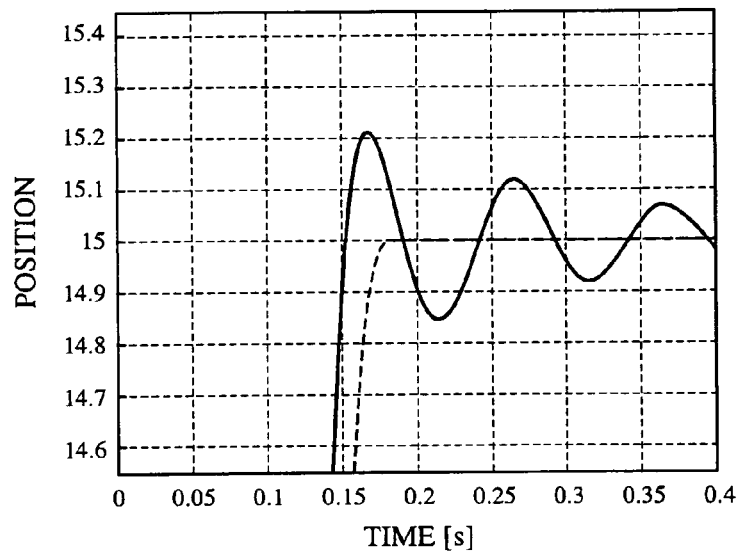
Figure 22C:
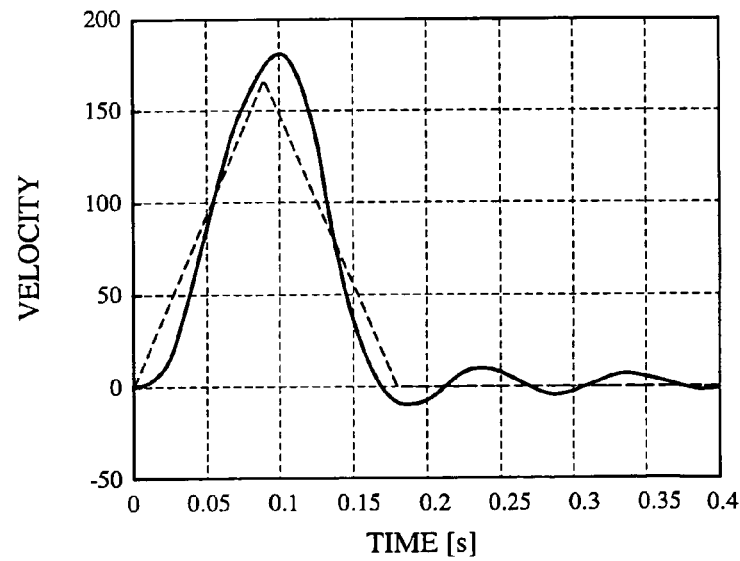

Next, advantages offered by the present embodiment will be explained with reference to numerical calculation examples. Assume that the command generating device generates a position command for a case where the vibration frequency of the machine 4 is 10 Hz (ω=2π·10=31.4[rad/s]), the vibration damping coefficient ζ=0.1, the target position D=15.0, and the positioning time 2t₀ is 0.18 seconds. First, the description will be directed to a numerical calculation example to which the position command in accordance with the present embodiment is not applied, but to which a triangle-shaped velocity command is applied. FIGS. 22A to 22C are graphs showing the numerical calculation example to which the position command in accordance with the present embodiment is not applied, but to which a position command which offers a triangle-shaped velocity command is applied. FIG. 22A is a graph showing the position command and the machine's position, FIG. 22B is an enlarged view of FIG. 22A, and FIG. 22C is a graph showing the velocity command and the machine's velocity. Solid lines shown in FIG. 22A and 22B indicate the machine's position, and dotted lines indicate the position command. A solid line shown in FIG. 22C indicates the machine's velocity, and a dotted line indicates the velocity command which is the first derivative with respect to time of the position command. As can be seen from FIGS. 22B and 22C, in the case of the position command which offers a triangle-shaped velocity command, a large residual vibration occurs after the positioning time 0.18 seconds.

Figure 23A:
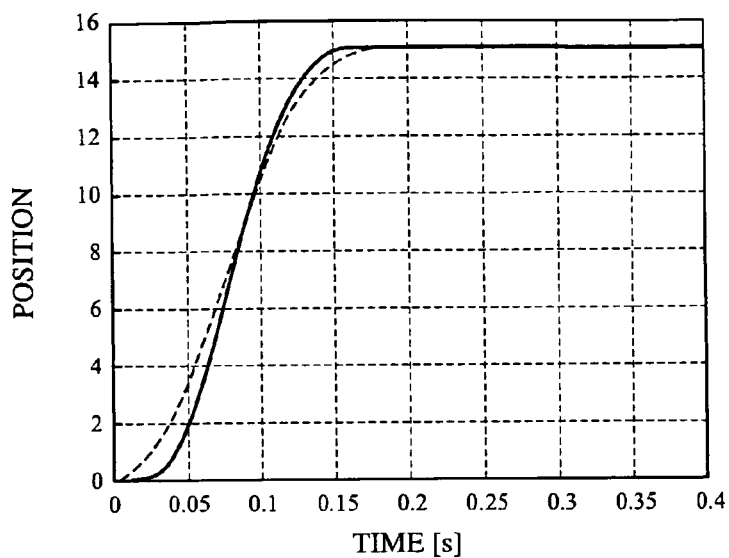
FIGS. 23A to 23C are graphs showing a numerical calculation example to which the position command in accordance with embodiment 6 is applied.
Figure 23B:
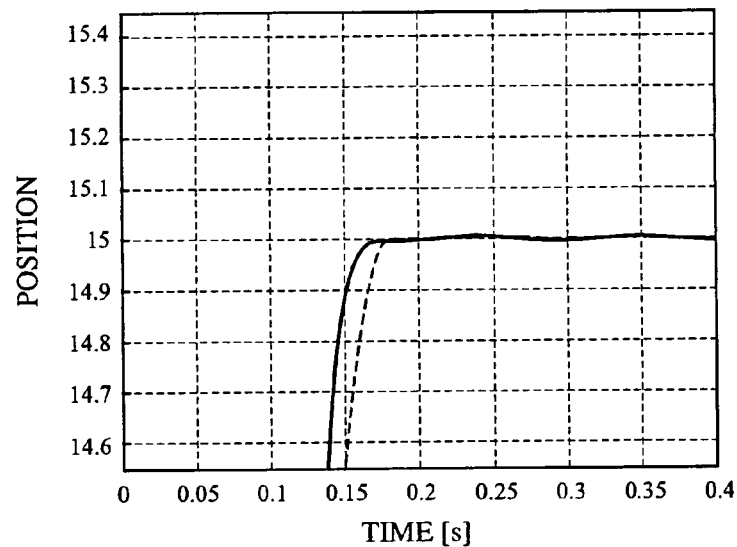
Figure 23C:
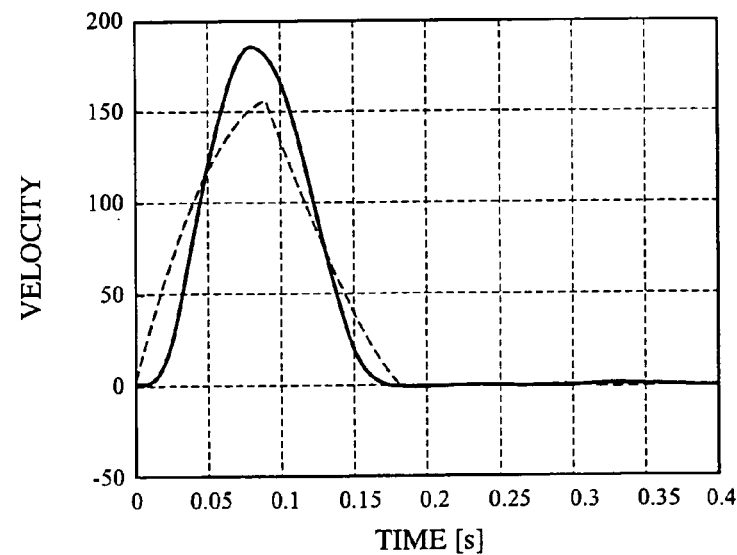

Next, a numerical calculation example in which a position command in accordance with this embodiment is applied will be explained. FIGS. 23A to 23C are graphs showing the numerical calculation example in which the position command in accordance with this embodiment 6 is applied. FIG. 23A is a graph showing the position command and the machine's position, FIG. 23B is an enlarged view of FIG. 23A, and FIG. 23C is a graph showing the velocity command and the machine's velocity. Solid lines shown in FIGS. 23A and 23B indicate the machine's position, and dotted lines indicate the position command. A solid line shown in FIG. 23C indicates the machine's velocity, and a dotted line indicates the velocity command which is the first derivative with respect to time of the position command. As can be seen from FIGS. 23B and 23C, in the case of the position command in accordance with the present embodiment, no residual vibration occurs after the positioning time 0.18 seconds.

As mentioned above, in the command generating device in accordance with this embodiment 6, the command shape calculating unit 5 calculates an acceleration command shape signal having a value which is equal to a fixed multiple of an acceleration command so that a convolution of the impulse response of a transfer function which is determined from the frequency ω of a vibration which occurs in the machine 4, the convolution being calculated over the time period from the positioning time onward, and a velocity command which is the first derivative with respect to time of a position command becomes equal to zero, calculates a first velocity command shape signal by integrating the acceleration command shape signal once with respect to time, and calculates a velocity command shape signal having a value which is equal to a fixed multiple of the first derivative with respect to time of the position command by multiplying the first velocity command shape signal by a function $\exp(-(\zeta\omega t)/(1-\zeta^2)^{1/2})$, where ζ is the vibration damping coefficient of the machine and t is a time. Therefore, the command generating device can generate the position command in consideration of the vibration damping of the machine 4. The command generating device can provide a command which can suppress vibrations even to a machine in which a vibration having a relatively large amount of damping occurs.

Embodiment 7.

In either of above-mentioned embodiments 1 to 6, an example of generating a position command for moving a target machine to be driven from a certain position to a target position is explained. In contrast, a command generating device in accordance with this embodiment 7 generates either a velocity command for changing the velocity of a target machine to be driven from a certain velocity to another velocity, or an acceleration command for changing the acceleration of the machine from a certain acceleration to another acceleration, by using the same concept.

Figure 24:
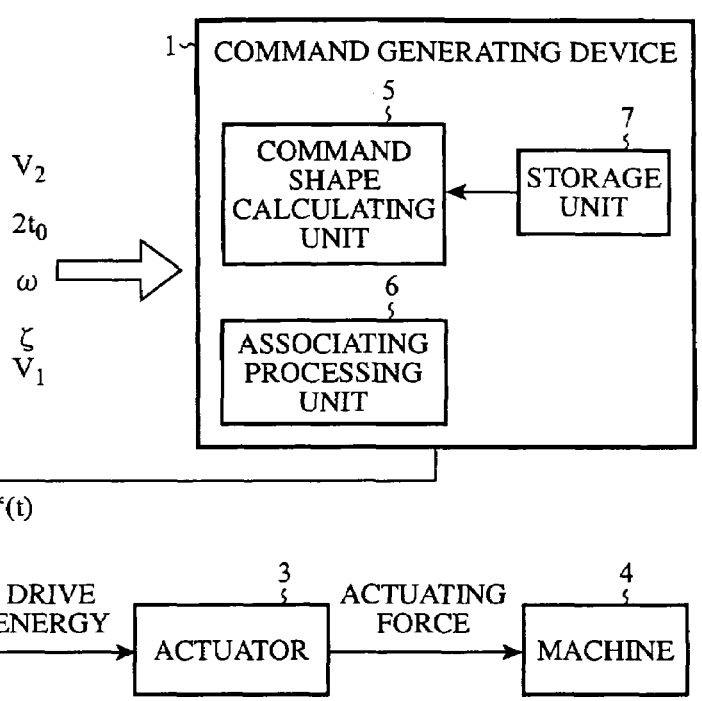
FIG. 24 is a block diagram showing the structure of an actuating control system for actuating a machine, to which a command generating device in accordance with embodiment 7 of the present invention is applied.

FIG. 24 is a block diagram showing an example of the structure of a system for actuating and controlling the machine, to which the command generating device in accordance with embodiment 7 of the present invention is applied. When generating a velocity command V*(t), the command generating device 1 calculates an nth derivative command shape signal having a value which is equal to a fixed multiple of the nth derivative with respect to time of the velocity command V*(t) so that a convolution of the impulse response of a transfer function which is determined from the vibration frequency ω and vibration damping coefficient ζ of the machine 4 and an acceleration command A*(t) which is the first derivative with respect to time of the velocity command V*(t) becomes equal to zero, the convolution being calculated over the time period from a positioning time onward. An associating processing unit 6 integrates the nth derivative command shape which is calculated from the velocity command V*(t) by a command shape calculating unit 5, n times with respect to time, and multiplies the integral result by a constant so as to associate the velocity command at the time when the machine 4 to be driven has a desired velocity (referred to as the velocity transition completion time from here on) with a target velocity $V_2$.

Figure 25:
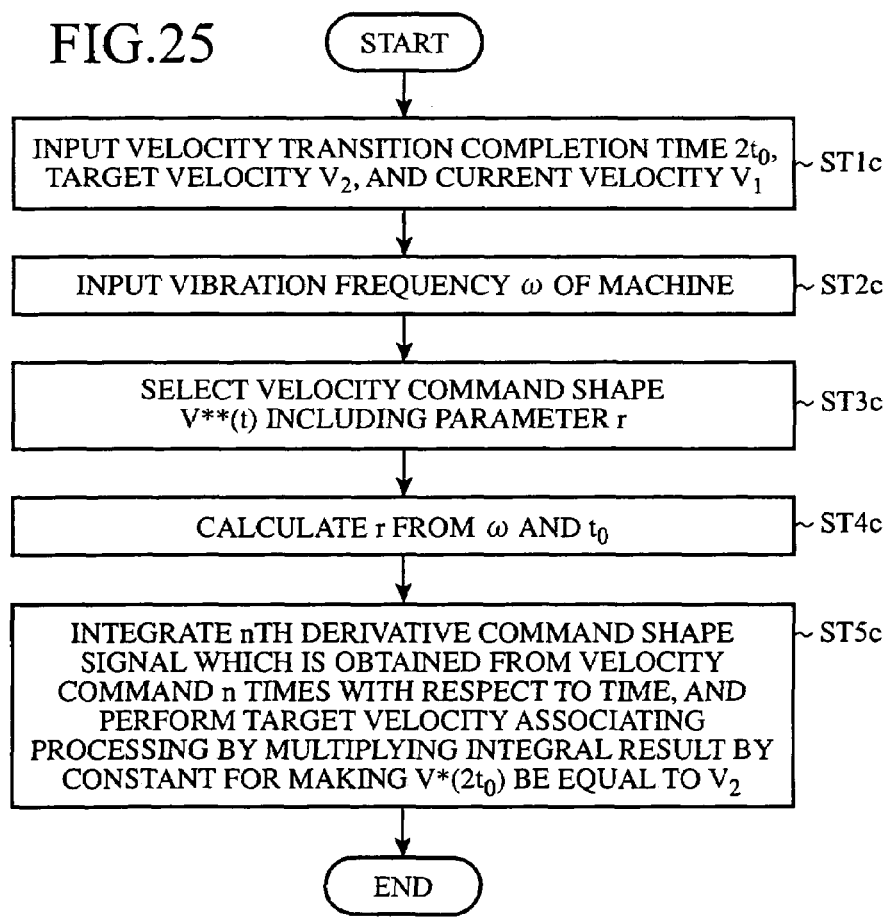
FIG. 25 is a flowchart showing an operation of generating a command which is performed by the command generating device in accordance with embodiment 7.

Next, the operation of the command generating device in accordance with this embodiment of the present invention will be explained. FIG. 25 is a flowchart showing an operation of generating a command which is performed by the command generating device in accordance with embodiment 7. An operation of changing the velocity of the machine from a certain velocity to another velocity will be explained in detail with reference to this figure. First, the time (i.e., the velocity transition completion time) $2t_0$ when the machine 4 will have the desired velocity, target velocity $V_2$, and current velocity $V_1$ of the machine 4 are inputted to the command generating device 1 (in step ST1c). Next, the frequency ω of a vibration which occurs in the machine 4 which is determined in advance is input to the command generating device 1 in step ST2c.

The command shape calculating unit 5 of the command generating device 1 in accordance with embodiment 7 then selects a velocity command shape V(t) including a parameter for specifying a continuous change in the velocity command shape (in step ST3c). To be more specific, a snap command shape $K^{}(t)=k^{}(t)+k^{}(2t_0-t)$ which includes the parameter r for specifying the shape of the command and which is equal to a fixed multiple of the third derivative (i.e., a snap command) of the velocity command is determined according to the following equation (43):

$$k^{**}(t) = \begin{cases} c & (0 \leq t \leq r \times t_0) \\ 0 & (r \times t_0 < t < (1-r) \times t_0) \\ -c & ((1-r) \times t_0 \leq t \leq t_0) \end{cases} \quad (43)$$

As an alternative, the following equation (44) is used to define a jerk command shape J**(t) which includes the parameter r for specifying the shape of the above-mentioned command and is equal to a fixed multiple of the second derivative with respect to time of the velocity command.

$$J^{**}(t) = \begin{cases} \sin\left(\frac{\pi}{2rt_0}t\right) & (0 \leq t \leq rt_0) \\ 1 & (rt_0 < t < (1-r)t_0) \\ \cos\left(\frac{\pi}{2rt_0}(t-(1-r)t_0)\right) & ((1-r)t_0 \leq t \leq t_0) \\ -\sin\left(\frac{\pi}{2rt_0}(t-t_0)\right) & (t_0 < t \leq (1+r)t_0) \\ -1 & ((1+r)t_0 < t < (2-r)t_0) \\ \cos\left(\frac{\pi}{2rt_0}(t-(2-r)t_0)\right) & ((2-r)t_0 < t \leq 2t_0) \\ 0 & (\text{otherwise}) \end{cases} \quad (44)$$

The following equation (45) is used to define another jerk command J**(t) including the parameter r.

$$J^{**}(t) = \begin{cases} \cos\left(\frac{\pi}{2}\frac{r}{t_0}t\right) & (0 \leq t \leq t_0) \\ -\cos\left(\frac{\pi}{2}\frac{r}{t_0}(2t_0-t)\right) & (t_0 \leq t \leq 2t_0) \\ 0 & (\text{otherwise}) \end{cases} \quad (45)$$

Then, the command shape calculating unit 5 calculates the parameter r based on the inputted vibration frequency ω of the machine 4 and time $t_0$ (in step ST4c). To be more specific, when using the above-mentioned equation (43) as the command shape, the command shape calculating unit 5 determines the parameter r based on the above-mentioned equation (3). When using the above-mentioned equation (44), the command shape calculating unit 5 determines the parameter r based on table 1 shown in FIG. 12 and stored in a storage unit 7. When using the above-mentioned equation (44), the command shape calculating unit 5 can alternatively determine the parameter r based on table 2 shown in FIG. 19 and stored in the storage unit 7. When the above-mentioned equation (43) is used in order to determine the nth derivative command shape signal from the velocity command, n=3. When the above-mentioned equation (43) or (45) is used in order to determine the nth derivative command shape signal from the velocity command, n=2.

In step ST5c, the associating processing unit 6 integrates the nth derivative command shape signal, which is obtained from the velocity command in the above-mentioned step, n times with respect to time, and then obtains a velocity command V*(t) by multiplying the integral result by a constant which associates the velocity command at the velocity transition completion time with the target velocity $V_2$ (i.e., a constant for making $V^*(2t_0)$ be equal to $V_2$). For example, when the command shape is a jerk command shape, the associating processing unit performs the processing using the following equation (46). When the command shape is a snap command shape, the associating processing unit performs the processing using the following equation (47). The above-mentioned equations (46) and (47) show the calculation expressions which are used for calculating the velocity command V*(t) when the jerk command shape which is the second derivative command shape signal obtained from the velocity command, and the snap command shape which is the third derivative command shape signal obtained from the velocity command are used as the nth derivative command shape signal, respectively. On the other hand, when the command shape is another nth derivative command shape signal which is obtained from the velocity command, the associating processing unit performs roughly the same processing.

$$V^*(t) = \frac{V_2 - V_1}{\int_0^{2t_0}\int_0^{\tau_1} J^*(\tau)d\tau d\tau_1} \times \int_0^t \int_0^{\tau_1} J^*(\tau)d\tau d\tau_1 + V_1 \quad (46)$$

$$V^*(t) = \frac{V_2 - V_1}{\int_0^{2t_0}\int_0^{\tau_2}\int_0^{\tau_1} K^*(\tau)d\tau d\tau_1 d\tau_2} \times \int_0^t \int_0^{\tau_2}\int_0^{\tau_1} K^*(\tau)d\tau d\tau_1 d\tau_2 + V_1 \quad (47)$$

By applying the velocity command V*(t) which the command generating device thus generates according to the above-mentioned procedure to an actuator drive control device 2, the command generating device can change the velocity of the machine 4 from the certain velocity $V_1$ to the other velocity $V_2$ without exciting any vibration in the machine 4 when the machine 4 performs the positioning operation. Next, the procedure will be explained in detail.

First, consider the velocity command for changing the velocity of the machine 4 from the current velocity $V_1$ to the target velocity $V_2$ during the time period from the time t=0 to the time $t=2t_0$ without exciting any vibration in the machine 4. As in the case of the position and velocity commands, the following equation (48) is established between A*(s) hat (hat phonetically indicates ^) which is a Laplace transform of the acceleration command A*(t), and A(s) hat (hat phonetically indicates ^) which is a Laplace transform of the machine's final acceleration A(t). Rewriting the equation (48) into one in the form of time domain yields the following equation (49). Assume that the acceleration command A*(t) which is the first derivative with respect to time of the velocity command is expressed by the following equation (50), and has a symmetrical shape with respect to the time $t=t_0$. Further assume that a*(t) has a relationship given by the following equation (51):

$$\hat{A}(s) = \frac{\omega^2}{s^2 + \omega^2}\hat{A}*(s) \quad (48)$$

$$A(t) = \int_0^t \sin\omega(t-\tau)A(\tau)d\tau \quad (49)$$

$$A^*(t) = \bar{a}^*(t) + a^*(2t_0 - t) \quad (50)$$

$$a^*(t)\begin{cases} \neq 0 & (0 \leq t \leq t_0) \\ = 0 & (\text{otherwise}) \end{cases} \quad (51)$$

At this time, the jerk command J*(t) which is the second derivative with respect to time of the velocity command, and the snap command K*(t) which is the third derivative with respect to time of the velocity command are given by the following equations (52) and (53), respectively:

$$J^*(t) = j^*(t) - j^*(2t_0 - t) \quad (52)$$

$$K^*(t) = k^*(t) + k^*(2t_0 - t) \quad (53)$$

where j*(t)=da*(t)/dt and k*(t)=dj*(t)/dt.

When A(t)=0 is established after the positioning time ($t>=2t_0$), the machine 4 continues moving at a certain velocity after the positioning time without vibrating. Then, substitution of the above-mentioned equations (50), (52), and (53) into the above-mentioned equation (49) yields the following equation (54):

$$\begin{aligned} A(t) &= \int_0^{2t_0} \sin\omega(t-\tau)\{a^*(\tau) + a^*(2t_0 - \tau)\}d\tau \quad (54) \\ &= \int_0^{t_0} \sin\omega(t-\tau)a^*(\tau)d\tau + \\ &\quad \int_{t_0}^{2t_0} \sin\omega(t-\tau)a^*(t - 2t_0 + \tau)d\tau \\ &= 2\sin\omega(t-t_0)\int_0^{t_0}\cos\omega(t_0 - \tau)a^*(\tau)d\tau \\ &= \frac{2}{\omega}\sin\omega(t-t_0)\int_0^{t_0}\sin\omega(t_0 - \tau)j^*(\tau)d\tau \\ &= \frac{2}{\omega^2}\sin\omega(t-t_0) \\ &\quad \left\{(j^*(t_0) - \cos\omega t_0 j^*(0)) - \int_0^{t_0}\cos\omega(t_0 - \tau)k^*(\tau)d\tau\right\} \end{aligned}$$

It is apparent from the above-mentioned equation (54) that an acceleration command a*(t), a jerk command j*(t), and a snap command k*(t) which satisfy at least one of the following equations (55), (56), and (57) have only to be formed in order that A(t)=0 can be established after the positioning time $t>=2t_0$. This formation can be carried out according to a procedure similar to the procedure for forming a velocity command, an acceleration command, and a jerk command in the case of positioning the machine from a certain position to a target position.

$$\int_0^{t_0} \cos\omega(t_0 - \tau) a^*(\tau) d\tau = 0 \qquad (55)$$

$$\int_0^{t_0} \sin\omega(t_0 - \tau) j^*(\tau) d\tau = 0 \qquad (56)$$

$$\int_0^{t_0} \cos\omega(t_0 - \tau) k^*(\tau) d\tau = 0, \; j^*(t_0) - \cos\omega t_0 j^*(0) = 0 \qquad (57)$$

The above-mentioned equations (55), (56), and (57) correspond to the above-mentioned equations (13), (14), and (15) shown in above-mentioned embodiment 1, respectively. It is clear that the same relationship is also established among the acceleration command shape $A^{}(t)$, jerk command shape $J^{}(t)$, and snap command shape $K^{**}(t)$ which are equal to fixed multiples of $A^*(t)$, $J^*(t)$, and $K^*(t)$, respectively.

That is, for a certain constant k, the following equations: $a^{**}(t)=ka^*(t)$, $j^{**}(t)=kj^*(t)$, and $k^{**}(t)=kk^*(t)$ are defined. In addition, assuming that the acceleration command shape is defined as $A^{}(t)=a^{}(t)+a^{}(2t_0-t)$, the jerk command shape is defined as $J^{}(t)=j^{}(t)-j^{}(2t_0-t)$, and the snap command shape is defined as $K^{}(t)=k^{}(t)+k^{**}(2t_0-t)$, the following equations (58), (59), and (60) are established:

$$\int_0^{t_0} \cos\omega(t_0 - \tau) a^{**}(\tau) d\tau = 0 \qquad (58)$$

$$\int_0^{t_0} \sin\omega(t_0 - \tau) j^{**}(\tau) d\tau = 0 \qquad (59)$$

$$\int_0^{t_0} \cos\omega(t_0 - \tau) k^{}(\tau) d\tau = 0, \; j^{}(t_0) - \cos\omega t_0 j^{**}(0) = 0 \qquad (60)$$

Therefore, like the command generating device according to either of above-mentioned embodiments 1, 2, and 3 that acquires the nth derivative command shape which does not excite any vibration in the machine from the position command, the command generating device in accordance with this embodiment can acquire the command shape which is a fixed multiple of the nth derivative with respect to time of the velocity command and which does not excite any vibration in the machine. As concrete examples of the command shape, the command shapes defined by the above-mentioned equations (43), (44), and (45) can be provided. The command generating device further carries out a process of integrating this command shape n times with respect to time, and multiplying the integral result by a constant which associates the velocity command at the velocity transition completion time with the target velocity $V_2$, i.e., the processing as given by the above-mentioned equations (46) and (47), so as to determine the velocity command $V^*(t)$.

Figure 26A:
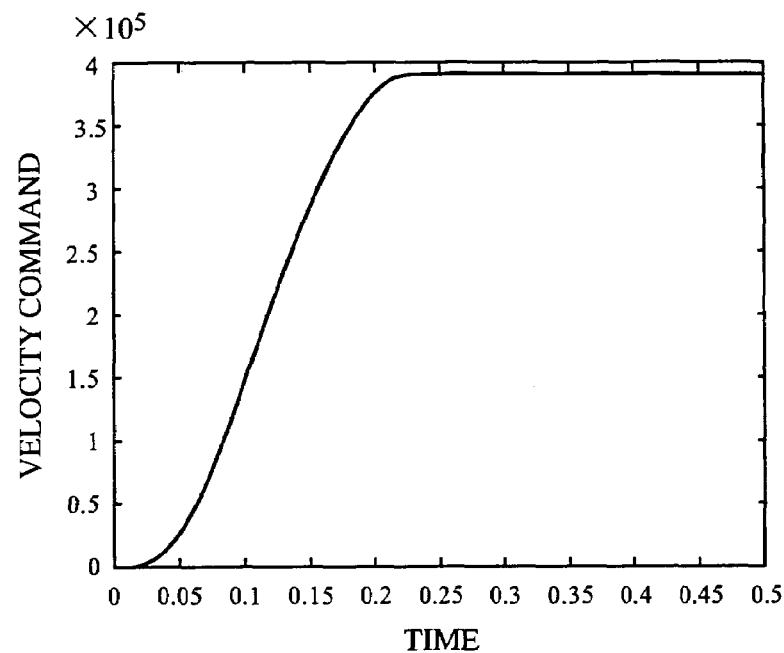
FIGS. 26A and 26B are graphs showing a velocity command and an acceleration command in accordance with embodiment 7.
Figure 26B:
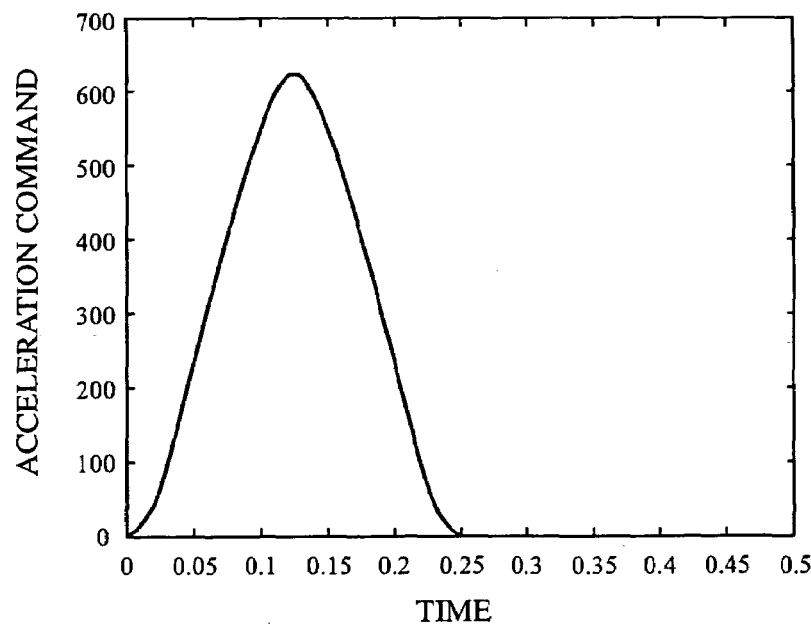
Figure 27A:
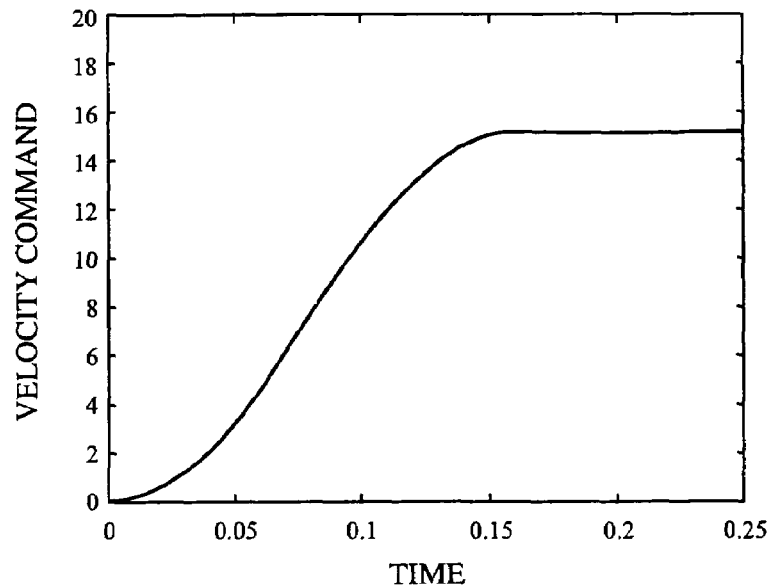
FIGS. 27A and 27B are graphs showing a velocity command and an acceleration command in accordance with embodiment 7.
Figure 27B:
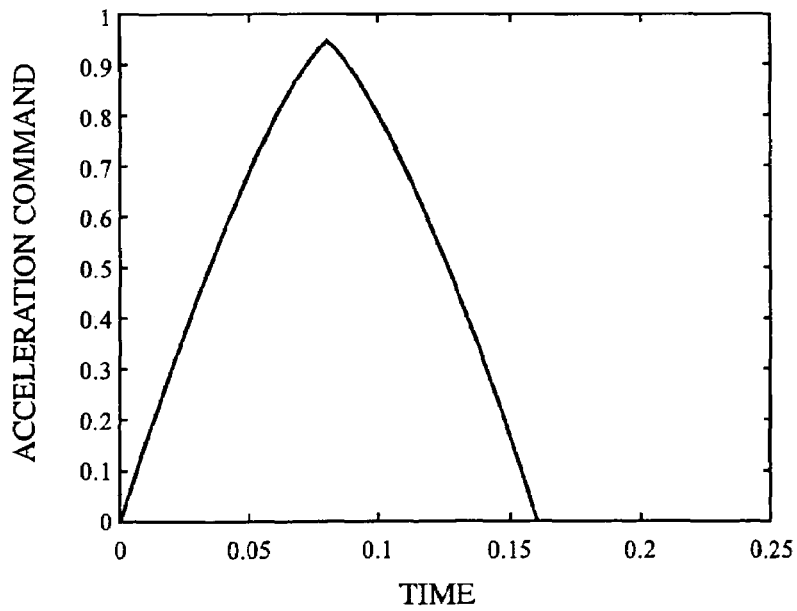

Examples of the velocity command for changing the velocity of the machine from 0 to a certain velocity, which are obtained by the command generating device according to above-mentioned embodiment, are shown in FIGS. 26 and 27. FIGS. 26A and 26B show the velocity command and acceleration command which is the first derivative with respect to time of the velocity command, respectively, when $k^{}(t)$ of the snap command shape $K^{}(t)=k^{}(t)+k^{}(2t_0-t)$ which is equal to a fixed multiple of the snap command which is the third derivative with respect to time of the velocity command is given by the above-mentioned equation (43). FIGS. 27A and 27B show the velocity command and acceleration command which is the first derivative with respect to time of the velocity command when the jerk command shape which is equal to a fixed multiple of the jerk command which is the second derivative command of the velocity command is given by the above-mentioned equation (45), respectively. As shown in FIGS. 26B and 27B, in both the cases, the acceleration command which is the first derivative with respect to time of the velocity command is continuous during an acceleration time period, and then rises to its peak and descends to about zero with no rapid change such as a re-rise. Therefore, many high-frequency components are not contained in such the acceleration command signal.

It is understood that the velocity command for changing the velocity of the machine from a certain velocity to another velocity without exciting any vibration in the machine is not limited to the above-mentioned command shape, and the velocity command can have one of various shapes, as in the case of the position command. Although the command generating device in accordance with this embodiment is explained by taking, as an example, the case where there is no damping in the vibration which occurs in the machine, the command generating device in accordance with this embodiment can be also applied to cases where the vibration which occurs in the machine has damping, as shown in above-mentioned embodiment 6.

As mentioned above, in the command generating device in accordance with this embodiment 7, the command shape calculating unit 5 calculates an nth derivative command shape signal having a value which is equal to a fixed multiple of the nth derivative with respect to time of a velocity command for changing the velocity of the machine 4 to a target velocity during the time period from the time t=0 to the time t=a velocity transition completion time so that a convolution of an acceleration command which is the first derivative command of the velocity command, and the impulse response of a transfer function which is determined from the vibration frequency ω of the machine 4 becomes equal to zero, the convolution being calculated over the time period from the velocity transition completion time onward, and the associating processing unit 6 integrates the nth derivative command shape signal which is calculated from the velocity command by the command shape calculating unit 5 n times with respect to time and then multiplies the integral result by a constant for associating the velocity command at the velocity transition completion with the target velocity so as to determine the velocity command. As a result, the command generating device can change the velocity of the machine 4 to the target velocity without exciting any vibration in the machine 4.

The velocity command in accordance with this embodiment can be obtained by using nearly the same method as that used at the time of obtaining the position command according to above-mentioned embodiments 1, and 2 and 3. For this reason, the present embodiment has the same advantages as provided by above-mentioned embodiments 1, 2, and 3 of the present invention. That is, the velocity command obtained by the command generating device in accordance with this embodiment does not contain many high-frequency components. Therefore, the present embodiment offers an advantage of preventing excitation of vibrations in the machine due to lack of trackability (i.e., responsibility) of the actuator 3 and actuator drive 2. Furthermore, the present embodiment offers another advantage of preventing excitation of higher-order modes of vibrations in the machine. In addition, since $A(2t_0)=0$ is established at t= the desired velocity transition completion time $2t_0$ in the above-mentioned equation (54), the command generating device can complete the velocity changing operation without any delay to the desired velocity transition completion time.

In above-mentioned embodiment 7, although the method of changing the velocity of the machine from a certain velocity to a certain target velocity is explained, it is also possible to generate an acceleration command for changing the acceleration of the machine from a certain acceleration to a certain target acceleration based on the same concept.

Figure 28:
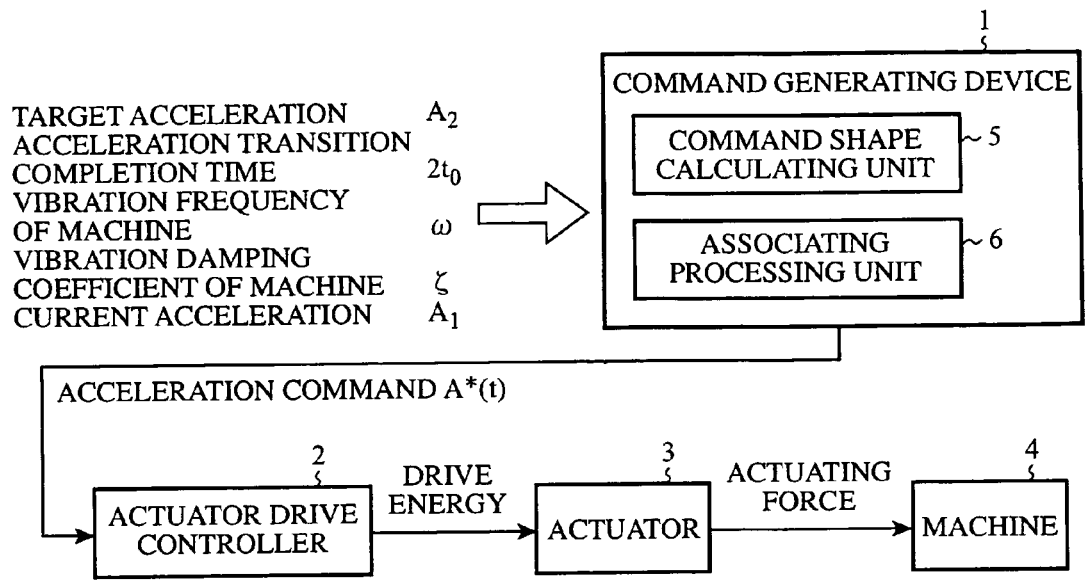
FIG. 28 is a block diagram showing another example of the structure of the actuating control system for actuating a machine, to which the command generating device in accordance with embodiment 7 of the present invention is applied.

That is, as shown in FIG. 28, the command shape calculating unit 5 calculates an nth derivative command shape signal having a value which is equal to a fixed multiple of the nth derivative with respect to time of an acceleration command for changing the acceleration of the machine 4 to a target acceleration during the time period from the time t=0 to the time t= an acceleration transition completion time so that a convolution of a jerk command which is the first derivative with respect to time of the acceleration command, and the impulse response of a transfer function which is determined from the vibration frequency ω of the machine 4 becomes equal to zero, the convolution being calculated over the time period from the acceleration transition completion time onward, and the associating processing unit 6 integrates the nth derivative command shape signal which is calculated from the acceleration command by the command shape calculating unit 5 n times with respect to time, and then multiplies the integral result by a constant for associating the acceleration command at the acceleration transition completion with the target acceleration so as to determine the acceleration command A*(t). As a result, the command generating device can obtain the acceleration command which does not excite any vibration in the machine 4 when performing the acceleration changing control operation on the machine 4. Since the jerk command is continuous and smooth, this variant can be applied to even the actuator 3 and actuator drive controller 2 having a low degree of trackability, and high-frequency vibrations are also hard to excite in the machine.

For example, the acceleration transition completion time is $2t_0$ and the vibration frequency of the machine is ω, the jerk command which is the first derivative with respect to time of the acceleration command is expressed by $J^*(t)=j^*(t)+j^*(2t_0-t)$, a crackle command shape which is equal to a fixed multiple of a crackle command which is the third derivative with respect to time of the acceleration command is expressed by $L^{}(t)=l^{}(t)-l^{}(2t_0-t)$, and $l^{}(t)$ is given by the following equation (61). As an alternative, the snap command shape $K^{}(t)$ which has a parameter r and a value equal to a fixed multiple of the snap command which is the second derivative with respect to time of the acceleration command is given by the following equation (62), the parameter r is determined from a table, as shown in table 1, which associates the parameter r with the vibration frequency ω of the machine 4, and the command shape is determined. As an alternative, the snap command shape $K^{}(t)$ is provided by the following equation (63), and the parameter r is determined from a table, as shown in table 2, which associates the parameter r with the vibration frequency ω of the machine 4, and the command shape is determined.

$$l^{**}(t) = \begin{cases} c & (0 \le t \le t_0 - t_A) \\ 0 & (t_0 - t_A < t < t_A) \\ -c & (t_A \le t \le t_0) \end{cases} \quad (61)$$

where $t_A = (2\pi/\omega)[(t_0 \times \omega)/(2\pi)]$

-continued $$K^{**}(t) = \begin{cases} \sin\left(\frac{\pi}{2rt_0}t\right) & (0 \le t \le rt_0) \\ 1 & (rt_0 < t < (1-r)t_0) \\ \cos\left(\frac{\pi}{2rt_0}(t-(1-r)t_0)\right) & ((1-r)t_0 \le t \le t_0) \\ -\sin\left(\frac{\pi}{2rt_0}(t-t_0)\right) & (t_0 < t \le (1+r)t_0) \\ -1 & ((1+r)t_0 < t < (2-r)t_0) \\ \cos\left(\frac{\pi}{2rt_0}(t-(2-r)t_0)\right) & ((2-r)t_0 < t \le 2t_0) \\ 0 & (\text{otherwise}) \end{cases} \quad (62)$$

$$K^{**}(t) = \begin{cases} \cos\left(\frac{\pi}{2}\frac{r}{t_0}t\right) & (0 \le t \le t_0) \\ -\cos\left(\frac{\pi}{2}\frac{r}{t_0}(2t_0-t)\right) & (t_0 \le t \le 2t_0) \\ 0 & (\text{otherwise}) \end{cases} \quad (63)$$

As explained above, the acceleration command in accordance with this embodiment 7 can be obtained by using nearly the same method as that used at the time of obtaining the position command according to above-mentioned embodiments 1, 2 and 3. For this reason, the present embodiment has the same advantages as provided by above-mentioned embodiments 1, 2, and 3 of the present invention. That is, the acceleration command obtained by the command generating device in accordance with this embodiment does not contain many high-frequency components. Therefore, the present embodiment offers an advantage of preventing excitation of vibrations in the machine due to lack of trackability (i.e., responsibility) of the actuator 3 and actuator drive 2. Furthermore, the present embodiment offers another advantage of preventing excitation of higher-order modes of vibrations in the machine.

Embodiment 8.

Most of actuators have a maximum velocity which they can generate, or most of machines have a maximum velocity at which they can move. It is therefore necessary to form a position command X*(t) which contains information about such a maximum velocity and which does not excite any vibration in a target machine to be driven when the machine performs a positioning operation under such conditions.

Figure 29:
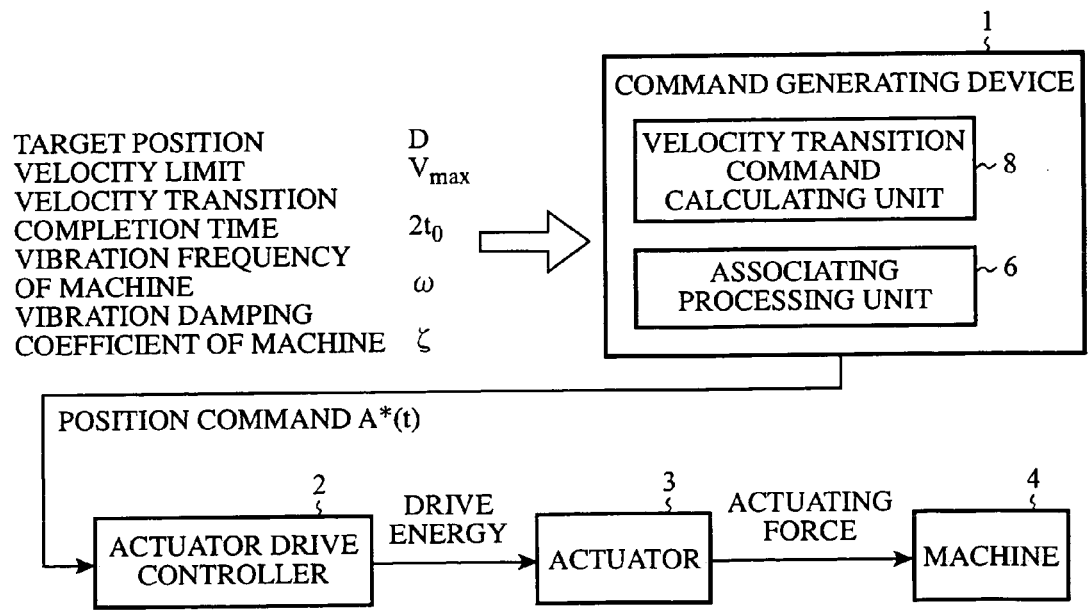
FIG. 29 is a block diagram showing the structure of an actuating control system for actuating a machine, to which a command generating device in accordance with embodiment 8 of the present invention is applied.

A command generating device in accordance with this embodiment 8 forms a position command into which information about a maximum velocity is incorporated using a velocity command for changing the velocity of the target machine 4 from a certain velocity to another velocity, which is described in above-mentioned embodiment 7. FIG. 29 is a block diagram showing the structure of an actuating control system for actuating and controlling the machine, to which the command generating device in accordance with embodiment 8 of the present invention is applied. The command generating device 1 calculates the position command X*(t) based on a velocity transition completion time $2t_0$, a target position D, a velocity limit $V_{max}$, and the vibration frequency ω and vibration damping coefficient ζ of the machine 4, by using a velocity transition command calculating unit 8 and an associating processing unit 6.

Figure 30:
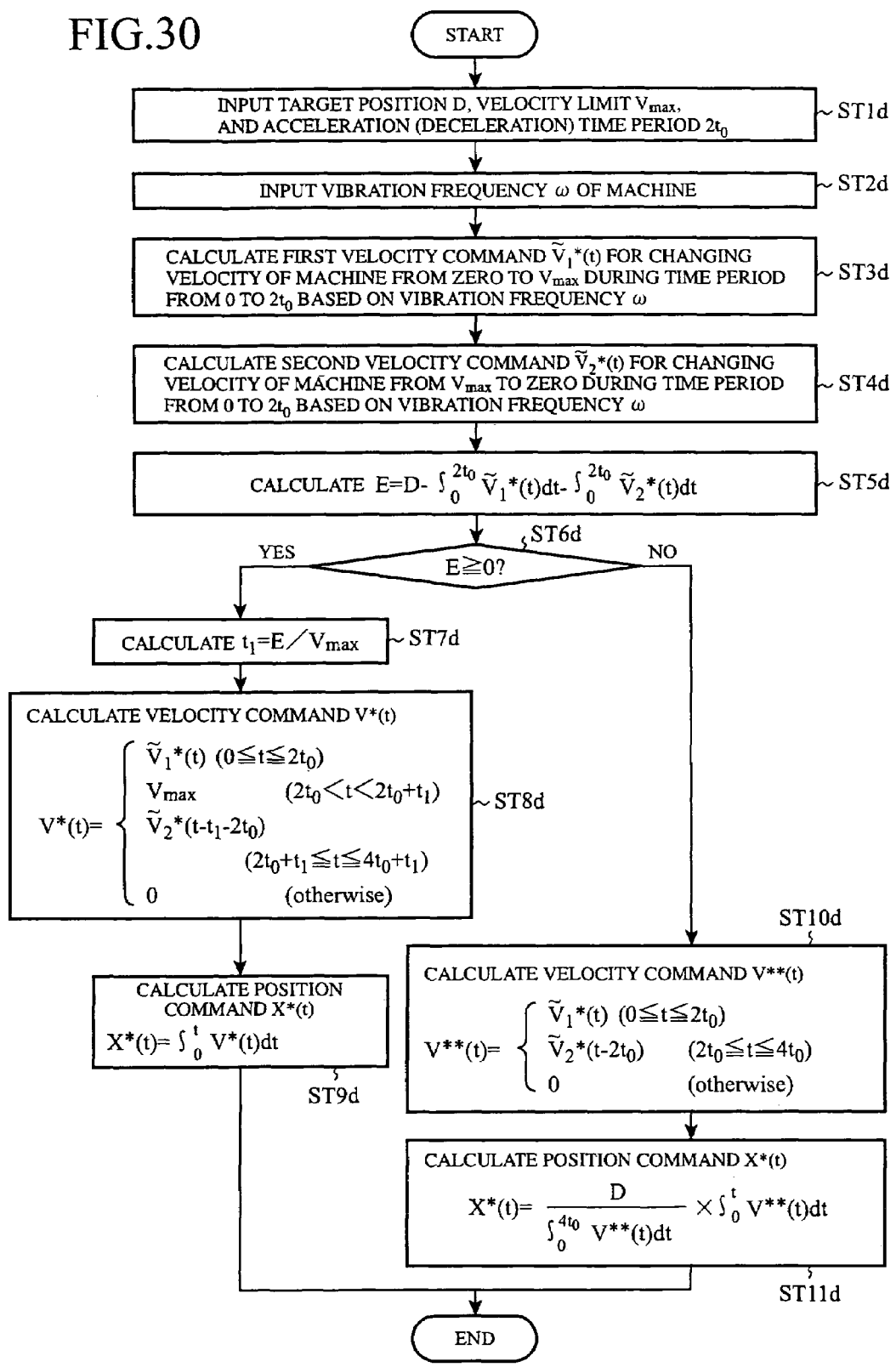
FIG. 30 is a flowchart showing an operation of generating a command which is performed by the command generating device in accordance with embodiment 8.

Next, the operation of the command generating device in accordance with this embodiment of the present invention will be explained. FIG. 30 is a flowchart showing a command generating operation which is performed by the command generating device in accordance with embodiment 8. A procedure for forming the position command will be explained in detail with reference to this figure. First, the target position D, the velocity limit $V_{max}$ of the machine 4 to be driven, and the velocity transition completion time (or an acceleration or deceleration time period) $2t_0$ are inputted to the command generating device 1 (in step ST1*d*). Next, in step ST2*d*, the vibration frequency ω of the machine 4 which is determined beforehand for the machine 4 is inputted to the command generating device 1.

Then, based on the inputted vibration frequency ω of the machine 4, the velocity transition command calculating unit 8 of the command generating device 1 in accordance with embodiment 8 calculates a velocity transition command $V_1^*$(t) tilde (tilde phonetically means ) which changes the velocity of the machine 4 from zero to the velocity limit $V_{max}$ during the time period from the time t=0 to the time t=the velocity transition completion time (in step ST3*d*). For example, as shown in above-mentioned embodiment 7, the velocity transition command calculating unit 8 calculates the first velocity transition command $V_1^*$(t) tilde using a method of generating a velocity command for changing the velocity of the machine 4 from a certain velocity to another velocity.

Next, the velocity transition command calculating unit 8 also calculates a second velocity transition command $V_2^*$(t) tilde (tilde phonetically means ) which changes the velocity of the machine 4 from the velocity limit $V_{max}$ to zero during the deceleration time period of $2t_0$ based on the inputted vibration frequency ω of the machine 4 (in step ST4*d*), as in the case of the process of step ST3*d*.

The associating processing unit 6 then calculates the following equation (64) (in step ST5*d*) so as to determine whether E is zero or more (in step ST6*d*). For each velocity command value of the first velocity transition command $V_1^*$(t) tilde and second velocity transition command $V_2^*$(t) tilde, the amount of movement E which the machine 4 travels during the acceleration time period and deceleration time period is compared with the target position D.

$$E = D - \int_0^{2t_0} \tilde{V}_1^*(t) dt - \int_0^{2t_0} \tilde{V}_2^*(t) dt \tag{64}$$

When determining that E>=0 in step ST6*d*, the associating processing unit 6 determines that the amount of travel E does not reach the target position D, and shifts to step ST7*d* in which it calculates $t_1 = E/V_{max}$. The associating processing unit 6 then calculates a velocity command V*(t) which is the first derivative with respect to time of the position command X*(t) according to the following equation (65) (in step ST8*d*). In performing this process, the associating processing unit 6 inserts a command indicating the maximum velocity $V_{max}$ between the first velocity transition command $V_1^*$(t) tilde and the second velocity transition command $V_2^*$(t) tilde. In step ST9*d*, the associating processing unit 6 obtains the position command X*(t) by integrating the velocity command V*(t) obtained in step ST8*d* once with respect to time.

$$V^*(t) = \begin{cases} \tilde{V}_1^*(t) & (0 \le t \le 2t_0) \\ V_{max} & (2t_0 < t < 2t_0 + t_1) \\ \tilde{V}_2^*(t - 2t_0) & (2t_0 + t_1 \le t \le 4t_0 + t_1) \\ 0 & (\text{otherwise}) \end{cases} \tag{65}$$

On the other hand, when determining that E<0 in step ST6*d*, the associating processing unit 6 determines that the amount of travel E exceeds the target position D, and then shifts to a process of step ST10*d*. In step ST10*d*, the associating processing unit 6 acquires a velocity command shape V**(t) according to the following equation (66):

$$V^{**}(t) = \begin{cases} \tilde{V}_1^*(t) & (0 \le t \le 2t_0) \\ \tilde{V}_2^*(t - 2t_0) & (2t_0 \le t \le 4t_0) \\ 0 & (\text{otherwise}) \end{cases} \tag{66}$$

Then, in step ST11*d*, the associating processing unit 6 integrates the velocity command shape acquired in step ST10*d* once with respect to time, and multiplies the integral result by a constant which associates the position command at a positioning time with the target position D. That is, the associating processing unit calculates the position command X*(t) according to the following equation (67):

$$X^*(t) = \frac{D}{\int_0^{4t_0} V^{}(t)dt} \times \int_0^t V^{}(t)dt \tag{67}$$

Next, a description will be made as to the reason why the position command X*(t) can be obtained in consideration of the maximum velocity according to the above-mentioned procedure. First, in the case of E>=0, when the velocity command is formed so as to include the first velocity transition command $V_1^*$(t) tilde in order to accelerate the machine, the inserted velocity command which indicates the constant velocity of $V_{max}$ and which is to be provided to the machine during only the time period of t1 in order to make the machine reach the target position D after the completion of the acceleration, and the second velocity transition command $V_2^*$(t) tilde in order to slow down the machine after the expiration of the time period of t1, the position command which provides an amount of travel equal to the target position D can be obtained by integrating the velocity command once with respect to time. Therefore, the velocity command which is thus obtained and is given by the above-mentioned equation (65) does not exceed $V_{max}$.

On the other hand, in the case of E<0, even if the machine is positioned using the velocity command which is formed so as to include the first velocity transition command $V_1^*$(t) tilde in order to accelerate the machine, and the second velocity transition command $V_2^*$(t) tilde in order to slow down the machine after the completion of the acceleration, the machine is positioned past the target position D. To solve this problem, the velocity command shape is defined using the above-mentioned equation (66), and the velocity command shape is integrated once with respect to time, as shown in the above-mentioned equation (67), and the integral result is multiplied by the constant which associates the position command at the positioning time with the target position D, so that the position command which properly positions the machine can be determined.

The velocity command V*(t) which is the first derivative with respect to time of the position command X*(t) at this time is given by the following equation (68). When shifting to step ST10*d*, the following inequality D/(D−E)<1 is established since E<0, and the velocity command V*(t) does not exceed the maximum velocity $V_{max}$ since the velocity command shape V**(t)<=$V_{max}$.

$$V^*(t) = \frac{D}{\int_0^{4t0} V^{}(t)dt} \times V^{}(t) \qquad (68)$$

$$= \frac{D}{\int_0^{2t0} \tilde{V}_1^*(t)dt + \int_0^{2t0} \tilde{V}_2^*(t)dt} \times V^{**}(t)$$

$$= \frac{D}{D-E} \times V^{**}(t)$$

As mentioned above, when generating a position command for moving the machine 4 to a target position under the constraint that a velocity command which is the first derivative with respect to time of the position command cannot have a maximum which is equal to or larger than the velocity limit $V_{max}$, the command generating device in accordance with this embodiment 8 calculates a first velocity transition command $V_1^*(t)$ tilde which changes the velocity of the machine 4 from zero to the certain velocity limit $V_{max}$ and a second velocity transition command $V_2^*(t)$ tilde which changes the velocity of the machine 4 from the certain velocity limit to zero by using the velocity transition command calculating unit 8, forms the velocity command which is the first derivative with respect to time of the position command from a combination of a product of the first velocity transition command $V_1^*(t)$ tilde and a constant number equal to or smaller than 1, a product of the second velocity transition command $V_2^*(t)$ tilde and a constant number equal to or smaller than 1, and a fixed velocity equal to or smaller than the velocity limit $V_{max}$ by using the associating processing unit 6, and carries out a process of associating an amount of travel provided by the position command with the target position without exciting any vibration in the machine. Therefore, the command generating device in accordance with this embodiment can obtain a position command which provides a velocity command which is the first derivative with respect to time of the position command and which does not have a maximum exceeding the velocity limit and prevents vibrations from occurring in the machine. Using the velocity command which is the first derivative with respect to time of the position command, the positioning operation can be performed without any delay to the position command. Even when either the actuator or the machine has a velocity limit which the actuator or the machine shall not exceed in velocity, the command generating device in accordance with this embodiment can form a position command which properly positions the machine.

Embodiment 9.

Each of a target machine to be driven and an actuator can have a maximum acceleration limit, as well as a maximum velocity limit which each of them shall not exceed in velocity. In such a case, the command generating device according to either of above-mentioned embodiments needs to take an acceleration limit and a velocity limit of each of the machine and actuator into consideration, and, moreover, needs to generate a position command which does not excite any vibration in the machine. In this embodiment 9, a method of forming a position command $X^*(t)$ which does not excite any vibration in the machine in consideration of a maximum acceleration and a maximum velocity will be explained.

Figure 31:
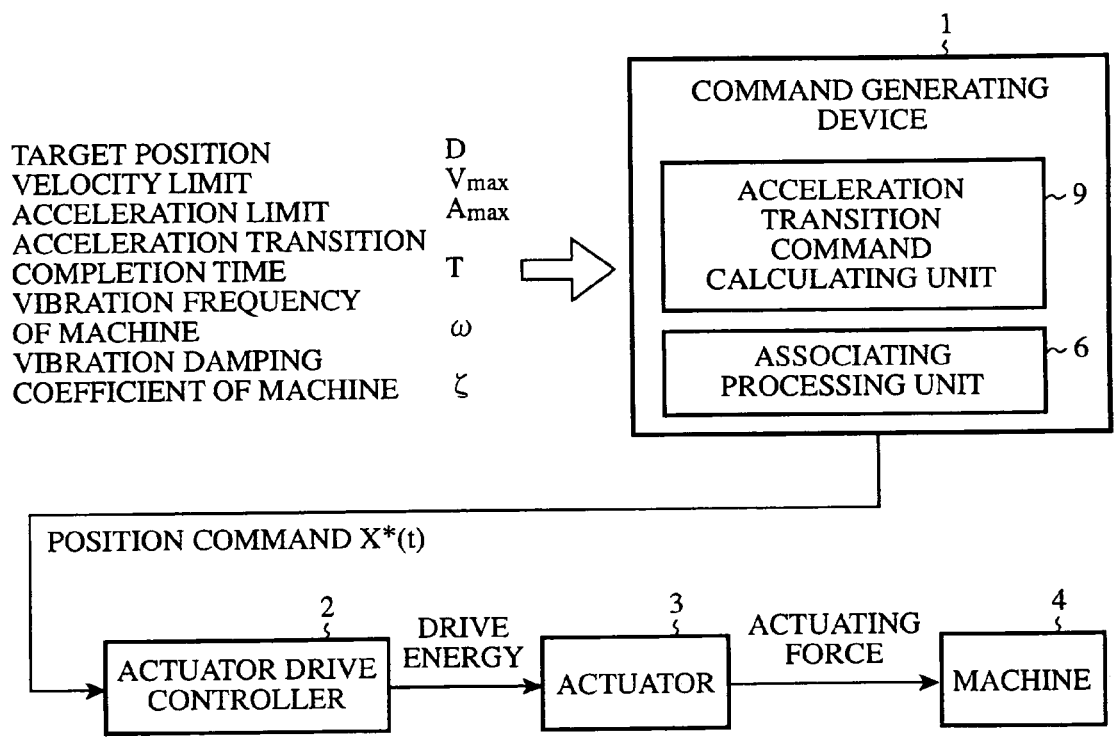
FIG. 31 is a block diagram showing the structure of an actuating control system for actuating a machine, to which a command generating device in accordance with embodiment 9 of the present invention is applied.
Figure 32:
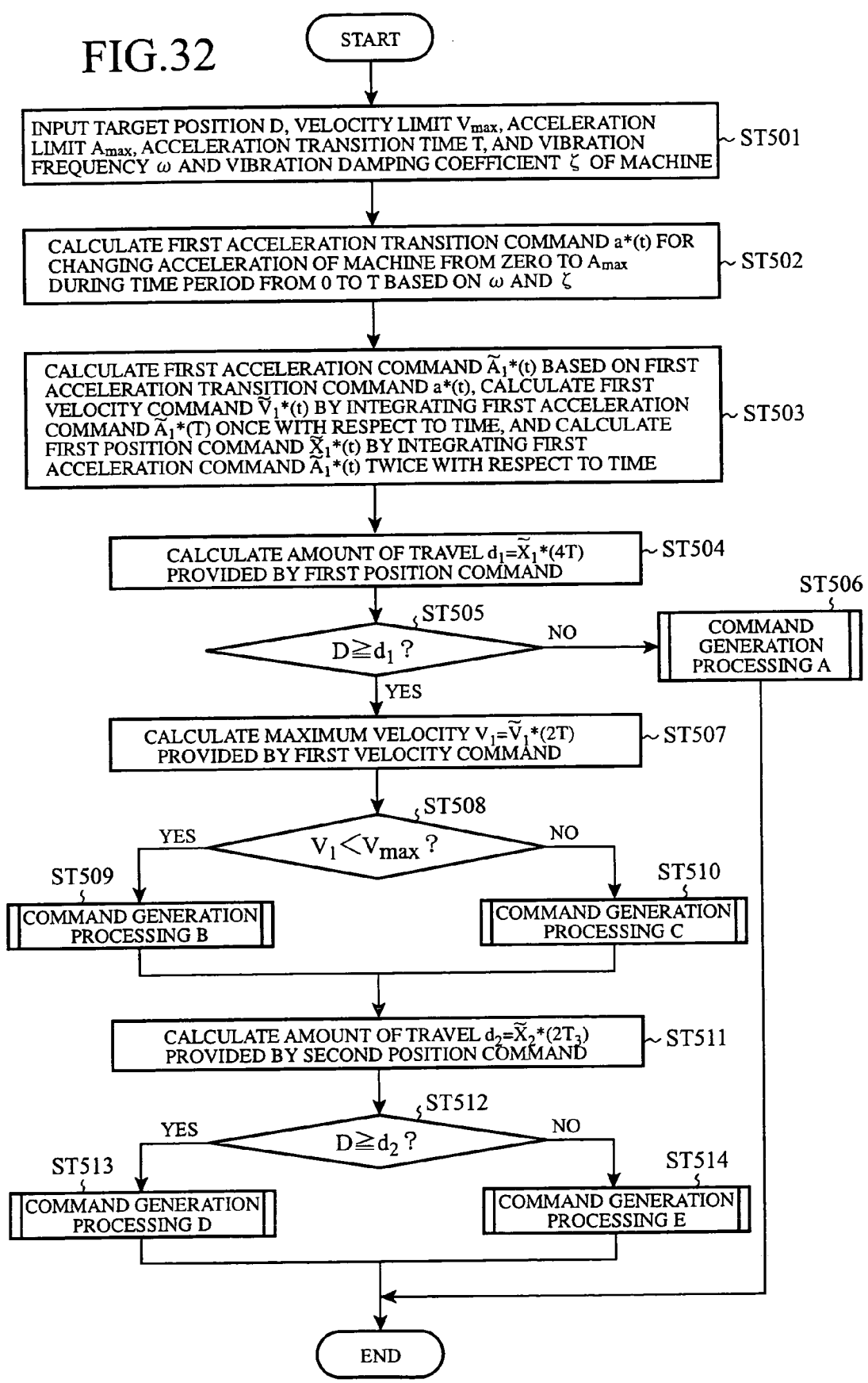
FIG. 32 is a flowchart showing an operation of generating a position command which is performed by the command generating device in accordance with embodiment 9.

FIG. 31 is a block diagram showing the structure of an actuating control system for actuating and controlling the machine, to which a command generating device in accordance with embodiment 9 of the present invention is applied. The command generating device 1 calculates the position command $X^*(t)$ based on an acceleration transition completion time T, a target position D, a velocity limit $V_{max}$, an acceleration limit $A_{max}$, and the vibration frequency $\omega$ and vibration damping coefficient $\zeta$ of the machine, using an acceleration transition command calculating unit 9 and an associating processing unit 6.

FIGS. 32 to 37 are a flowchart showing a process of obtaining the position command $X^*(t)$ which is carried out by the command generating device in accordance with embodiment 9. In step ST501 of FIG. 32, the acceleration transition completion time T, target position D, velocity limit $V_{max}$, acceleration limit $A_{max}$, and vibration frequency $\omega$ and vibration damping coefficient $\zeta$ of the machine are provided to the command generating device 1.

In step ST502, the acceleration transition command calculating unit 9 calculates an acceleration transition command $a^*(t)$ for changing the acceleration of the machine from zero to the acceleration limit $A_{max}$ during the time period from the time t=0 to the time t=T without exciting any vibration in the machine, based on the vibration frequency $\omega$ and vibration damping coefficient $\zeta$ of the machine 4. This calculation is implemented using the method explained in, for example, above-mentioned embodiment 7.

The associating processing unit 6 carries out the following processing. In step ST503, the associating processing unit 6 calculates a first acceleration command defined by the following equation (69) based on the first acceleration transition command $a^*(t)$.

$$\tilde{A}_1^*(t) = \begin{cases} a^*(t) & (0 \leq t < T) \\ A_{\max} - a^*(t-T) & (T \leq t < 2T) \\ -\tilde{a}(t-2T) & (2T \leq t < 3T) \\ -A_{\max} + a^*(t-3T) & (3T \leq t \leq 4T) \\ 0 & (\text{otherwise}) \end{cases} \qquad (69)$$

In this equation, $(A_{max}-a^*(t-T))$ indicates a second acceleration transition command which changes the acceleration of the machine from the acceleration limit $A_{max}$ to zero without exciting any vibration in the machine, and $(-A_{max}+a^*(t-T))$ indicates the second acceleration transition command which changes the acceleration of the machine from an acceleration of $-A_{max}$ to zero without exciting any vibration in the machine. Although the second acceleration transition command which changes the acceleration of the machine from the acceleration limit $A_{max}$ to zero is calculated using the first acceleration command $a^*(t)$, the second acceleration transition command which changes the acceleration of the machine from the acceleration limit $A_{max}$ to zero can be calculated using an acceleration transition command having another shape instead of the first acceleration command $a^*(t)$.

The associating processing unit 6 calculates a first velocity command $V_1(t)$ tilde (tilde phonetically means ) by integrating the first acceleration command once with respect to time, and calculates a first position command $X_1(t)$ tilde (tilde phonetically means ) by integrating the first velocity command once with respect to time. The first velocity command is a velocity command having a value other than zero during a time period 0<=t<=4T, and the first position command becomes a position command for moving the machine from an initial position to a certain position during the time period from the time t=0 to the time t=4T.

In step ST504, the associating processing unit 6 calculates an amount of travel provided by the first position command, i.e., an amount of travel $d_1$ according to the following equation (70). In step ST505, the associating processing unit 6 compares the amount of travel $d_1$ provided by the first position command with the target position D, and, when determining that the amount of travel $d_1$ provided by the first position command is not smaller than the target position D, the associating processing unit 6 shifts to a command generation processing A of step ST506.

$$d_1 = \tilde{X}_1^*(4T) \tag{70}$$

Figure 33:
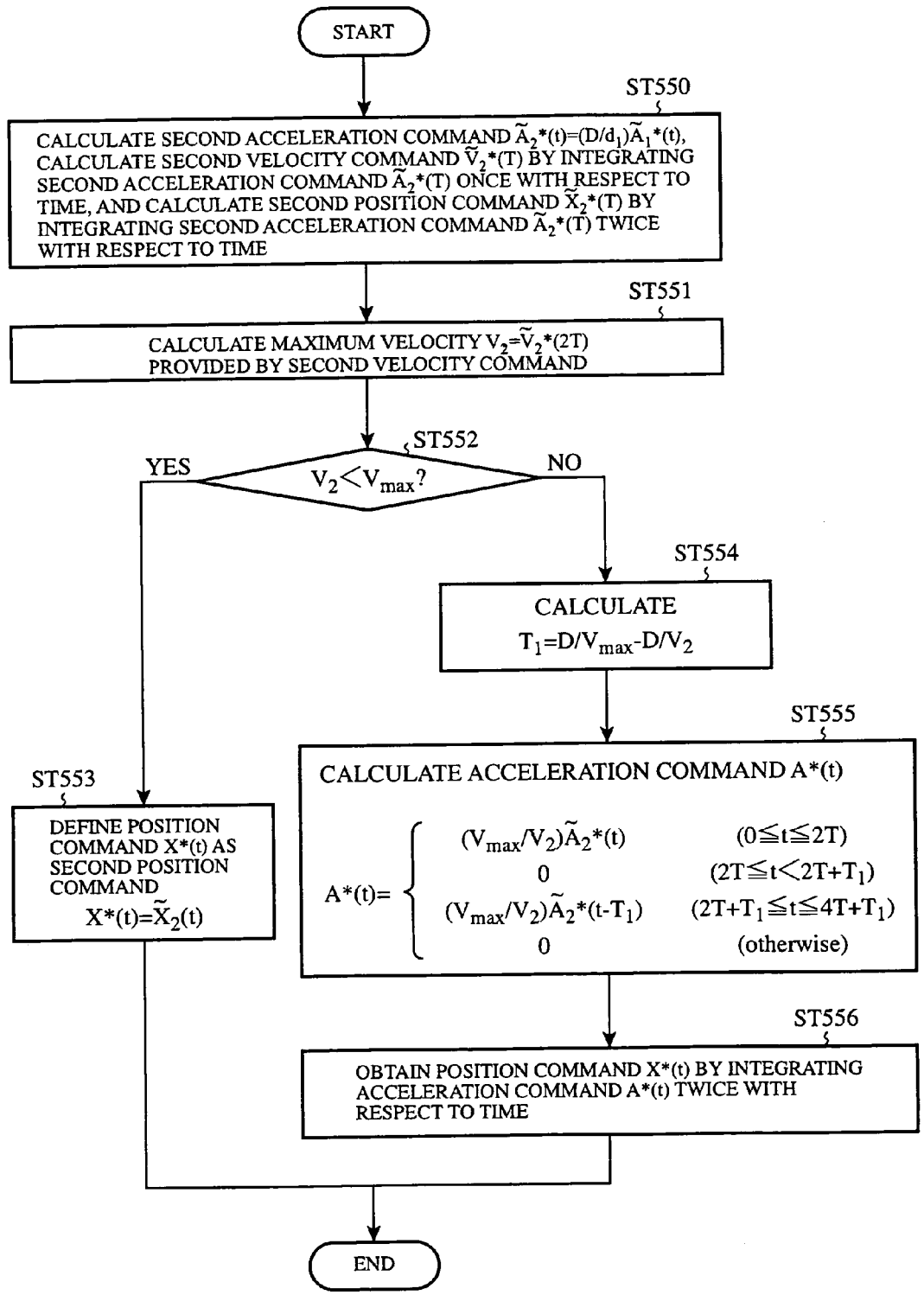
FIG. 33 is a flowchart explaining a command generation processing A.

FIG. 33 is a flowchart explaining the command generation processing A. In step ST550, the associating processing unit 6 calculates a second acceleration command $A_2^*(t)$ tilde (tilde phonetically means ) by multiplying the first acceleration command by $D/d_1$, i.e., by using the following equation (71):

$$\tilde{A}_2^*(t) = (D/d_1)\tilde{A}_1^*(t) \tag{71}$$

The associating processing unit 6 calculates a second velocity command by integrating the second acceleration command once with respect to time, and calculates a second position command by integrating the second acceleration command twice with respect to time. These calculations are a process of lowering the acceleration by multiplying the first acceleration command by the constant $D/d_1$ equal to or less than 1, and of associating the second position command at a positioning time with the target position. The second acceleration command which is obtained by multiplying the first acceleration command by the constant $D/d_1$ is also an acceleration command which does not excite any vibration in the machine. Furthermore, since the constant is equal to or smaller than 1, the second acceleration command indicates an acceleration equal to or smaller than the acceleration limit. In step ST551, the associating processing unit 6 calculates a maximum velocity of the second velocity command according to the following equation (72):

$$V_2 = \tilde{V}_2(2T) \tag{72}$$

In step ST552, the associating processing unit 6 compares the maximum velocity $V_2$ of the second velocity command with the velocity limit $V_{max}$. When, in step ST552, determining that the maximum velocity of the second velocity command does not exceed the velocity limit $V_{max}$, the associating processing unit 6, in step ST553, determines that the second position command is the position command which is to be determined. The associating processing unit 6 multiplies the first acceleration command by $D/d_1$ so as to associate the second acceleration command at the positioning time with the target position D, so that $X^*(4T)$ becomes equal to D.

When, in step ST552, determining that the maximum velocity of the second velocity command exceeds the velocity limit $V_{max}$, the associating processing unit 6, in step ST554, calculates a time $T_1 = D/V_{max} - D/V_2$. The associating processing unit 6 then, in step ST555, calculates an acceleration command according to the following equation (73):

$$A^*(t) = \begin{cases} (V_{max}/V_2)\tilde{A}_2^*(t) & (0 \leq t \leq 2T) \\ 0 & (2T \leq t < 2T + T_1) \\ (V_{max}/V_2)\tilde{A}_2^*(t - T_1) & (2T + T_1 \leq t \leq 4T + T_1) \\ 0 & (\text{otherwise}) \end{cases} \tag{73}$$

In steps ST554 and ST555, the associating processing unit 6 performs a process of making the second acceleration command satisfy the requirement to limit the velocity of the machine to the velocity limit or less, and associating the position command at the positioning time with the target position D. That is, since the velocity of the machine exceeds the velocity limit $V_{max}$ if the drive control system carries out the operation of positioning the machine using the second acceleration command, the associating processing unit 6 multiplies the second acceleration command by $V_{max}/V_2$ so as to generate an acceleration command which accelerates the machine up to at most the velocity $V_{max}$.

However, since the amount of travel provided by this acceleration command is equal to $DxV_{max}/V_2$ even if this acceleration command is integrated twice with respect to time, the associating processing unit 6 performs a process of inserting only a time period of $T_1$ in which the acceleration is kept at zero between the acceleration time period (0<=t<=2T) and the deceleration time period (0<=t<=4T) of the second acceleration command, and setting the velocity command during the time period of $T_1$ to $V_{max}$. The acceleration command which is thus determined in consideration of both the satisfaction of the requirement to limit the velocity of the machine to the velocity limit or less and the association of the position command at the positioning time with the target position D is expressed by the above-mentioned equation (73). The associating processing unit 6, in step ST556, integrates the acceleration command $A^*(t)$ expressed by the above-mentioned equation (73) twice with respect to time so as to calculate the position command $X^*(t)$ to be determined. When the associating processing unit 6 shifts to step ST556, ($V_{max}/V_2$) is a constant equal to or less than 1 since $V_{max} <= V_2$ in step ST552.

When the target position D is larger than the amount of travel $d_1$ provided by the first position command, in step ST505, the associating processing unit 6, in step ST507, calculates a maximum velocity $V_1$ of the first velocity command according to the following equation (74):

$$V_1 = \tilde{V}_1^*(2T) \tag{74}$$

The associating processing unit 6 then, in step ST508, compares the maximum velocity $V_1$ of the first velocity command with the velocity limit $V_{max}$. When determining that $V_1$ is smaller than $V_{max}$, the associating processing unit 6 shifts to a command generation processing B of step ST509, whereas when determining that $V_1$ is equal to or larger than $V_{max}$, the associating processing unit 6 shifts to a command generation processing C of step ST510.

Figure 34:
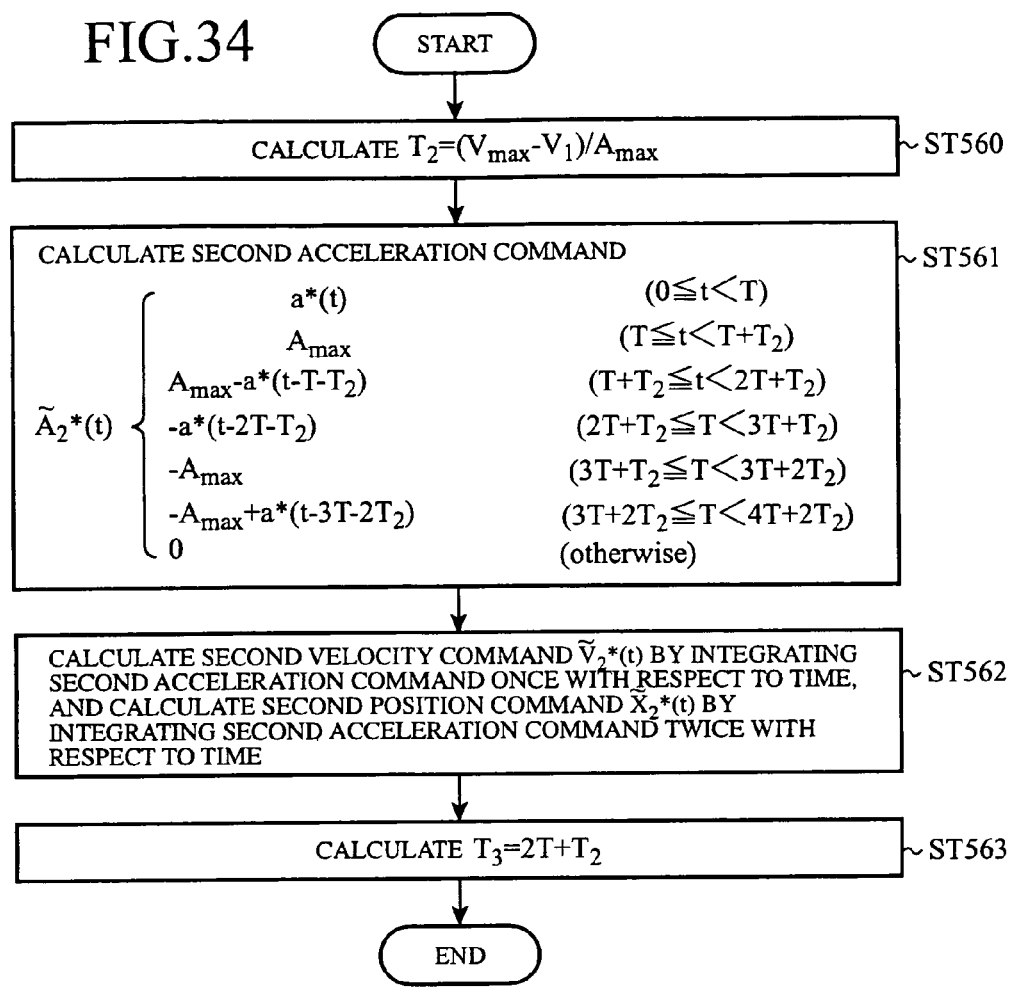
FIG. 34 is a flowchart explaining a command generation processing B.

FIG. 34 is a flowchart for explaining the command generation processing B which is carried out when $V_1$ is smaller than $V_{max}$ in step ST505. The associating processing unit 6, in step ST560, calculates a time $T_2 = (V_{max} - V_1)/A_{max}$.

The associating processing unit 6, in step ST561, calculates the second acceleration command according o the following equation (75). The associating processing unit 6 then, in step ST562, calculates a second velocity command $V_2^*(t)$ tilde (tilde phonetically means ) by integrating the second acceleration command once with respect to time, and calculates a second position command $X_2^*(t)$ tilde (tilde phonetically means ) by integrating the second acceleration command twice with respect to time. The associating processing unit 6 also, in step ST562, calculates a time $T_3 = 2T + T_2$.

$$\tilde{A}_2^*(t) = \begin{cases} a^*(t) & (0 \leq t < T) \\ A_{max} & (T \leq t < T + T_2) \\ A_{max} - a^*(t - T - T_2) & (T + T_2 \leq t < 2T + T_2) \\ -a^*(t - 2T - T_2) & (2T + T_2 \leq T < 3T + T_2) \\ -A_{max} & (3T + T_2 \leq T < 3T + 2T_2) \\ -A_{max} + a^*(t - 3T - 2T_2) & (3T + 2T_2 \leq T \leq 4T + 2T_2) \\ 0 & (\text{otherwise}) \end{cases} \tag{75}$$

Since the maximum velocity of the first velocity command does not exceed $V_{max}$ in steps ST560 to ST563, the associating processing unit 6 generates a command for making the maximum velocity reach $V_{max}$. That is, since the first acceleration command is the one which changes the acceleration of the machine from zero to $A_{max}$ during the time period from the time t=0 to the time t=T, and then changes the acceleration of the machine from $A_{max}$ to zero during the time period from the time t=T to the time t=2T, only a time period of $T_2$ during which the acceleration of the machine is kept at $A_{max}$ (referred to as a uniform acceleration time period from here on) is inserted between the first time period 0<=t<=T and the second time period T<=t<=2T of the first acceleration command in order to make the maximum velocity which the machine has according to the first acceleration command to reach $V_{max}$. The second acceleration command thus determined is expressed by the above-mentioned equation (75).

Figure 35:
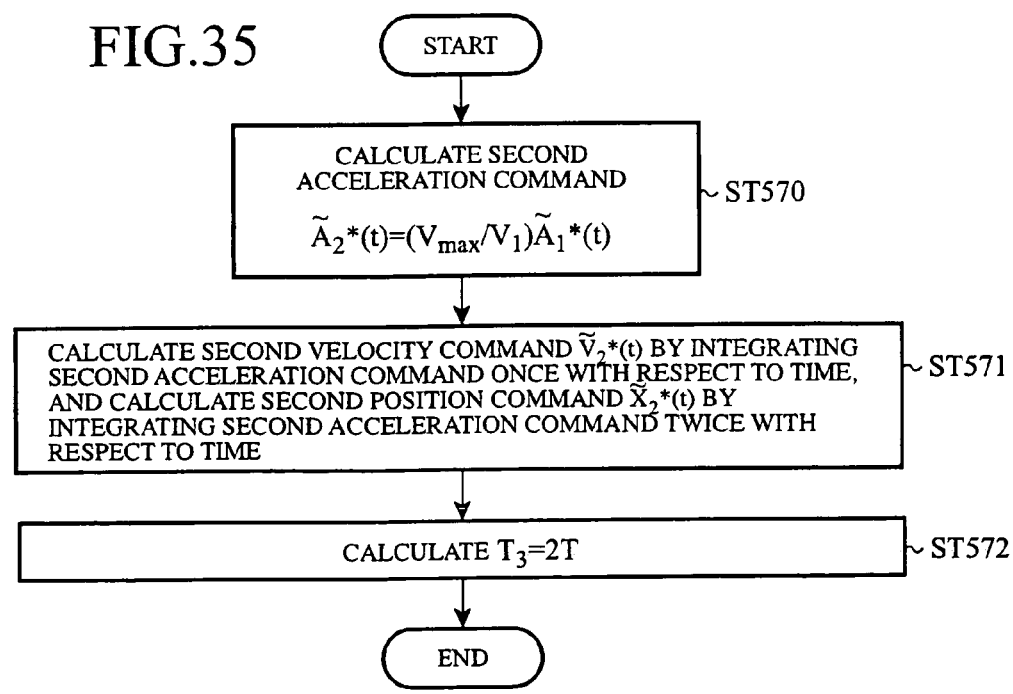
FIG. 35 is a flowchart explaining a command generation processing C.

FIG. 35 is a flowchart for explaining the command generation processing C which is carried out when $V_1$ is larger than $V_{max}$ in step ST505. The associating processing unit 6, in step ST570, calculates the second acceleration command according to the following equation (76). In this case, since $V_1$ is larger than $V_{max}$, $(V_{max}/V_1)$ is a constant equal to or smaller than 1.

$$\tilde{A}_2^*(t)=(V_{max}/V_1)\times\tilde{A}_1^*(t) \tag{76}$$

The associating processing unit 6, in step ST571, calculates a second velocity command $V_2^*(t)$ tilde by integrating the second acceleration command once with respect to time, and also calculates a second position command $X_2^*(t)$ tilde by integrating the second acceleration command twice with respect to time. The associating processing unit 6 then, in step ST572, calculates a time $T_3=2T$. Since the maximum velocity of the first velocity command exceeds $V_{max}$ in steps ST570 to ST572, the associating processing unit 6, performs a process of multiplying the first acceleration command by $V_{max}/V_1$ so as to make the maximum velocity of the second velocity command be equal to $V_{max}$. The associating processing unit 6, in step ST511, calculates an amount of travel $d_2$ provided by the second position command and calculated by either the command generation processing B of step ST509 or the command generation processing C of step ST510 according to the following equation (77):

$$d_2=\tilde{X}_2^*(2T_3) \tag{77}$$

The associating processing unit 6, in step ST512, compares the target position D with the amount of travel $d_2$ provided by the second position command, and, when determining that D is equal to or larger than $d_2$, shifts to a command generation processing D of step ST513, whereas when determining that D is smaller than $d_2$, shifts to a command generation processing E of step ST514.

Figure 36:
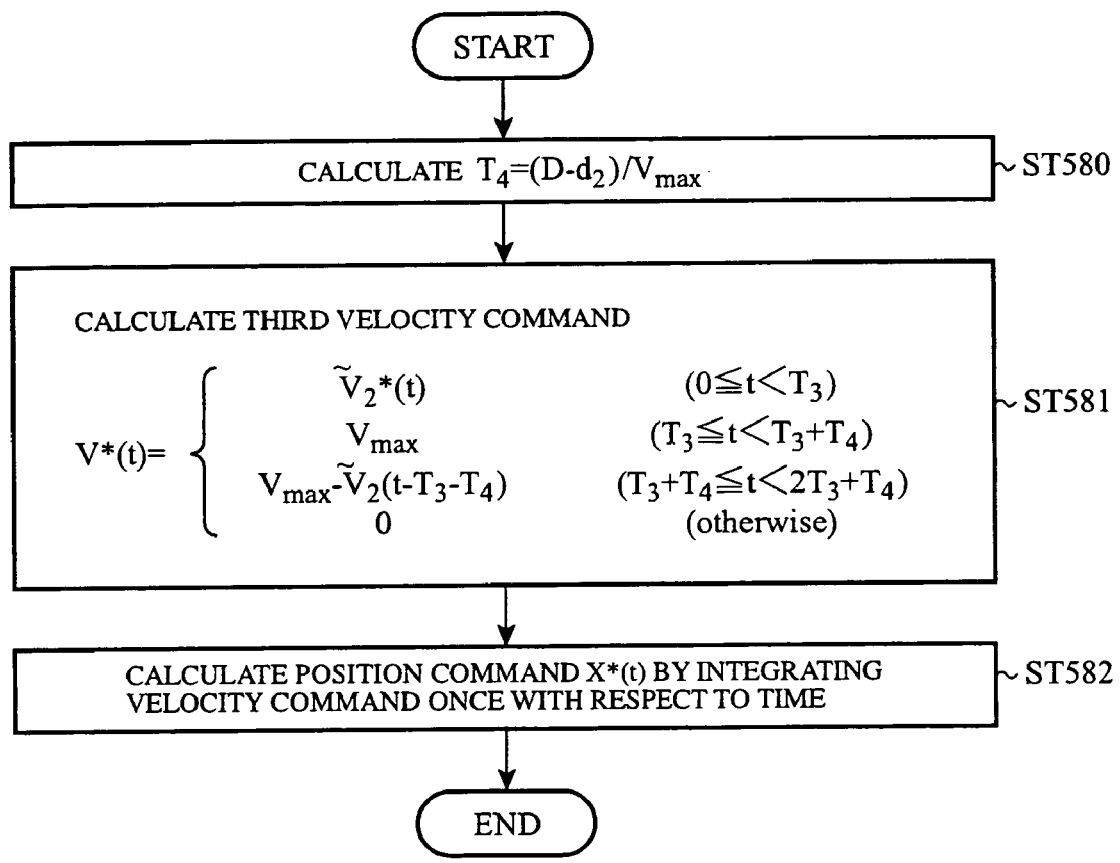
FIG. 36 is a flowchart explaining a command generation processing D.

FIG. 36 is a flowchart for explaining the command generation processing D which is carried out when D is equal to or larger than $d_2$ in step ST512. The associating processing unit 6, in step ST580, calculates a time $T_4=(D-d_2)/V_{max}$. The associating processing unit 6 then, in step ST581, calculates a velocity command $V^*(t)$ according to the following equation (78). The associating processing unit 6, in step ST582, calculates the position command $X^*(t)$ which is to be determined by integrating the velocity command $V^*(t)$ once with respect to time.

$$V^*(t) = \begin{cases} \tilde{V}_2^*(t) & (0 \le t < T_3) \\ V_{max} & (T_3 \le t < T_3 + T_4) \\ V_{max} - \tilde{V}_2^*(t - T_3 - T_4) & (T_3 + T_4 \le t \le 2T_3 + T_4) \\ 0 & (\text{otherwise}) \end{cases} \tag{78}$$

In steps ST580 to ST582, since the amount of travel provided by the second position command $X_2(t)$ tilde does not reach the target position D, the associating processing unit 6 performs a process of compensating for the amount of travel which is short. That is, only a time period of $T_4$ which the velocity of the machine is kept at $V_{max}$ is inserted between the acceleration time period (0<=T<=$T_3$) and the deceleration time period ($T_3$<=T<=2$T_3$) of the second velocity command. This processing corresponds to the above-mentioned equation (78).

Figure 37:
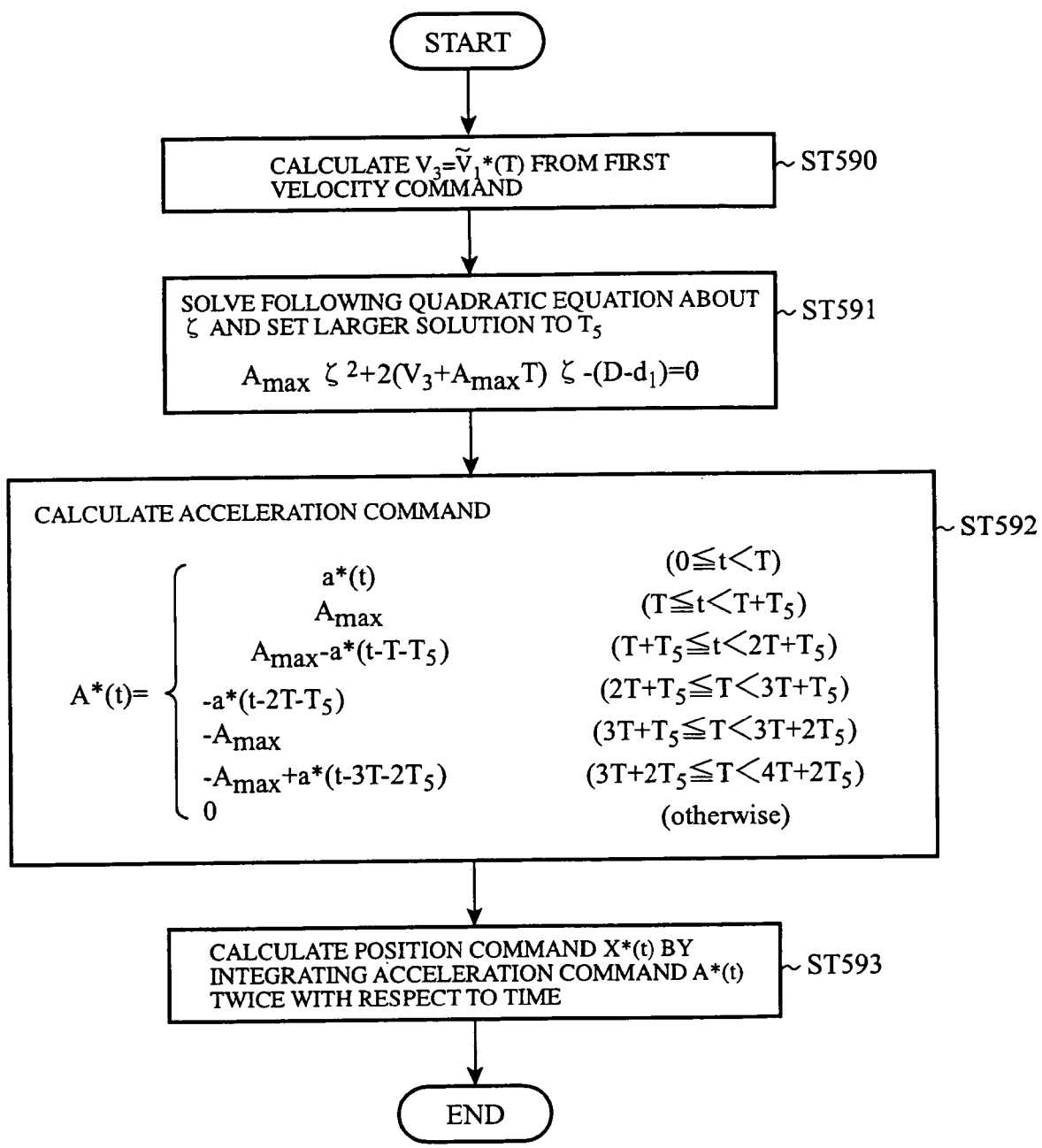
FIG. 37 is a flowchart explaining a command generation processing E.

FIG. 37 is a flowchart for explaining the command generation processing E which is carried out when D is smaller than $d_2$ in step ST513. The associating processing unit 6, in step ST590, calculates V3 from the first velocity command according to the following equation (79). The associating processing unit 6 then, in step ST591, solves the following equation (80) which is a quadratic equation with respect to $\zeta$, and sets a solution having a larger value to $T_5$.

$$V_3=\tilde{V}_1^*(T) \tag{79}$$

$$A_{max}\xi^2+2(V_3+A_{max}T)\xi-(D-d_1)=0 \tag{80}$$

The associating processing unit 6, in step ST592, calculates the acceleration command $A^*(t)$ according to the following equation (81). The associating processing unit 6 then, in step ST593, obtains the position command $X^*(t)$ by integrating the acceleration command $A^*(t)$ twice with respect to time.

$$A^*(t) = \begin{cases} a^*(t) & (0 \le t < T) \\ A_{max} & (T \le t < T + T_5) \\ A_{max} - a^*(t - T - T_5) & (T + T_5 \le t < 2T + T_5) \\ -a^*(t - 2T - T_5) & (2T + T_5 \le T < 3T + T_5) \\ -A_{max} & (3T + T_5 \le T < 3T + 2T_5) \\ -A_{max} + a^*(t - 3T - 2T_5) & (3T + 2T_5 \le T \le 4T + 2T_5) \\ 0 & (\text{otherwise}) \end{cases} \tag{81}$$

Since the amount of travel provided by the second position command $X_2(t)$ tilde exceeds the target position D in steps ST590 to ST593, the associating processing unit 6 performs the process of associating the position command at the positioning time with the target position D by reducing the uniform acceleration time period of the second acceleration command (Since the associating processing unit multiplies the first acceleration command by the constant smaller than 1 so as to obtain the second acceleration command when shifting to the command generation processing C in step ST509, the amount of travel $d_2$ provided by the second position command is smaller than the amount of travel $d_1$ provided by the first position command. That is, the associating processing unit calculates a uniform acceleration time period of $T_5$ in order to associate the position command at the positioning time with the distance D according to the above-mentioned equation (80), and inserts only the uniform acceleration time period of $T_5$ during which the acceleration of the machine is kept at $A_{max}$ between the first time period 0 <=t<=T and the second time period T<=t<=2T of the first acceleration command according to the above-mentioned equation (81). For this reason, when shifting to the command generation processing C of step ST508, the associating processing unit does not shift to the command generation processing D of step ST513 in step ST512). This is the acceleration command $A^*(t)$ given by the above-mentioned equation (81).

The position command $X^*(t)$ is thus obtained according to the above-mentioned flow, and the position command is calculated by either of the command generation processings A, D, and E. The acceleration command which is the second derivative with respect to time of the position command is provided by the above-mentioned equation (71) when the associating processing unit shifts to the command generation processing A of step ST553, is provided by the above-mentioned equation (73) when the associating processing unit shifts to step ST555 of the command generation processing A, is provided by the above-mentioned equation (75) or (76) when the associating processing unit shifts to the command generation processing D, and is provided by the above-mentioned equation (81) when the associating processing unit shifts to the command generation processing E.

Noting that the first acceleration command $A_1{}^*(t)$ tilde consists of the first acceleration transition command that changes the acceleration of the machine from zero to the acceleration limit $A_{max}$ without exciting any vibration in the machine, and the second acceleration transition command that changes the acceleration of the machine from the acceleration limit $A_{max}$ to zero without exciting any vibration in the machine, as shown in the above-mentioned equation (69), the acceleration command given by the above-mentioned equations (71), (73), (75), (76), and (81) consists of the first acceleration transition command that changes the acceleration of the machine from zero to the acceleration limit $A_{max}$ without exciting any vibration in the machine, the second acceleration transition command that changes the acceleration of the machine from the acceleration limit $A_{max}$ to zero without exciting any vibration in the machine, a product of the second acceleration transition command and a constant equal to or smaller than 1, 0, and the maximum acceleration $A_{max}$.

Therefore, the positioning control can be carried out properly so that the acceleration of the machine which is provided by the position command which is obtained by integrating the acceleration commands twice with respect to time does not exceed the acceleration limit. In addition, the associating processing is carried out so that the position command at the positioning time can be associated with the target position D, and the velocity command which is the first derivative with respect to time of the position command can have a value equal to or smaller than the velocity limit. The position command obtained according to the above-mentioned flow satisfies the conditions of the acceleration limit and velocity limit, and causes the machine to reach the target position D without exciting any vibration in the machine.

Next, advantages offered by the present embodiment will be explained with reference to numerical calculation examples. Assume that the command generating device generates a position command for a case where the vibration frequency of the machine 4 is 10 Hz ($\omega=2\pi\cdot10=31.4$ [rad/s]), the vibration damping coefficient of the machine is $\zeta=0.03$, the target position is D=0.2, the velocity limit $V_{max}$ is 0.5, and the acceleration limit is 2.0. First, the description will be directed to a numerical calculation example to which the position command in accordance with the present embodiment is not applied, but to which a trapezoid-shaped velocity command which makes the most of the velocity limit and acceleration limit and which is the first derivative with respect to time of the position command is applied.

Figure 38A:
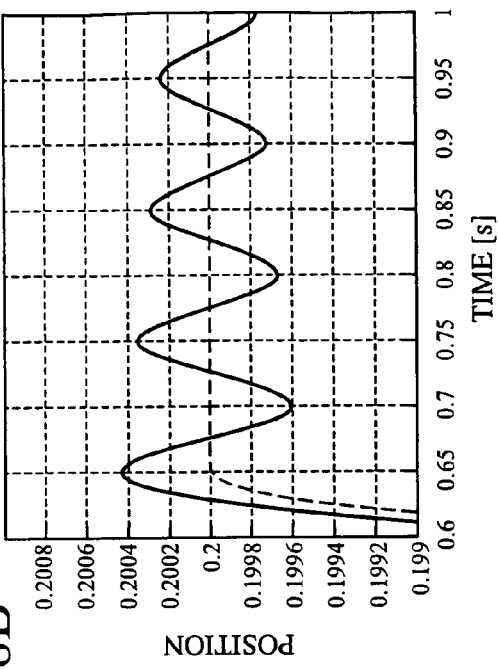
FIGS. 38A to 38D are graphs showing a numerical calculation example to which the position command in accordance with embodiment 9 is not applied, but to which a trapezoid-shaped velocity command is applied.
Figure 38B:
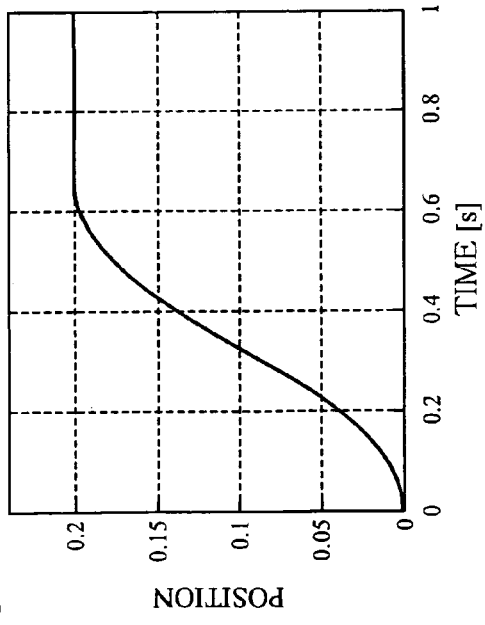
Figure 38C:
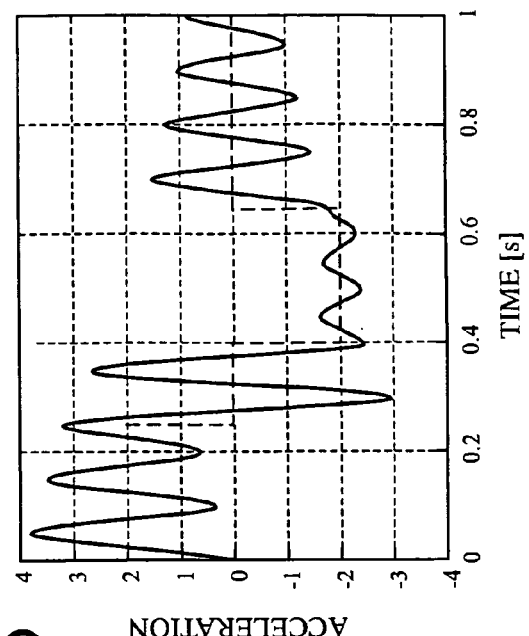
Figure 38D:
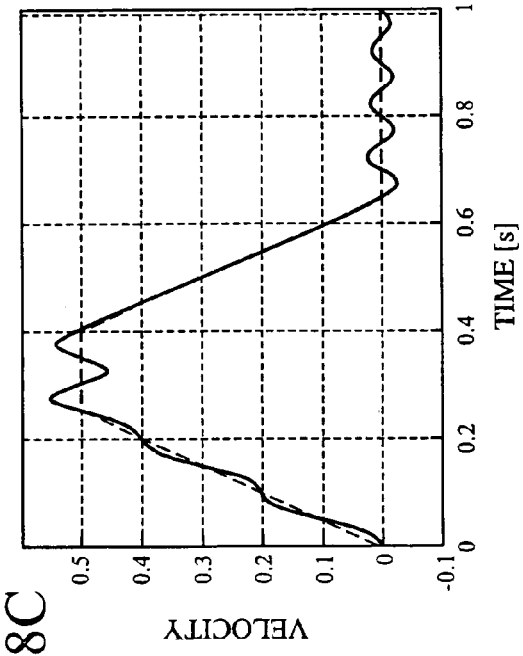

FIGS. 38A to 38D are graphs showing the numerical calculation example to which the position command in accordance with the present embodiment 9 is not applied, but to which a trapezoid-shaped velocity command is applied. FIG. 38A is a graph showing the position command and the machine's position, FIG. 38B is an enlarged view of FIG. 38A, FIG. 38C is a graph showing the velocity command and the machine's velocity, and FIG. 38D is a graph showing the acceleration command and the machine's acceleration. Solid lines shown in FIGS. 38A and 38B indicate the machine's position, and dotted lines indicate the position command. A solid line shown in FIG. 38C indicates the machine's velocity, and a dotted line indicates the velocity command which is the first derivative with respect to time of the position command. A solid line in FIG. 38D indicates the machine's acceleration, and a dotted line indicates the acceleration command which is the second derivative with respect to time of the position command.

It is apparent from the velocity command of FIG. 38C and acceleration command of FIG. 38D that these commands maximize the utilization of the acceleration limit and velocity limit. In addition, it is apparent from the machine's position of FIG. 38B, machine's velocity of FIG. 38C, and machine's acceleration of FIG. 38D that a residual vibration occurs in the machine and the settling characteristics at the time of positioning control get worse. It is further apparent from the machine's velocity of FIG. 38C and machine's acceleration of FIG. 38D that the residual vibration caused by the trapezoid-shaped velocity command results in the machine's velocity exceeding the velocity limit and the machine's acceleration exceeding the acceleration limit.

Figure 39A:
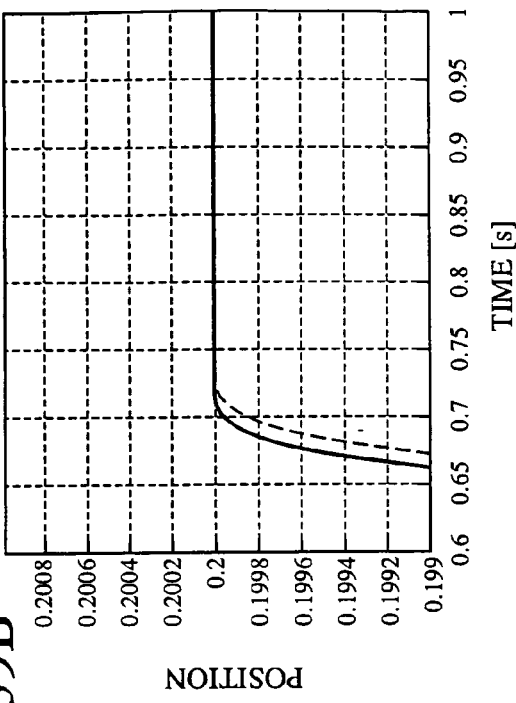
FIGS. 39A to 39D are graphs showing a numerical calculation example to which the position command in accordance with embodiment 9 is applied.
Figure 39B:
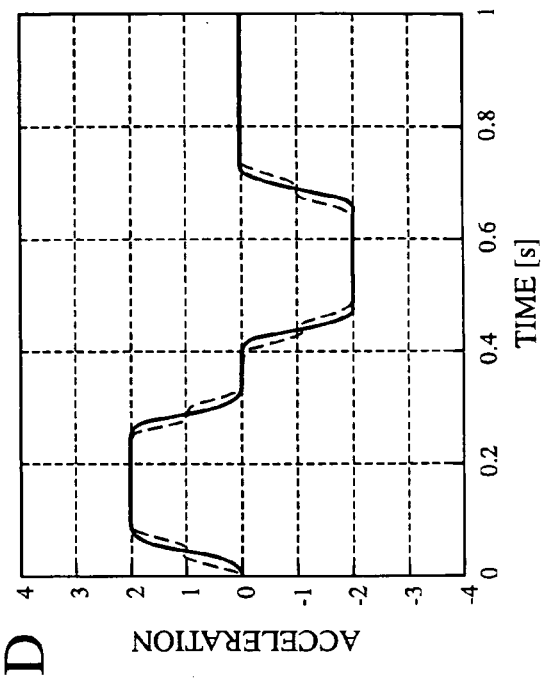
Figure 39C:
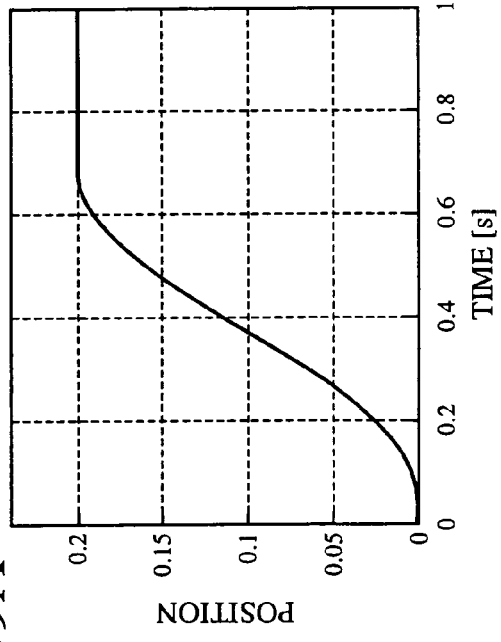
Figure 39D:
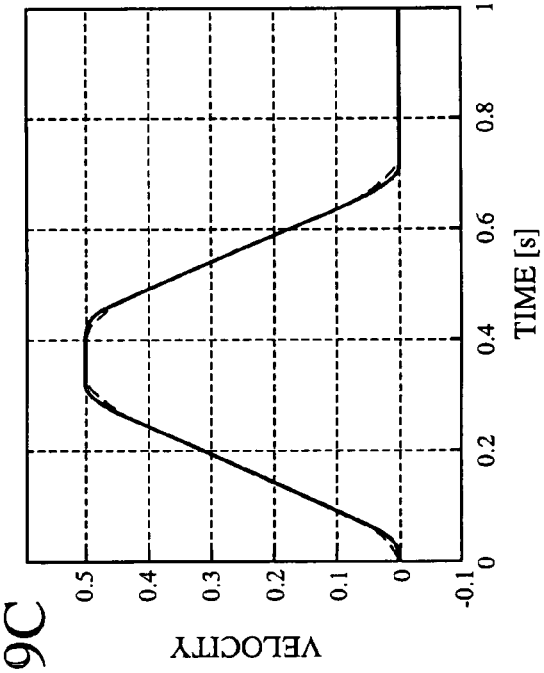

Next, a numerical calculation example to which the position command in accordance with this embodiment is applied will be explained. Assume that the acceleration transition completion time T is 0.09 seconds. FIGS. 39A to 39D are graphs showing the numerical calculation example to which the position command in accordance with this embodiment is applied. FIG. 39A is a graph showing the position command and the machine's position, FIG. 39B is an enlarged view of FIG. 39A, FIG. 39C is a graph showing the velocity command and the machine's velocity, and FIG. 39D is a graph showing the acceleration command and the machine's acceleration. Solid lines shown in FIGS. 39A and 39B indicate the machine's position, and dotted lines indicate the position command. A solid line shown in FIG. 39C indicates the machine's velocity, and a dotted line indicates the velocity command which is the first derivative with respect to time of the position command. A solid line in FIG. 39D indicates the machine's acceleration, and a dotted line indicates the acceleration command which is the second derivative with respect to time of the position command.

It is apparent from the velocity command of FIG. 39C and acceleration command of FIG. 39D that these commands maximize the utilization of the acceleration limit and velocity limit. In addition, it is apparent from the machine's position of FIG. 39B, machine's velocity of FIG. 39C, and machine's acceleration of FIG. 39D that no residual vibration occurs in the machine and the settling characteristics at the time of positioning control are good. It is further apparent from the machine's velocity of FIG. 39C and machine's acceleration of FIG. 39D that the machine's velocity does not exceed the velocity limit and the machine's acceleration does not exceed the acceleration limit.

This embodiment thus offers an advantage of being able to obtain the position command into which information about an acceleration and a velocity which the actuator or the machine can generate is incorporated without exciting any vibration in the machine during the positioning control. This embodiment offers another advantage of being able to reduce the time required for the positioning control because the utilization of the acceleration limit and velocity limit is maximized.

As shown in FIGS. 39A to 39D, the acceleration command during the acceleration time period or the deceleration time period is continuous, and does not experience any rapid change which rises during the acceleration time period (or during the deceleration time period), after that, descends in a short time, and then rises again. In this case, many high-frequency components are not contained in the acceleration command signal. The command generating device in accordance with the present embodiment thus offers a further advantage of making it difficult for vibrations resulting from high-frequency components contained in the command to be excited in the machine.

Many widely different embodiments of the present invention may be constructed without departing from the spirit and scope of the present invention. It should be understood that the present invention is not limited to the specific embodiments described in the specification, except as defined in the appended claims.

What is claimed is:

1. A command generating device for controlling a machine comprising:
    a command shape calculating means for calculating an nth derivative command shape signal having a value which is equal to a fixed multiple of an nth derivative with respect to time of a position command for causing a target to be driven and controlled to reach a target position at a positioning time so that a convolution of a velocity command which is a first derivative with respect to time of the position command and an impulse response of a transfer function which is determined from a frequency of a vibration which occurs in said target to be driven and controlled becomes equal to zero, the convolution being calculated over a time period from said positioning time onward; and
    an associating processing means for integrating the nth derivative command shape signal which is calculated from said position command by said command shape calculating means n times with respect to time, and for multiplying the integral result by a constant which associates the position command at said positioning time with said target position so as to determine the position command to actuate and control a machine.

2. The command generating device according to claim 1, wherein said command shape calculating means determines a time required for an acceleration command shape signal to make a transition from a zero acceleration state to a maximum acceleration state during an acceleration time period from $t_0-[(t_0\omega)/(2\pi)](2\pi/\omega)$ ([z] is Gauss' notation showing the largest integral value that does not exceed z), where $\omega$ is the frequency of the vibration which occurs in said target to be driven and controlled and $t_0$ is the acceleration time period, the acceleration command shape signal having a value equal to a fixed multiple of an acceleration command which is a second derivative with respect to time of the position command and being an S-curve acceleration-and-deceleration command which has an equilateral trapezoidal shape with respect to the acceleration time period and a deceleration time period, so as to determine the acceleration command shape signal.

3. The command generating device according to claim 1, wherein said command shape calculating means calculates the nth derivative command shape signal having a value which is equal to a fixed multiple of the nth derivative command of said position command so that a convolution of an impulse response of a transfer function which is determined from a frequency $\omega$ of a vibration which occurs in said target to be driven and controlled, and the nth derivative with respect to time of the position command becomes equal to zero, the convolution being calculated over a time period from the positioning time onward, integrates the nth derivative command shape signal which is obtained from the position command (n−1) times with respect to time so as to determine a first velocity command shape signal, and multiplies said first velocity command shape signal by a positive constant g and a function with respect to time t which is determined from exp (-gt) so as to determine a velocity command shape signal having a value which is equal to a fixed multiple of the first derivative with respect to time of the position command.

4. The command generating device according to claim 3, wherein said command shape calculating means determines the constant g using the vibration frequency $\omega$ and a vibration damping coefficient $\zeta$ according to $\zeta/(1-\zeta^2)^{1/2}\omega$.

5. The command generating device according to claim 1, wherein when sequentially positioning the target to be driven and controlled to two or more target positions at two or more corresponding positioning times, respectively, said command generating device calculates two or more position commands for causing said target to be driven and controlled to reach said two or more target positions at said two or more corresponding positioning times, respectively.

6. A command generating device for controlling a machine comprising:
    a command shape calculating means for calculating an nth derivative command shape signal having a value which is equal to a fixed multiple of an nth derivative with respect to time of a velocity command for causing a target to be driven and controlled to have a target velocity at a velocity transition completion time so that a convolution of an acceleration command which is a first derivative with respect to time of the velocity command and an impulse response of a transfer function which is determined from a frequency of a vibration which occurs in said target to be driven and controlled becomes equal to zero, the convolution being calculated over a time period from said velocity transition completion time onward; and
    an associating processing means for integrating the nth derivative command shape signal which is calculated from said velocity command by said command shape calculating means n times with respect to time, and for multiplying the integral result by a constant which associates the velocity command at said velocity transition completion time with said target velocity so as to determine the velocity command to actuate and control a machine.

7. A command generating device for controlling a machine comprising:
    a command shape calculating means for calculating an nth derivative command shape signal having a value which is equal to a fixed multiple of an nth derivative with respect to time of an acceleration command for causing a target to be driven and controlled to have a target acceleration at an acceleration transition completion time so that a convolution of a jerk command which is a first derivative with respect to time of the acceleration command and an impulse response of a transfer function which is determined from a frequency of a vibration which occurs in said target to be driven and controlled becomes equal to zero, the convolution being calculated over a time period from said acceleration transition completion time onward; and
    an associating processing means for integrating the nth derivative command shape signal which is calculated from said acceleration command by said command shape calculating means n times with respect to time, and for multiplying the integral result by a constant which associates the acceleration command at said acceleration transition completion time with said target acceleration so as to determine the acceleration command to actuate and control a machine.

* * * * *